US012642408B2

(12) United States Patent
Lee et al.

(10) Patent No.: US 12,642,408 B2
(45) Date of Patent: Jun. 2, 2026

(54) STATION DEVICE ON WHICH CORDLESS VACUUM CLEANER IS DOCKED AND COMMUNICATION METHOD OF THE STATION DEVICE

(71) Applicant: SAMSUNG ELECTRONICS CO., LTD., Suwon-si (KR)

(72) Inventors: Seongu Lee, Suwon-si (KR); Hyunkoo Kang, Suwon-si (KR); Seehyun Kim, Suwon-si (KR); Juhyuk Kim, Suwon-si (KR); Sanghyuk Park, Suwon-si (KR); Yeongju Lee, Suwon-si (KR); Jaeshik Jeong, Suwon-si (KR); Jeonghee Cho, Suwon-si (KR); Sanghwa Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 374 days.

(21) Appl. No.: 18/197,008

(22) Filed: May 12, 2023

(65) Prior Publication Data

US 2023/0363603 A1     Nov. 16, 2023

Related U.S. Application Data

(63) Continuation of application No. PCT/KR2023/006218, filed on May 8, 2023.

(30) Foreign Application Priority Data

May 13, 2022     (KR) ........................ 10-2022-0059225
Nov. 21, 2022     (KR) ........................ 10-2022-0156792

(51) Int. Cl.
*A47L 9/28*          (2006.01)
*A47L 5/26*          (2006.01)
(Continued)

(52) U.S. Cl.
CPC .............. *A47L 9/2873* (2013.01); *A47L 5/26* (2013.01); *A47L 9/0063* (2013.01); *A47L 9/28* (2013.01);
(Continued)

(58) Field of Classification Search
CPC ................................................... G06F 8/60–66
(Continued)

(56) References Cited

U.S. PATENT DOCUMENTS 5,722,109 A     3/1998  Delmas et al.
8,683,645 B2   4/2014  Glassman
(Continued)

FOREIGN PATENT DOCUMENTS

EP          4057569 A1 *  9/2022  ........... H04L 67/125
EP          4505926 A1    2/2025
(Continued)

OTHER PUBLICATIONS

Robotic vacuum cleaner, Wikipedia, 2021, 7 pages, [retrieved on Jan. 15, 2026], Retrieved from the Internet: <URL:https://web.archive.org/web/20211218190109/https://en.wikipedia.org/wiki/Robotic_vacuum_cleaner>.*
(Continued)

*Primary Examiner* — Geoffrey R St Leger
(74) *Attorney, Agent, or Firm* — CANTOR COLBURN LLP

(57)          ABSTRACT

A communication method of a station device may include receiving a new version of software related to control of a cordless vacuum cleaner from a server device, storing the received new version of software in a memory, identifying whether a preset condition under which the new version of software is downloadable to the cordless vacuum cleaner is
(Continued)

satisfied, and when the preset condition is satisfied, transmitting the new version of software stored in the memory to the cordless vacuum cleaner.

20 Claims, 27 Drawing Sheets

(51) Int. Cl.

| | |
|---|---|
| *A47L 9/00* | (2006.01) |
| *G06F 8/65* | (2018.01) |
| *G06F 8/71* | (2018.01) |
| *H04L 12/28* | (2006.01) |
| *H04L 67/00* | (2022.01) |
| *H04L 67/12* | (2022.01) |

(52) U.S. Cl.

CPC .......... *A47L 9/2842* (2013.01); *A47L 9/2857* (2013.01); *A47L 9/2894* (2013.01); *G06F 8/65* (2013.01); *G06F 8/71* (2013.01); *H04L 12/2814* (2013.01); *H04L 67/00* (2013.01); *H04L 67/12* (2013.01); *A47L 2201/02* (2013.01); *H04L 2012/2841* (2013.01); *H04L 2012/285* (2013.01)

(58) Field of Classification Search

USPC ................................................ 717/168–178

See application file for complete search history.

(56) References Cited

U.S. PATENT DOCUMENTS

| | | | | |
|---|---|---|---|---|
| 10,681,864 | B2 | 6/2020 | Matt et al. | |
| 2016/0066759 | A1* | 3/2016 | Langhammer | B25J 9/0003 |
| | | | | 15/300.1 |
| 2018/0078107 | A1* | 3/2018 | Gagnon | A47L 9/20 |

| | | | | |
|---|---|---|---|---|
| 2020/0221633 | A1 | 7/2020 | Einecke et al. | |
| 2021/0089040 | A1 | 3/2021 | Ebrahimi Afrouzi et al. | |
| 2021/0169290 | A1 | 6/2021 | No | |
| 2021/0251451 | A1 | 8/2021 | Ko et al. | |
| 2022/0032450 | A1 | 2/2022 | Kim et al. | |
| 2022/0354327 | A1 | 11/2022 | Kim et al. | |
| 2024/0118708 | A1 | 4/2024 | Yang et al. | |

FOREIGN PATENT DOCUMENTS

| | | | | | |
|---|---|---|---|---|---|
| JP | H05192279 | A | 8/1993 | | |
| JP | H0759698 | A | 3/1995 | | |
| JP | 6884596 | B2 * | 6/2021 | .......... | A47L 9/2805 |
| JP | 2021168826 | A | 10/2021 | | |
| KR | 101179592 | B1 | 9/2012 | | |
| KR | 20120114669 | A | 10/2012 | | |
| KR | 20190069216 | A | 6/2019 | | |
| KR | 20200009680 | A | 1/2020 | | |
| KR | 20200027320 | A | 3/2020 | | |
| KR | 20200068033 | A | 6/2020 | | |
| KR | 20200119063 | A | 10/2020 | | |
| KR | 20210073058 | A | 6/2021 | | |
| KR | 20210073120 | A | 6/2021 | | |
| KR | 20210105207 | A | 8/2021 | | |
| KR | 20220046860 | A | 4/2022 | | |
| KR | 102427836 | B1 * | 8/2022 | .......... | A47L 9/2857 |
| TW | 201429438 | A * | 8/2014 | | |
| WO | WO-2013175933 | A1 * | 11/2013 | .......... | H04W 12/06 |
| WO | 2021133105 | A1 | 7/2021 | | |

OTHER PUBLICATIONS

International Search Report and Written Opinion for International Application No. PCT/KR2023/006218; International Filing Date May 8, 2023; Date of Mailing Aug. 16, 2023; 10 Pages.

Extended European Search Report corresponding to Application No. 23803785.7-1215; Dated Mar. 27, 2025.

\* cited by examiner

FIG. 6

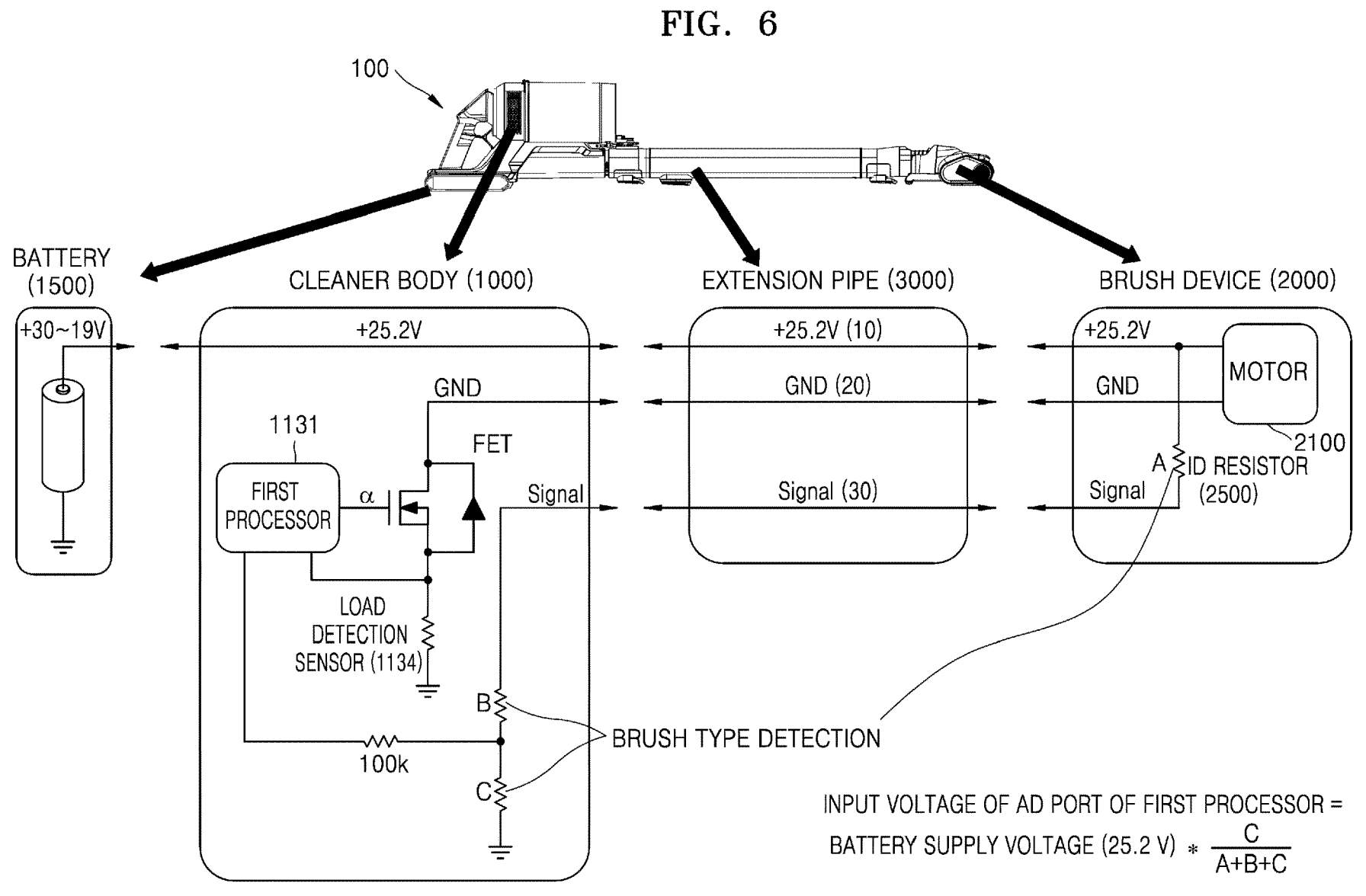

BRUSH DEVICE (2000)

MOTOR

2100

ID RESISTOR (2500)

+25.2V

GND

Signal

A

EXTENSION PIPE (3000)

+25.2V (10)

GND (20)

Signal (30)

CLEANER BODY (1000)

+25.2V

GND

FET

Signal

α

1131

FIRST PROCESSOR

LOAD DETECTION SENSOR (1134)

100k

B

C

BRUSH TYPE DETECTION

BATTERY (1500)

+30~19V

100

$$\text{INPUT VOLTAGE OF AD PORT OF FIRST PROCESSOR} = \text{BATTERY SUPPLY VOLTAGE (25.2 V)} * \frac{C}{A+B+C}$$

| Brush Type | ID Resistor (A) | Battery 25V Max (6S1P) | | | | | | Battery 29.2V Max (7S1P) | | | | | Remarks |
|---|---|---|---|---|---|---|---|---|---|---|---|---|---|
| | | 15.6 | 21.6 | 25.0 | 18.2 | 25.2 | 29.2 | | | | | | |
| Wet Brush(Damp Cloth Brush) | Short | 3.105 | 4.299 | 4.976 | 3.622 | 5.016 | 5.812 | | | | | | |
| (AI) Multi-Brush | 330K | 1.724 | 2.387 | 2.763 | 2.011 | 2.785 | 3.227 | | | | | | |
| TURBO 2.0 Brush | 910,000 | 0.968 | 1.340 | 1.551 | 1.129 | 1.563 | 1.811 | | | | | | |
| (AI) Hard Floor Brush | 2,200,000 | 0.490 | 0.678 | 0.785 | 0.571 | 0.791 | 0.917 | | | | | | |
| Spare | 6,800,000 | 0.177 | 0.284 | 0.284 | 0.207 | 0.287 | 0.332 | | | | | | |
| Soft Brush | Open | 0 | 0 | 0 | 0 | 0 | 0 | | | | | | |

501 — (AI) Multi-Brush

504 — TURBO 2.0 Brush

502 — (AI) Hard Floor Brush

FIG. 10

| No | Operating Condition | Usage environment state | Normal mode 1011 | | AI mode 1012 | | Remarks |
|---|---|---|---|---|---|---|---|
| | | | Power consumption | RPM | Power consumption | RPM | |
| 1 | Condition #1 | Hard floor | 115 | 3,800 | 70 | 2,000 | Usage time increases |
| 2 | Condition #2 | Carpet (normal load) | 115 | 3,800 | 115 | 3,800 | Priority on cleaning performance |
| 3 | Condition #3 | Carpet (overload) | 115 | 3,800 | 40 | 2,000 | Usability (operability) improvement |
| 4 | Condition #4 | Mat | 115 | 3,800 | 58 | 1,500 | Usability (operability) improvement |
| 5 | Condition #5 | Lift (move) | 115 | 3,800 | 40 | 1,500 | Usage time increases |
| 6 | Condition #6 | Corner | 115 | 3,800 | 150 | 2,000 | Cleaning performance improvement |

| | 1101 | 1102 | 1103 | 1104 | 1105 |
|---|---|---|---|---|---|
| State diagnosis | User diagnosis | User diagnosis | Normal | Automatic correction | User diagnosis |
| Measurement data | 0 ~ 0.1A | 0.1 ~ 0.5A | 0.5 ~ 0.9A | 0.9 ~ 1.5A | 1.5A↑ |
| Diagnosis guide | Brush diagnosis (non-assembly of entire brush) | Brush diagnosis (non-assembly of brush drum) | – | Automatic correction of AI model | Brush diagnosis (foreign matter stuck) |

FIG. 12

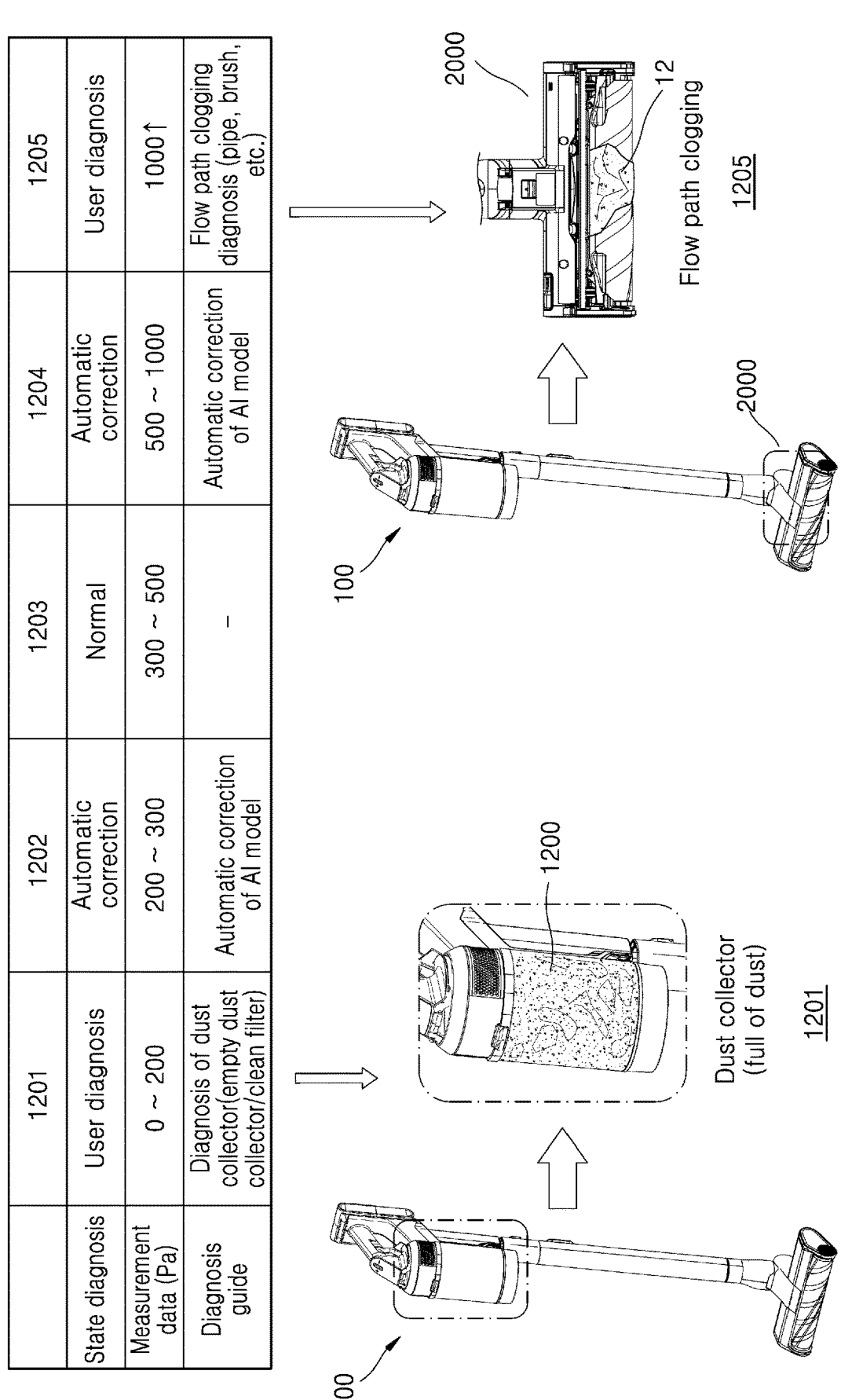

| State diagnosis | 1201 | 1202 | 1203 | 1204 | 1205 |
|---|---|---|---|---|---|
| | User diagnosis | Automatic correction | Normal | Automatic correction | User diagnosis |
| Measurement data (Pa) | 0 ~ 200 | 200 ~ 300 | 300 ~ 500 | 500 ~ 1000 | 1000↑ |
| Diagnosis guide | Diagnosis of dust collector(empty dust collector/clean filter) | Automatic correction of AI model | – | Automatic correction of AI model | Flow path clogging diagnosis (pipe, brush, etc.) |

Dust collector (full of dust)

1201

Flow path clogging

| CLASSIFICATION | BEFORE UPDATE | AFTER UPDATE |
|---|---|---|
| SUCTION FORCE INTENSITY LEVEL | LEVEL 5 | LEVEL 6 |
| OPERATION MODE | JET/SUPER-STRONG/ STRONG/ NORMAL/SMART AI | JET/SUPER-STRONG/STRONG/ NORMAL/SMART AI/SILENT |

<New version of SW>          /2110

| No | OPERATION MODE | POWER CONSUMPTION OF SUCTION MOTOR | USAGE TIME | SUCTION FORCE |
|---|---|---|---|---|
| 1 | JET | 580W | 3 MINUTES | 220W |
| 2 | SUPER-STRONG | 320W | 10 MINUTES | 125W |
| 3 | STRONG | 113W | 30 MINUTES | 40W |
| 4 | NORMAL | 58W | 60 MINUTES | 18W |
| 5 | SMART AI | VARIABLE | VARIABLE | VARIABLE |
| 6 | SILENT (ADDED) | 50W | 65 MINUTES | 16W |

FIG. 22

| CLASSIFICATION | BEFORE UPDATE | AFTER UPDATE | REMARKS |
|---|---|---|---|
| USER MODE | 50W | 40W | NOISE 50db → 40db |
| | 580W | 630W | SUCTION FORCE OF HANDY SET 220W → 240W |

\<New version of SW\> ╱2210

| No | OPERATION MODE | POWER CONSUMPTION OF SUCTION MOTOR | USAGE TIME | SUCTION FORCE |
|---|---|---|---|---|
| 1 | JET | 580W | 3 MINUTES | 220W |
| 2 | SUPER-STRONG | 320W | 10 MINUTES | 125W |
| 3 | STRONG | 113W | 30 MINUTES | 40W |
| 4 | NORMAL | 58W | 60 MINUTES | 18W |
| 5 | SMART AI | VARIABLE | VARIABLE | VARIABLE |
| 6 | SILENT | 50W | 65 MINUTES | 16W |
| 7 | USER MODE (ADDED) | 630W | 2.5 MINUTES | 240W |

FIG. 23

| CLASSIFICATION | BEFORE UPDATE | AFTER UPDATE |
|---|---|---|
| AI MODE | LEVEL 4 | LEVEL 5 |
| OPERATION MODE | HARD FLOOR/MAT/ CARPET/LIFT | HARD FLOOR/MAT/ CARPET/LIFT/CORNER |

2310

<New version of SW>

| No | OPERATION MODE | POWER CONSUMPTION OF SUCTION MOTOR | USAGE TIME |
|---|---|---|---|
| 1 | HARD FLOOR | 75W | 45 MINUTES |
| 2 | MAT | 58W | 60 MINUTES |
| 3 | CARPET | 115W | 30 MINUTES |
| 4 | LIFT | 58W | 60 MINUTES |
| 5 | CORNER (ADDED) | 150W | 22 MINUTES |

FIG. 24
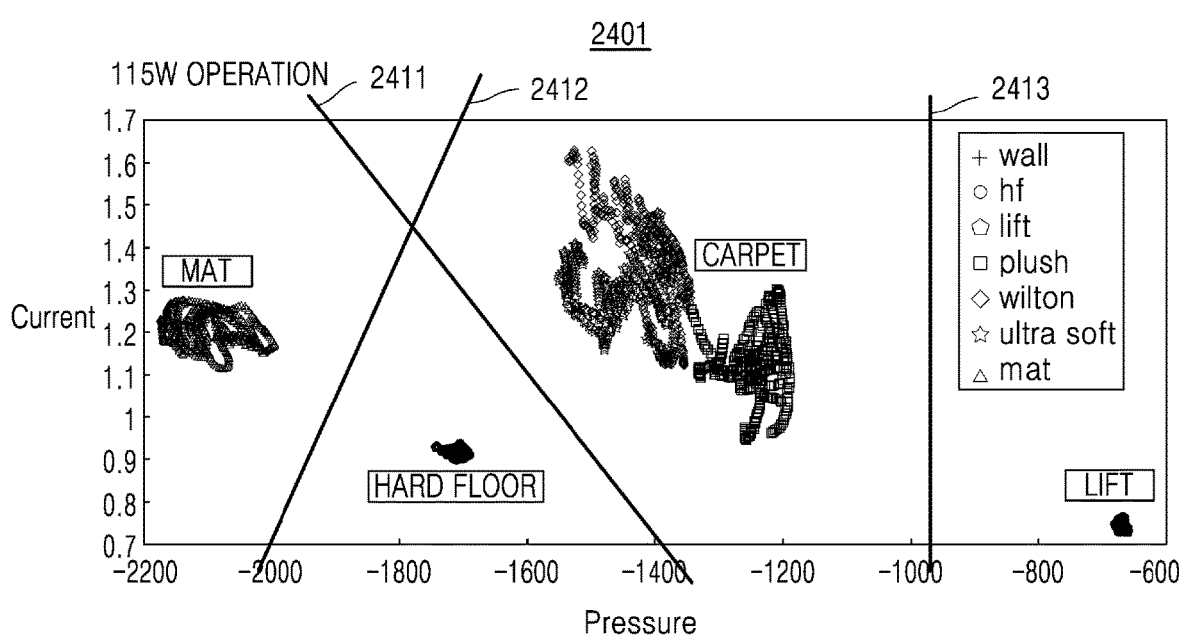
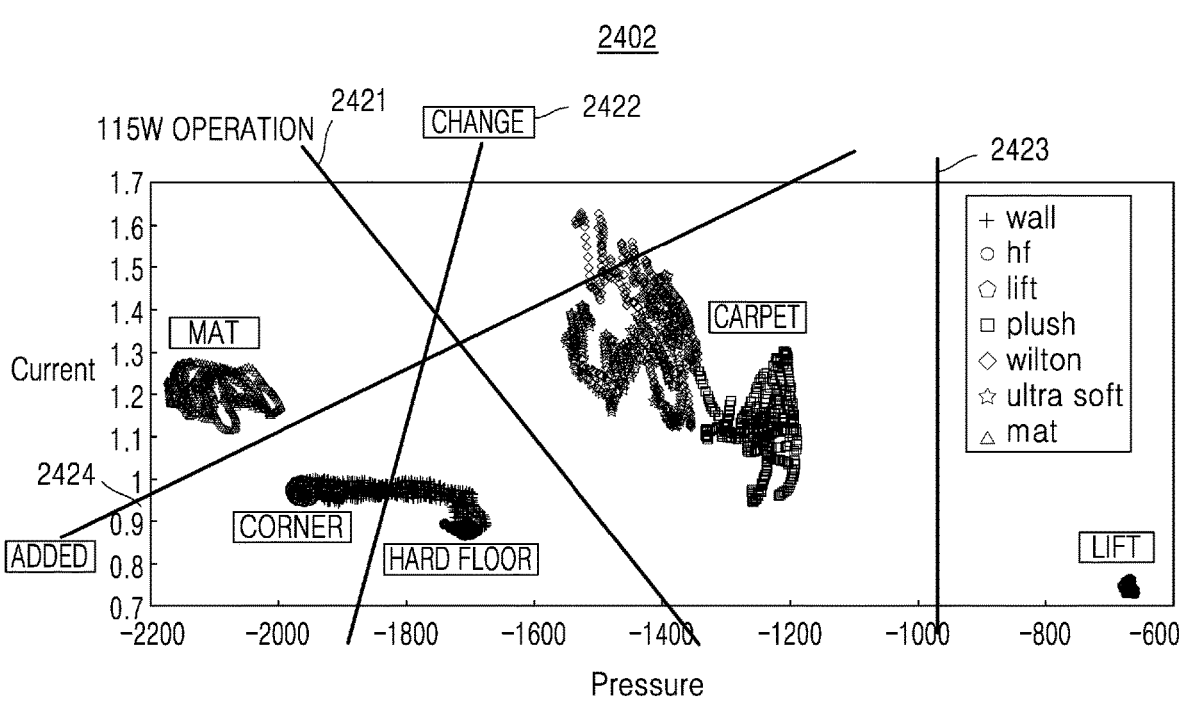

FIG. 25

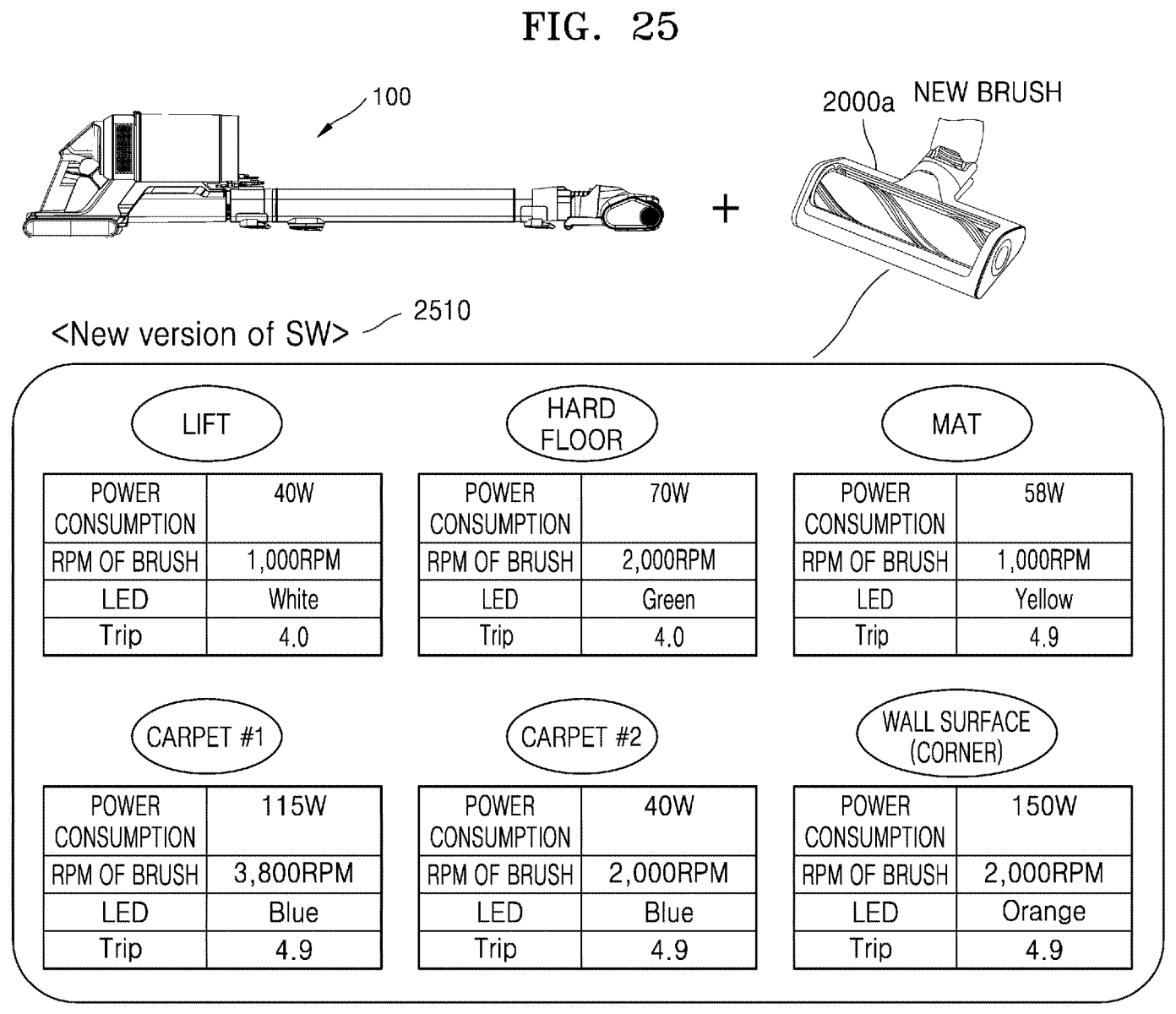

2000a NEW BRUSH

100

\<New version of SW\> — 2510

| LIFT | |
|---|---|
| POWER CONSUMPTION | 40W |
| RPM OF BRUSH | 1,000RPM |
| LED | White |
| Trip | 4.0 |

| HARD FLOOR | |
|---|---|
| POWER CONSUMPTION | 70W |
| RPM OF BRUSH | 2,000RPM |
| LED | Green |
| Trip | 4.0 |

| MAT | |
|---|---|
| POWER CONSUMPTION | 58W |
| RPM OF BRUSH | 1,000RPM |
| LED | Yellow |
| Trip | 4.9 |

| CARPET #1 | |
|---|---|
| POWER CONSUMPTION | 115W |
| RPM OF BRUSH | 3,800RPM |
| LED | Blue |
| Trip | 4.9 |

| CARPET #2 | |
|---|---|
| POWER CONSUMPTION | 40W |
| RPM OF BRUSH | 2,000RPM |
| LED | Blue |
| Trip | 4.9 |

| WALL SURFACE (CORNER) | |
|---|---|
| POWER CONSUMPTION | 150W |
| RPM OF BRUSH | 2,000RPM |
| LED | Orange |
| Trip | 4.9 |

STATION DEVICE ON WHICH CORDLESS VACUUM CLEANER IS DOCKED AND COMMUNICATION METHOD OF THE STATION DEVICE

CROSS-REFERENCE TO RELATED APPLICATIONS

This application is a continuation application, claiming priority under § 365 (c), of International Application No. PCT/KR2023/006218, filed on May 8, 2023, which is based on and claims the benefit of Korean patent application number 10-2022-0156792 filed on Nov. 21, 2022, in the Korean Intellectual Property Office and of Korean patent application number 10-2022-0059225, filed on May 13, 2022, in the Korean Intellectual Property Office, the disclosures of which are incorporated by reference herein in their entireties.

TECHNICAL FIELD

An embodiment of the disclosure relates to a station device on which a cordless vacuum cleaner is docked and a communication method of the station device.

BACKGROUND ART

A cordless vacuum cleaner is a type of vacuum cleaner with a built-in battery. The cordless vacuum cleaner may be operated by the charged built-in battery without having to connect a power cable to an outlet. The cordless vacuum cleaner includes a suction motor that generates suction force. The cordless vacuum cleaner may suck up air and foreign matters, such as dust, from a cleaner head (brush) through suction force generated by the suction motor, and may separate the sucked up foreign matters from the air and collect the separated foreign matters.

Recently, the types of cleaner heads or attachments (e.g., brushes) connected to a main body of a cordless vacuum cleaner have diversified. The brushes, for example, of a cordless vacuum cleaner may be classified into main brushes used for cleaning the floor and auxiliary brushes used for special purposes. For application to various cleaning environments, the different types of attachments (e.g., auxiliary brushes) used for special purposes are further subdivided. In addition, new functions are continuously being added to improve the performance of cordless vacuum cleaners. Accordingly, a situation in which software for the cordless vacuum cleaners needs to be updated may often occur.

DESCRIPTION OF EMBODIMENTS

Solution to Problem

A station device according to an embodiment of the disclosure may include a communication interface configured to communicate with a cordless vacuum cleaner and a server device, a memory storing one or more instructions, and at least one processor. The at least one processor may be configured to receive a new version of software related to control of the cordless vacuum cleaner from the server device through the communication interface. The at least one processor may be further configured to store the received new version of software in the memory. The at least one processor may be further configured to identify whether a preset condition under which the new version of software is downloadable to the cordless vacuum cleaner is satisfied.

When the preset condition is satisfied, the at least one processor may be further configured to transmit the new version of software stored in the memory to the cordless vacuum cleaner through the communication interface.

A communication method of a station device, according to an embodiment of the disclosure, may include receiving a new version of software related to control of a cordless vacuum cleaner from a server device through a communication interface of the station device. The communication method of the station device may include storing the received new version of software in a memory of the station device. The communication method of the station device may include identifying whether a preset condition under which the new version of software is downloadable to the cordless vacuum cleaner is satisfied. When the preset condition is satisfied, the communication method of the station device may include transmitting the new version of software stored in the memory of the station device to the cordless vacuum cleaner through the communication interface of the station device.

BRIEF DESCRIPTION OF DRAWINGS

FIG. 6 is a diagram for describing an operation of identifying a type of a brush device in a cleaner body, according to an embodiment of the disclosure.

FIG. 7 is a diagram for describing an identification resistor (ID resistor) of a brush device, according to an embodiment of the disclosure.

FIG. 10 is a diagram for describing an algorithm for controlling power consumption of a suction motor or revolutions per minute (RPM) of a rotating brush of a brush device, according to an embodiment of the disclosure.

FIG. 12 is a diagram for describing an algorithm for diagnosing a state of a cordless vacuum cleaner, based on data related to flow path pressure inside the cordless vacuum cleaner, according to an embodiment of the disclosure.

FIG. 21 is a diagram for describing an operation of updating software when an operation mode of a cordless vacuum cleaner is added, according to an embodiment of the disclosure.

FIG. 22 is a diagram for describing an operation of updating software when a user mode is newly defined, according to an embodiment of the disclosure.

FIG. 23 is a diagram for describing an operation of updating software when an AI model is trained to additionally infer a new usage environment state, according to an embodiment of the disclosure.

FIG. 24 is a diagram for describing a new version of an AI model trained to additionally infer a new usage environment state, according to an embodiment of the disclosure.

FIG. 25 is a diagram for describing an operation of updating software when a new type of a brush device is added, according to an embodiment of the disclosure.

MODE OF DISCLOSURE

Figure 1:
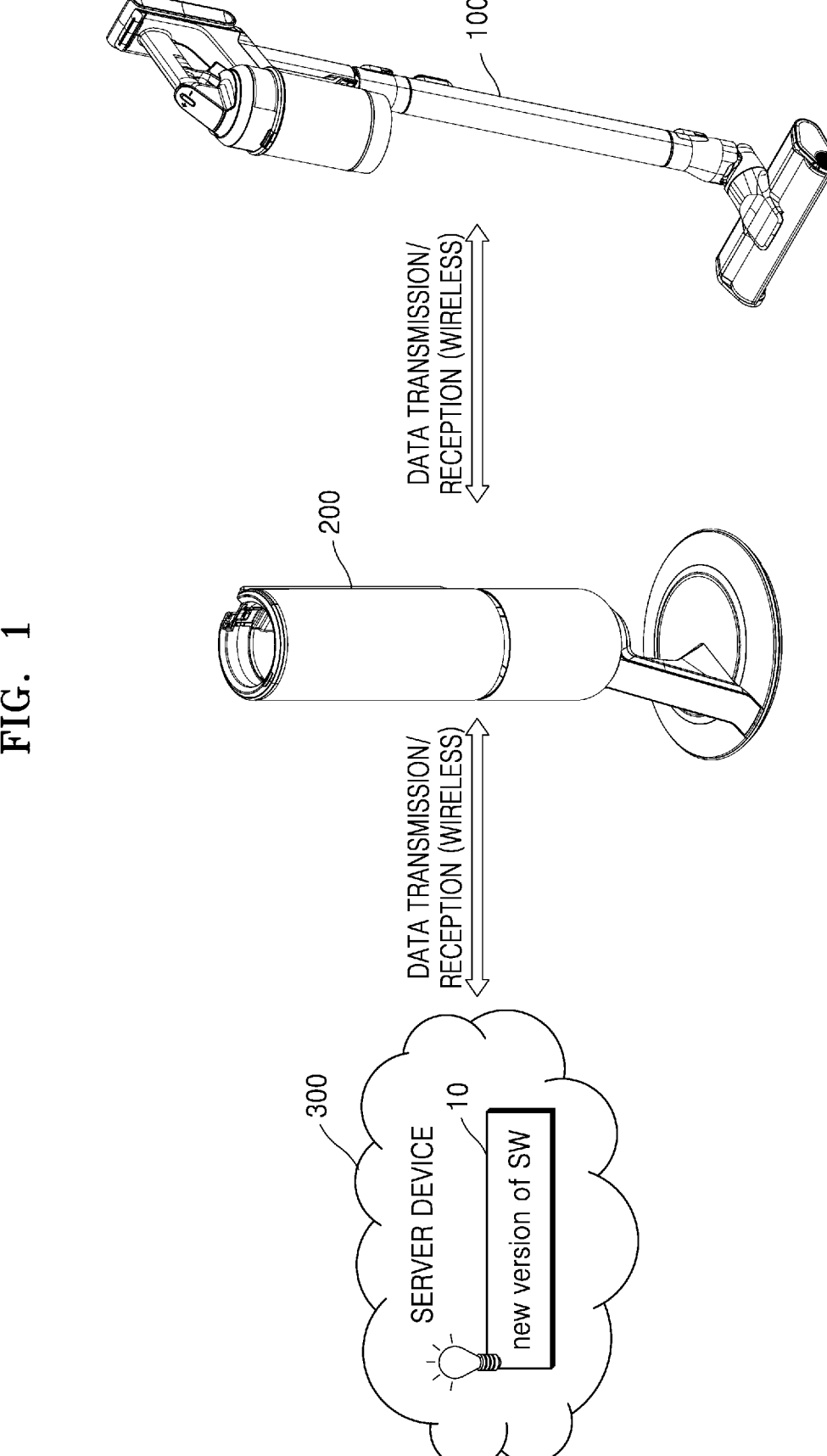
FIG. 1 is a diagram for describing a communication system according to an embodiment of the disclosure.

The terms as used herein are briefly described, and an embodiment of the disclosure is described in detail.

As for the terms as used herein, common terms that are currently widely used are selected as much as possible while taking into account functions in an embodiment of the disclosure. However, the terms may vary depending on the intention of those of ordinary skill in the art, precedents, the emergence of new technology, and the like. Also, in a specific case, there are also terms arbitrarily selected by the applicant. In this case, the meaning of the terms will be described in detail in the description of the embodiment of the disclosure. Therefore, the terms as used herein should be defined based on the meaning of the terms and the description throughout the disclosure rather than simply the names of the terms.

Throughout the disclosure, the expression "at least one of a, b or c" indicates only a, only b, only c, both a and b, both a and c, both b and c, all of a, b, and c, or variations thereof.

Throughout the disclosure, the expression "a portion includes a certain element" means that a portion further includes other elements rather than excludes other elements unless otherwise stated. Also, the terms such as "portion" and "module" as used herein mean units that process at least one function or operation, and may be implemented as hardware, software, or a combination of hardware and software.

Hereinafter, an embodiment of the disclosure will be described in detail with reference to the accompanying drawings, so that those of ordinary skill in the art may easily carry out the disclosure. However, the disclosure may be implemented in various different forms and is not limited to the embodiment described herein. In order to clearly explain an embodiment of the disclosure, parts irrelevant to the description are omitted in the drawings, and similar reference numerals are assigned to similar parts throughout the disclosure.

FIG. 1 is a diagram for describing a communication system according to an embodiment of the disclosure.

Referring to FIG. 1, the communication system according to an embodiment of the disclosure may include a cordless vacuum cleaner 100, a station device 200, and a server device 300. However, all of the elements illustrated in FIG. 1 are not essential elements. Although a cordless vacuum is described herein, it should be appreciated that the cleaning system may include a cord vacuum energized by a wall outlet without departing from the scope of the present disclosure.

The communication system may be implemented with more elements than the elements illustrated in FIG. 1, or may be implemented with fewer elements than the elements illustrated in FIG. 1. For example, the communication system may be implemented to include the cordless vacuum cleaner 100 and the station device 200, excluding the server device 300. Also, the communication system may be implemented to further include a user terminal (not shown). The user terminal may be a terminal registered in the server device 300 with the same account as that of the cordless vacuum cleaner 100 or the station device 200. Examples of the user terminal may include a mobile terminal (e.g., a smartphone, a wearable device, a tablet, etc.) and a home appliance including a display (e.g., a refrigerator, a television (TV), a computer, etc.), but the disclosure is not limited thereto. Hereinafter, for convenience of explanation, a case where the user terminal is a smartphone will be described as an example. The user terminal will be described in detail below with reference to FIG. 17.

The cordless vacuum cleaner 100 may refer to a vacuum cleaner that has a built-in rechargeable battery and does not require a power cable to be connected to an outlet during cleaning. A user may move the cordless vacuum cleaner 100 back and forth by using a handle of a cleaner body, so that the attachment or cleaner head (e.g. brush device) sucks dust or foreign matters (garbage) from the surface to be cleaned. Although a brush apparatus is described herein, it should be appreciated that other types of vacuum heads or attachments can be used with the vacuum cleaner without departing from the scope of the invention.

The cordless vacuum cleaner 100 may include a communication interface that communicates with the station device 200. For example, the cordless vacuum cleaner 100 may transmit/receive data to/from the station device 200 through a wireless personal area network (WPAN).

The station device 200 may be a device for dust discharge, battery charging, or storage of the cordless vacuum cleaner 100. The station device 200 may also be referred to as a clean station. According to an embodiment of the disclosure, the station device 200 may communicate with the cordless vacuum cleaner 100 or the server device 300 through a network. For example, the station device 200 may transmit/ receive data to/from the cordless vacuum cleaner 100 through a WPAN, without passing through an access point (AP). The station device 200 may transmit/receive data to/from the server device 300 through an AP that connects a local area network (LAN), to which the station device 200 is connected, to a wide area network (WAN), to which the server device 300 is connected. For example, the station device 200 may be connected to the cordless vacuum cleaner 100 through Bluetooth Low Energy (BLE) communication, and may be connected to the server device 300 through Wi-Fi™ (IEEE 802.11) communication.

Accordingly, when a Wi-Fi™ communication module is not provided in the cordless vacuum cleaner 100, the station device 200 may relay communication between the cordless vacuum cleaner 100 and the server device 300. For example, the station device 200 may upload, to the server device 300, data received from the cordless vacuum cleaner 100. Also, the station device 200 may transmit, to the cordless vacuum cleaner 100, data received from the server device 300.

The server device 300 may be a device that manages the station device 200 and the cordless vacuum cleaner 100. For example, the server device 300 may be a home appliance management server. The server device 300 may manage user account information and information of home appliances connected to the user account. For example, the user may access the server device 300 through the user terminal and create a user account. The user account may be identified by an identification (ID) and a password, which are set by the user. The server device 300 may register the station device 200 and the cordless vacuum cleaner 100 in the user account according to a preset procedure. For example, the server device 300 may register the station device 200 and the cordless vacuum cleaner 100 by linking identification information of the station device 200 (e.g., serial number or media access control (MAC) address) and identification information of the cordless vacuum cleaner 100 to the user account. When the station device 200 and the cordless vacuum cleaner 100 are registered in the server device 300, the server device 300 may periodically receive state information of the station device 200 or state information of the cordless vacuum cleaner 100 from the station device 200 and manage the state of the station device 200 or the state of the cordless vacuum cleaner 100.

On the other hand, when software related to control of the station device 200 or software related to control of the cordless vacuum cleaner 100 is updated (hereinafter also referred to as "upgraded"), a new version of software 10 may be registered in a memory of the server device 300. When the server device 300 receives a download request for the new version of software 10 from the station device 200, the server device 300 may transmit the new version of software 10 to the station device 200. The software may be referred to as firmware.

When the new version of software 10 is software related to control of the station device 200, the station device 200 may download the new version of software 10 and update software previously installed on the station device 200. According to an embodiment of the disclosure, the software related to control of the station device 200 may include an algorithm related to a dust discharge operation (stroke) (e.g., an algorithm for adjusting the intensity of the suction force of the suction motor of the station device 200), an algorithm related to an operation of an output interface (e.g., liquid crystal display (LCD), audio output interface, etc.), an algorithm for diagnosing the state of the station device 200, and the like, but the disclosure is not limited thereto.

Also, when the new version of software 10 is software related to control of the cordless vacuum cleaner 100, the station device 200 may update software previously installed on the cordless vacuum cleaner 100 by transmitting the new version of software 10 to the cordless vacuum cleaner 100. According to an embodiment of the disclosure, the software related to control of the cordless vacuum cleaner 100 may include an AI model trained to infer a usage environment state of the brush device 2000 and one or more control algorithms. The usage environment state includes the state of the surface to be cleaned (hard floor, carpet, mat, corner, etc.)) by the attachment or brush apparatus. The control algorithms can include, but are not limited to, a control algorithm related to the operation mode of the cordless vacuum cleaner 100 (e.g., an algorithm for controlling the intensity force of the suction motor of the cleaner body, an algorithm for controlling the number of revolutions per minute of the rotating brush of the brush device (hereinafter referred to as drum RPM), etc.), an algorithm for diagnosing the state of the cordless vacuum cleaner 100 (e.g., filter clogging, flow path clogging, overload of the brush device, misassembly, etc.), and the like.

Therefore, according to an embodiment of the disclosure, even when the cordless vacuum cleaner 100 does not have a separate communication module (e.g., a Wi-Fi™ communication module) enabling direct communication with the server device 300, the cordless vacuum cleaner 100 may download the new version of software 10 registered in the server device 300 through the station device 200 connected to the server device 300 and easily update previously installed software through an over-the-air (OTA) scheme. The OTA refers to a technology for updating software (firmware) wirelessly by using Wi-Fi™ communication, without connecting to a computer. The OTA may also be referred to as over-the-network (OTN).

Also, according to an embodiment of the disclosure, even when the user does not purchase a new cordless vacuum cleaner 100, convenience in using the cordless vacuum cleaner 100 may be improved by updating the learning model or the control algorithm of the existing cordless vacuum cleaner 100 to the latest version.

The operation by which the station device 200 downloads, to the cordless vacuum cleaner 100, the new version of software 10 related to control of the cordless vacuum cleaner 100 and updates the software of the cordless vacuum cleaner 100 will be described in detail below with reference to FIG. 8. Hereinafter, the configurations of the station device 200 and the cordless vacuum cleaner 100, according to an embodiment of the disclosure, will be described with reference to FIG. 2.

Figure 2:
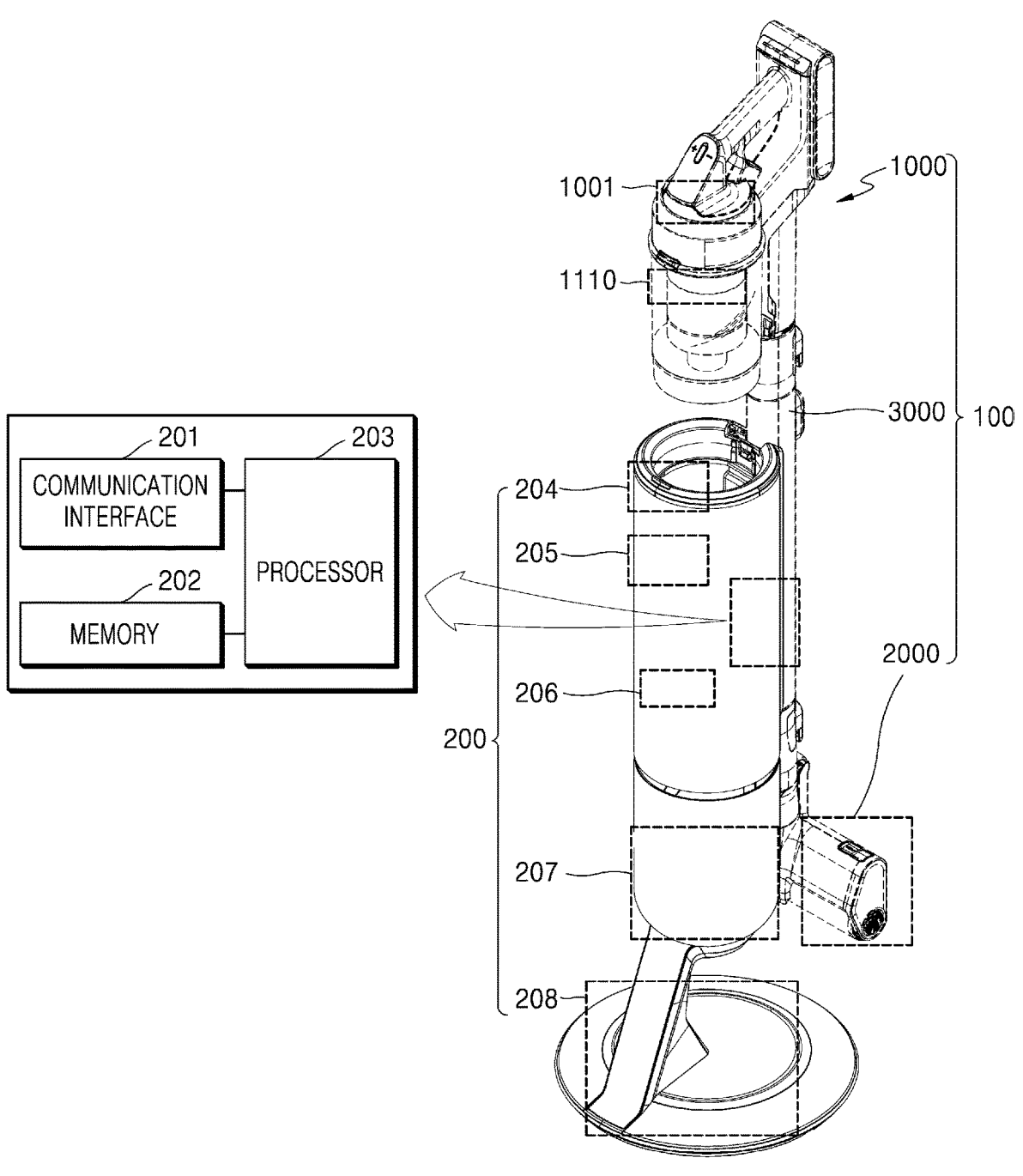
FIG. 2 is a diagram for describing a station device and a cordless vacuum cleaner, according to an embodiment of the disclosure.

FIG. 2 is a diagram for describing a station device 200 and a cordless vacuum cleaner 100, according to an embodiment of the disclosure.

Referring to FIG. 2, the station device 200 according to an embodiment of the disclosure may include a communication interface 201, a memory 202, and at least one processor 203. Also, the station device 200 may further include a user interface 204, a wired connector 205 (e.g., HASS), a pressure sensor 206, a suction motor 207, a power supply 208, a dust collector coupling portion, a collecting portion, and a filter. The respective elements will be described below.

The station device 200 may include the communication interface 201 that communicates with an external device. For example, the station device 200 may communicate with a cleaner body 1000 of the cordless vacuum cleaner 100 or a server device 300 through the communication interface 201. In this case, the communication interface 201 may communicate with the server device 300 through a first communication scheme (e.g., a Wi-Fi™ communication scheme), and may communicate with the cordless vacuum cleaner 100 through a second communication scheme (e.g., a BLE communication scheme).

The communication interface 201 may include a short-range wireless communication interface and a long-range wireless communication interface. The short-range wireless communication interface may include a Bluetooth communication interface, a BLE communication interface, a near field communication (NFC) communication interface, a wireless local area network (WLAN) (Wi-Fi™) communication interface, a ZigBee communication interface, an Infrared Data Association (IrDA) communication interface, a Wi-Fi Direct (WFD) communication interface, an ultra-wideband (UWB) communication interface, an Ant+ communication interface, and the like, but the disclosure is not limited thereto. The long-range wireless communication interface may be used to allow the station device 200 to communicate with the server device 300 remotely. The long-range wireless communication interface may include the Internet, a computer network (e.g., LAN or WAN), and a mobile communication interface. The mobile communication interface may include a $3^{rd}$ generation (3G) module, a $4^{th}$ generation (4G) module, a $5^{th}$ generation (5G) module, a long term evolution (LTE) module, a narrowband-Internet of things (NB-IoT) module, and an LTE-M module.

The communication interface 201 may transmit data to the at least one processor 203 through a universal asynchronous receiver/transmitter (UART), but the disclosure is not limited thereto.

The memory 202 of the station device 200 may store a program (e.g., one or more instructions) for processing and control by the at least one processor 203, and may store input and/or output data. For example, the memory 202 of the station device 200 may include software related to control of the station device 200, state data of the suction motor 207, measured values of the pressure sensor 206, error occurrence data (failure history data), and the like. The memory 202 of the station device 200 may store data received from the cleaner body 1000. For example, the station device 200 may store product information (e.g., identification information, model information, etc.) of the cordless vacuum cleaner 100 docked on the station device 200, version information of the software installed on the cordless vacuum cleaner 100, error occurrence data (failure history data) of the cordless vacuum cleaner 100, and the like.

The memory 202 may include, for example, at least one type of storage medium selected from flash memory-type memory, hard disk-type memory, multimedia card micro-type memory, card-type memory (e.g., secure digital (SD) or extreme digital (XD) memory), random access memory (RAM), static random access memory (SRAM), read-only memory (ROM), electrically erasable programmable read-only memory (EEPROM), programmable read-only memory (PROM), magnetic memory, magnetic disc, and optical disc. Programs stored in the memory 202 may be classified into a plurality of modules according to the functions thereof.

The station device 200 may include the at least one processor 203. The station device 200 may include one processor or may include a plurality of processors. The at least one processor 203 according to the disclosure may include at least one of a central processing unit (CPU), a graphics processing unit (GPU), an accelerated processing unit (APU), a many integrated core (MIC), a digital signal processor (DSP), or a neural processing unit (NPU). The at least one processor 203 may be implemented in the form of an integrated system on a chip (SoC) including one or more electronic components. The at least one processor 203 may each be implemented as separate hardware (H/W). The at least one processor 203 may also be referred to as a microprocessor controller (MICOM), a microprocessor unit (MPU), or a microcontroller unit (MCU).

The at least one processor 203 according to the disclosure may be implemented as a single core processor or may be implemented as a multicore processor.

The at least one processor 203 may control overall operations of the station device 200. For example, the at least one processor 203 may control the communication interface 201 to receive, from the server device 300, a new version of software related to control of the cordless vacuum cleaner 100, and may store the received new version of software in the memory 202. The at least one processor 203 may identify whether a preset condition under which the new version of software is downloadable to the cordless vacuum cleaner 100 is satisfied. When the preset condition is satisfied, the at least one processor 203 may control the communication interface 201 to transmit, to the cordless vacuum cleaner 100, the new version of software stored in the memory 202.

The preset condition may include at least one of a condition for communication connection with the cordless vacuum cleaner 100 or a condition for a docking state of the cordless vacuum cleaner 100, but the disclosure is not limited thereto. The preset condition may include a preset download time condition, a remaining battery level condition of the cleaner body 1000, and the like. For example, when the preset condition is a condition under which a BLE communication channel with the cordless vacuum cleaner 100 is established, the at least one processor 203 may transmit the new version of software to an external memory of the cordless vacuum cleaner 100 when BLE communication connection with the cordless vacuum cleaner 100 is possible. When the preset condition is a condition under which a BLE communication channel with the cordless vacuum cleaner 100 is established and the cordless vacuum cleaner 100 is docked on the station device 200, the at least one processor 203 may transmit the new version of software to the external memory of the cordless vacuum cleaner 100 when BLE communication with the cordless vacuum cleaner 100 is possible in a state where the cordless vacuum cleaner 100 is docked on the station device 200. The operation by which the at least one processor 203 of the station device 200 downloads, to the cordless vacuum cleaner 100, the new version of software related to control of the cordless vacuum cleaner 100 according to whether the preset condition is satisfied will be described in detail below with reference to FIG. 8.

The user interface 204 of the station device 200 may include an input interface and an output interface. The input interface may include an ejection button, a mode selection button, and the like. The output interface may include a light-emitting diode (LED) display, an LCD, a touch screen or a speaker, but the disclosure is not limited thereto. The output interface may display the remaining battery level of the cleaner body 1000, software update progress information, and the like, but the disclosure is not limited thereto.

The station device 200 may include a wired connector 205 (e.g., HASS). The wired connector 205 may include a terminal for connecting a computing device of a system administrator (e.g., a service engineer). The system administrator may connect the computing device storing the new version of software to the wired connector 205 and transfer the new version of software to the memory 202 of the station device 200. In this case, when the new version of software is software related to control of the station device 200, previously installed software of the station device 200 may be updated. On the other hand, when the new version of software is software related to control of the cordless vacuum cleaner 100, the station device 200 may transmit the new version of software to the cordless vacuum cleaner 100 according to whether the preset condition is satisfied. For example, when the cordless vacuum cleaner 100 is docked on the station device 200 and BLE communication with the cordless vacuum cleaner 100 is possible, the station device 200 may transmit the new version of software to the cordless vacuum cleaner 100. In this case, the cordless vacuum cleaner 100 may update the previously installed software.

The pressure sensor 206 of the station device 200 may be a sensor that measures the pressure inside the station device 200. The pressure sensor 206 may measure a pressure value before dust discharge or may measure a pressure value after dust discharge. The pressure sensor 206 may transmit a pressure measurement value to the at least one processor 203 through inter-integrated circuit (I2C) communication.

The suction motor 207 may be a device that generates suction force for discharging, from the cleaner body 1000, foreign matters collected in a dust collector (dust container) of the cleaner body 1000. The suction motor 207 may rotate a suction fan that moves air.

The power supply 208 may include a switching mode power supply (SMPS) that receives AC power from a power source and converts the AC power into DC power. When the cordless vacuum cleaner 100 is docked on the station device 200, the power supply 208 may supply the DC power to the battery of the cleaner body 1000 through a charging terminal, and thus, the battery may be charged.

A dust collector coupling portion may be provided so that the dust collector of the cleaner body 1000 is docked. The docking of the cleaner body 1000 and the station device 200 may be completed when the dust collector is seated on the dust collector coupling portion. A docking detection sensor that detects the docking of the cleaner body 1000 may be included in the dust collector coupling portion. The docking detection sensor may be a tunnel magneto-resistance (TMR) sensor, but the disclosure is not limited thereto. The TMR sensor may sense the docking of the cleaner body 1000 by detecting a magnetic material attached to the dust collector. The station device 200 may include a step motor that presses one side of a dust collector door so as to open the dust collector door when the dust collector is docked on the station device 200.

The collecting portion is a space in which foreign matters discharged from the dust collector of the cleaner body 1000 may be collected. The collecting portion may include a dust bag in which foreign matters discharged from the dust collector are collected. The dust bag may include a material that allows air to pass therethrough and prevents foreign matters from passing therethrough, so as to collect foreign matters introduced from the dust collector into the collecting portion. The dust bag may be detachable from the collecting portion. The station device 200 may include an ultraviolet light emitter that emits ultraviolet light to the collecting portion. The ultraviolet light emitter may include a plurality of ultraviolet lamps.

The filter may filter out ultra-fine dust that is not collected in the collecting portion. The filter may include a discharge port through which air passing through the filter is discharged to the outside of the station device 200. The filter may include a motor filter, a HEPA filter, and the like, but the disclosure is not limited thereto.

The cordless vacuum cleaner 100 according to an embodiment of the disclosure may be a stick-type vacuum cleaner including the cleaner body 1000, a brush device 2000, and an extension pipe 3000. However, all of the elements illustrated in FIG. 2 are not essential elements. The cordless vacuum cleaner 100 may be implemented with more elements than the elements illustrated in FIG. 2, or may be implemented with fewer elements than the elements illustrated in FIG. 2. For example, the cordless vacuum cleaner 100 may be implemented with the cleaner body 1000 and the brush device 2000, excluding the extension pipe 3000.

The cleaner body 1000 is a portion that the user holds and moves when cleaning, and may include a suction motor that forms a vacuum inside the cordless vacuum cleaner 100. The suction motor may be located in the dust collector (dust container) that contains foreign matters sucked up from the surface to be cleaned (e.g., hard floor, bedding, sofa, etc.). The cleaner body 1000 may further include, in addition to the suction motor, at least one processor, a battery, and a memory storing software related to control of the cordless vacuum cleaner 100, but the disclosure is not limited thereto. The cleaner body 1000 will be described in detail below with reference to FIG. 3.

The brush device 2000 is a device that comes into close contact with the surface to be cleaned and sucks air and foreign matters from the surface to be cleaned. The brush device 2000 may also be referred to as a cleaner head. The brush device 2000 may be rotatably coupled to the extension pipe 3000. The brush device 2000 may include a motor and a drum to which a rotating brush is attached, but the disclosure is not limited thereto. According to an embodiment of the disclosure, the brush device 2000 may further include at least one processor that controls communication with the cleaner body 1000. The types of brush device 2000 may be diverse, and the type of the brush device 2000 will be described in detail below with reference to FIG. 5.

The extension pipe 3000 may be a pipe having a certain rigidity or a flexible hose. The extension pipe 3000 may transfer suction force generated by the suction motor of the cleaner body 1000 to the brush device 2000, and may move air and foreign matters sucked up by the brush device 2000 to the cleaner body 1000. The extension pipe 3000 may be detachably connected to the brush device 2000. The extension pipe 3000 may be provided between the cleaner body 1000 and the brush device 2000 in multiple stages. Two or more extension pipes 3000 may be provided.

According to an embodiment of the disclosure, the cleaner body 1000, the brush device 2000, and the extension pipe 3000 included in the cordless vacuum cleaner 100 may each include a power cable (e.g., + power cable, − power cable) and a signal line.

The power cable may be a line through which power supplied from the battery is transferred to the cleaner body 1000 and the brush device 2000 connected to the cleaner body 1000. The signal line is different from the power cable and may be a line through which signals are transmitted/received between the cleaner body 1000 and the brush device 2000. The signal line may be implemented to be connected to the power cable within the brush device 2000.

According to an embodiment of the disclosure, the at least one processor 1001 of the cleaner body 1000 and the processor of the brush device 2000 may control an operation of a switch element connected to the signal line, so as to perform bidirectional communication between the cleaner body 1000 and the brush device 2000. Hereinafter, when the cleaner body 1000 and the brush device 2000 communicate with each other through the signal line, communication between the cleaner body 1000 and the brush device 2000 may be defined as 'signal line communication'. On the other hand, the cleaner body 1000 and the brush device 2000 may communicate with each other by using an 12C or a UART.

According to an embodiment of the disclosure, the cleaner body 1000 may detect whether the brush device 2000 is attached or detached, may identify the type of the brush device 2000, and may adaptively control the operation of the brush device 2000 (e.g., drum RPM) according to the usage environment state (e.g., hard floor, carpet, mat, corner, a state of being lifted from the surface to be cleaned, etc.). For example, the cleaner body 1000 may periodically communicate with the brush device 2000 to transmit, to the brush device 2000, a signal for controlling the operation of the brush device 2000. Hereinafter, the configuration of the cleaner body 1000 will be described in more detail with reference to FIG. 3.

Figure 3:
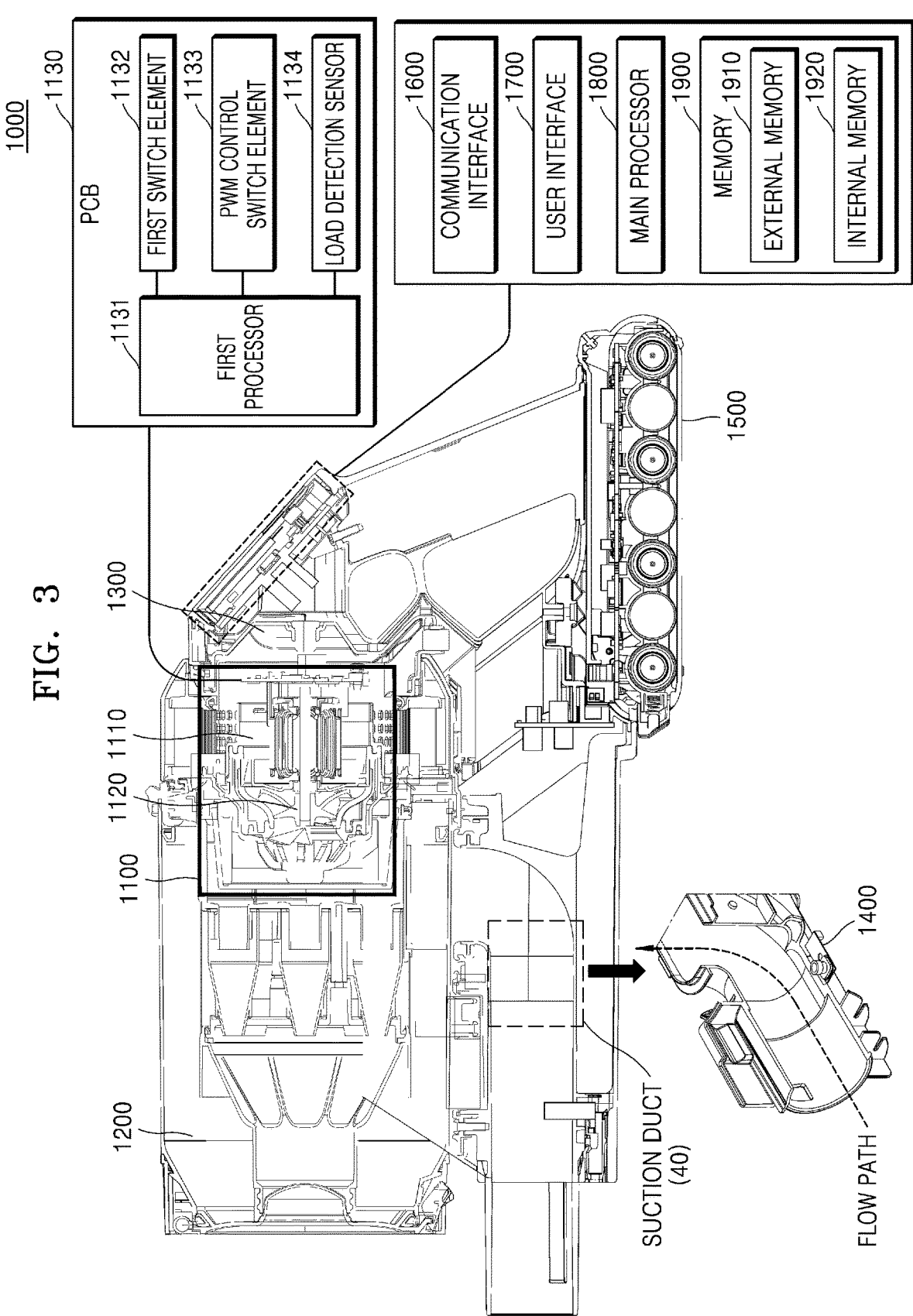
FIG. 3 is a diagram for describing a cleaner body according to an embodiment of the disclosure.

FIG. 3 is a diagram for describing a cleaner body 1000 according to an embodiment of the disclosure.

Referring to FIG. 3, the cleaner body 1000 may include a suction force generator (hereinafter referred to as a motor assembly) 1100 that generates suction force required to suck up foreign matters on the surface to be cleaned, a dust collector (also referred to as a dust container) 1200 that contains foreign matters sucked up from the surface to be cleaned, a filter 1300, a pressure sensor 1400, a battery 1500 capable of supplying power to the motor assembly 1100, a communication interface 1600, a user interface 1700, at least one processor 1001 (e.g., a main processor 1800), and a memory 1900 However, all of the elements illustrated in FIG. 3 are not essential elements. The cleaner body 1000 may be implemented with more elements than the elements illustrated in FIG. 3, or may be implemented with fewer elements than the elements illustrated in FIG. 3.

The respective elements will be described below.

The motor assembly 1100 may include a suction motor 1110 that converts electric force into mechanical rotational force, a fan 1120 that is connected to the suction motor 1110 and rotates, and a driving circuit (printed circuit board (PCB)) 1130 connected to the suction motor 1110. The suction motor 1110 may form a vacuum inside the cordless vacuum cleaner 100. The "vacuum" refers to a state lower than atmospheric pressure. The suction motor 1110 may include a brushless direct current (BLDC) motor, but the disclosure is not limited thereto.

The driving circuit 1130 may include a processor (hereinafter referred to as a first processor 1131) that controls the suction motor 1110 and controls communication with the brush device 2000, a first switch element 1132 connected to the signal line, a switch element (hereinafter referred to as a pulse width modulation (PWM) control switch element 1133) (e.g., a field effect transistor (FET), a transistor, an insulated gate bipolar transistor (IGBT), etc.) that controls the supply of power to the brush device 2000, a load detection sensor 1134 (e.g., a shunt resistor, a shunt resistor and an amplifier circuit (OP-AMP), a current detection sensor, a (non-contact) magnetic field detection sensor, etc.) that detects the load of the brush device 2000, but the disclosure is not limited thereto. Hereinafter, for convenience of explanation, an FET will be described as an example of the PWM control switch element 1133, and a shunt resistor will be described as an example of the load detection sensor 1134.

The first processor 1131 may obtain data related to the state of the suction motor 1110 (hereinafter referred to as state data) and may transmit the state data of the suction motor 1110 to the main processor 1800. Also, the first processor 1131 may control (e.g., turn on or off) the operation of the first switch element 1132 connected to the signal line to transmit a signal (hereinafter referred to as a first signal) to the brush device 2000 through the signal line. The first switch element 1132 is an element capable of making the state of the signal line low. For example, the first switch element 1132 is an element capable of making the voltage of the signal line 0 V. The first signal may include data indicating at least one of a target RPM of the rotating brush of the brush device 2000, a target trip level of the brush device 2000, or power consumption of the suction motor 1110, but the disclosure is not limited thereto. For example, the first signal may include data for controlling a lighting device included in the brush device 2000. The first signal may be implemented with a preset number of bits. For example, the first signal may be implemented with 5 bits or 8 bits, and may have a transmission period of 10 ms per bit, but the disclosure is not limited thereto.

The first processor 1131 may detect a signal (hereinafter referred to as a second signal) transmitted from the brush device 2000 through the signal line. The second signal may include data indicating a current state of the brush device 2000, but the disclosure is not limited thereto. For example, the second signal may include data related to a currently operating condition (e.g., a current drum RPM, a current trip level, a current setting value of the lighting device, etc.). Also, the second signal may further include data indicating the type of the brush device 2000. The first processor 1131 may transmit, to the main processor 1800, data indicating the current state of the brush device 2000 or data indicating the type of the brush device 2000, which is included in the second signal.

The motor assembly 1100 may be located within the dust collector 1200. The dust collector 1200 may be configured to filter out and collect dust or dirt in the air introduced through the brush device 2000. The dust collector 1200 may be provided to be separable from the cleaner body 1000.

The dust collector 1200 may collect foreign matters through a cyclone method, for example, which separates foreign matters using centrifugal force. The air, from which foreign matters are removed through the cyclone method, may be discharged to the outside of the cleaner body 1000, and the foreign matters may be stored in the dust collector 1200. In one or more non-limiting embodiments, a multi-cyclone may be provided inside the dust collector 1200. The dust collector 1200 may be provided to collect foreign matters on the lower side of the multi-cyclone. The dust collector 1200 may include a dust collector door provided to open the dust collector 1200 when connected to the cleaning station. The dust collector 1200 may include a first dust collecting portion that collects primarily collected and relatively large foreign matters, and a second dust collecting portion that collect relatively small foreign matters that are collected by the multi-cyclone. Both the first dust collecting portion and the second dust collecting portion may be provided to be opened to the outside when the door of the dust collector is opened.

The filter 1300 may filter out ultra-fine dust that is not filtered out in the dust collector 1200. The filter 1300 may include a discharge port through which air passing through a filter element is discharged to the outside of the cordless vacuum cleaner 100. The filter 1300 may include a motor filter, a HEPA filter, and the like, but the disclosure is not limited thereto.

The pressure sensor 1400 may measure pressure inside a flow path (also referred to as flow path pressure). The pressure sensor 1400 provided at a suction end (e.g., a suction duct 40) may measure a change in flow velocity at a corresponding position by measuring static pressure. The pressure sensor 1400 may be an absolute pressure sensor or a relative pressure sensor. When the pressure sensor 1400 is an absolute pressure sensor, the main processor 1800 may use the pressure sensor 1400 to sense a first pressure value before operating the suction motor 1110. Also, the main processor 1800 may sense a second pressure value after driving the suction motor 1110 at a target RPM, and may use the difference between the first pressure value and the second pressure value as a pressure value inside the flow path. In this case, the first pressure value may be a pressure value caused by internal/external influences, such as weather, altitude, the state of the cordless vacuum cleaner 100, or the amount of dust introduced. The second pressure value may be a pressure value caused by internal/external influences, such as altitude, the state of the cordless vacuum cleaner 100, or the amount of dust introduced, and a pressure value caused by the driving of the suction motor 1110. The difference between the first pressure value and the second pressure value may be a pressure value caused by the driving of the suction motor 1110. Therefore, when the difference between the first pressure value and the second pressure value is used as the pressure value inside the flow path, internal/external influences other than the suction motor 1110 may be minimized.

The flow path pressure measured by the pressure sensor 1400 may be used to identify the current usage environment state of the brush device 2000 (e.g., the state of the surface to be cleaned (hard floor, carpet, mat, or corner), the state of being lifted from the surface to be cleaned, etc.), and may also be used to measure suction force that changes according to a degree of contamination of the dust collector 1200 or a degree of collection of dust.

The pressure sensor 1400 may be located at the suction end (e.g., the suction duct 40). The suction duct 40 may be a structure that connects the dust collector 1200 to the extension pipe 3000 or connects the dust collector 1200 to the brush device 2000, so that a fluid or airflow including foreign matters moves to the dust collector 1200. The pressure sensor 1400 may be located at the end of the straight portion of the suction duct 40 (or at the inflection point between the straight portion and the curved portion) of the suction duct 40, taking into the contamination of foreign matters and/or dust, but the disclosure is not limited thereto. The pressure sensor 1400 may be located in the middle of the straight portion of the suction duct 40. On the other hand, when the pressure sensor 1400 is located in the suction duct 40, the pressure sensor 1400 is located in front of the suction motor 1110 that generates suction force. Therefore, the pressure sensor 1400 may be implemented as a negative pressure sensor.

A case where the pressure sensor 1400 is located in the suction duct 40 is described as an example, but the disclosure is not limited thereto. The pressure sensor 1400 may be located at the discharge end (e.g., inside the motor assembly 1100). When the pressure sensor 1400 is located at the discharge end, the pressure sensor 1400 is located at the rear end of the suction motor 1110. Therefore, the pressure sensor 1400 may be implemented as a positive pressure sensor. Also, a plurality of pressure sensors 1400 may be provided in the cordless vacuum cleaner 100.

The battery 1500 may be detachably mounted on the cleaner body 1000. The battery 1500 may be electrically connected to a charging terminal provided in the station device 200. The battery 1500 may be charged by receiving power from the charging terminal.

The cleaner body 1000 may include the communication interface 1600 that communicates with an external device. For example, the cleaner body 1000 may communicate with the station device 200 (or the server device 300) through the communication interface 1600. The communication interface 1600 may include a short-range wireless communication interface and a long-range wireless communication interface. The short-range wireless communication interface may include a Bluetooth communication interface, a BLE communication interface, an NFC communication interface, a WLAN (Wi-Fi™) communication interface, a ZigBee communication interface, an IrDA communication interface, a WFD communication interface, a UWB communication interface, an Ant+ communication interface, and the like, but the disclosure is not limited thereto.

The user interface 1700 may be provided on a handle. The user interface 1700 may include an input interface and an output interface. The cleaner body 1000 may receive a user input related to the operation of the cordless vacuum cleaner 100 through the user interface 1700, and may output information related to the operation of the cordless vacuum cleaner 100. The input interface may include a power button, a suction force intensity control button, and the like. The output interface may include an LED display, an LCD, or a touch screen, but the disclosure is not limited thereto.

The cleaner body 1000 may include the at least one processor 1001. The cleaner body 1000 may include one processor or may include a plurality of processors. For example, the cleaner body 1000 may include a main processor 1800 connected to the user interface 1700, and a first processor 1131 connected to the suction motor 1110. The at least one processor 1001 may control overall operations of the cordless vacuum cleaner 100. For example, the at least one processor 1001 may determine power consumption (intensity of suction force) of the suction motor 1110, drum RPM of the brush device 2000, trip level of the brush device 2000, and the like.

The at least one processor 1001 according to the disclosure may include at least one of a CPU, a GPU, an APU, a MIC, a DSP, or an NPU. The at least one processor 1001 may be implemented in the form of an integrated SoC including one or more electronic components. The at least one processor 1001 may each be implemented as separate hardware (H/W). The at least one processor 1001 may also be referred to as a MICOM, an MPU, or an MCU.

The at least one processor 1001 according to the disclosure may be implemented as a single core processor or may be implemented as a multicore processor.

The memory 1900 may store programs for processing and control by the at least one processor 1001, and may store input and/or output data. For example, the memory 1900 may store a pre-trained AI model (e.g., a support vector machine (SVM) algorithm, etc.), state data of the suction motor 1110, measured values of the pressure sensor 1400, state data of the battery 1500, state data of the brush device 2000, error occurrence data (failure history data), power consumption of the suction motor 1110 corresponding to an operating condition, RPM of the drum with the rotating brush, trip level, and the like. The trip level is for preventing overload of the brush device 2000, and may refer to a reference load value (e.g., a reference current value) for stopping the operation of the brush device 2000.

The memory 1900 may include an external memory 1910 and an internal memory 1920. The memory 1900 may include, for example, at least one type of storage medium selected from flash memory-type memory, hard disk-type memory, multimedia card micro-type memory, card-type memory (e.g., SD or XD memory), RAM, SRAM, ROM, EEPROM, PROM, magnetic memory, magnetic disc, and optical disc. Programs stored in the memory 1900 may be classified into a plurality of modules according to the functions thereof.

Hereinafter, operations of processors of the cordless vacuum cleaner 100 will be described in detail with reference to FIG. 4.

Figure 4:
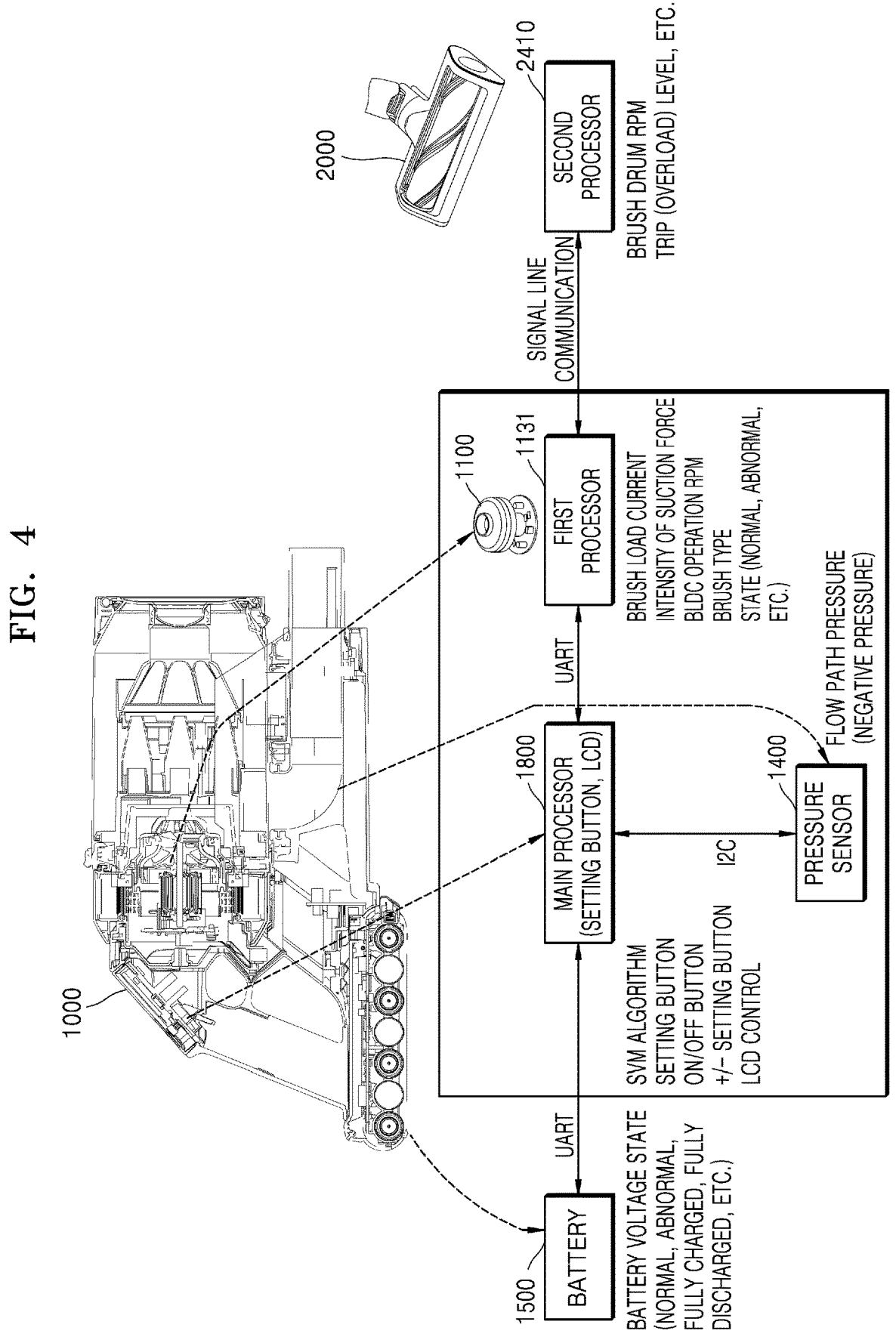
FIG. 4 is a diagram for describing operations of processors of a cordless vacuum cleaner, according to an embodiment of the disclosure.

FIG. 4 is a diagram for describing operations of the processors of the cordless vacuum cleaner 100, according to an embodiment of the disclosure.

Referring to FIG. 4, the main processor 1800 may communicate with the battery 1500, the pressure sensor 1400, and the first processor 1131 in the motor assembly 1100 and identify the states of the elements in the cordless vacuum cleaner 100. In this case, the main processor 1800 may communicate with the respective elements by using UART or I2C, but the disclosure is not limited thereto. For example, the main processor 1800 may obtain, from the battery 1500, data related to the voltage state (e.g., normal, abnormal, fully charged, fully discharged, etc.) of the battery 1500 by using UART. The main processor 1800 may obtain, from the pressure sensor 1400, data related to flow path pressure by using the I2C.

Also, the main processor 1800 may obtain, from the first processor 1131 connected to the suction motor 1110, data related to the intensity of the suction force, the RPM of the suction motor 1110, and the state (e.g., normal, abnormal, etc.) of the suction motor 1110 by using the UART. The suction force is electric force consumed for operating the cordless vacuum cleaner 100, and may be referred to as power consumption. The main processor 1800 may obtain, from the first processor 1131, data related to the load of the brush device 2000 and data related to the type of the brush device 2000.

On the other hand, the first processor 1131 may obtain, from the brush device 2000, state data (e.g., drum RPM, trip level, normal, abnormal, etc.) of the brush device 2000 through signal line communication with the second processor 2410 of the brush device 2000. In this case, the first processor 1131 may transmit state data of the brush device 2000 to the main processor 1800 through the UART. According to an embodiment of the disclosure, the first processor 1131 may transmit state data of the suction motor 1110 and state data of the brush device 2000 to the main processor 1800 at different cycles. For example, the first processor 1131 may transmit state data of the suction motor 1110 to the main processor 1800 once every 0.02 seconds, and may transmit state data of the brush device 2000 to the main processor 1800 once every 0.2 seconds, but the disclosure is not limited thereto.

The main processor 1800 may determine whether an error has occurred, based on the states of the elements in the cordless vacuum cleaner 100, the state of the suction motor 1110, and the state of the brush device 2000, and may periodically transmit data related to error occurrence to the station device 200 through short-range wireless communication (e.g., BLE communication).

When the first processor 1131 of the cleaner body 1000 and the second processor 2410 of the brush device 2000 are connected to each other through UART or I2C, circuit elements may be damaged by high impedance due to internal wires of the extension pipe 3000, electrostatic discharge (ESD), and/or overvoltage (for example, the maximum voltage of the MICOM AD port may be exceeded). Accordingly, according to an embodiment of the disclosure, the first processor 1131 of the cleaner body 1000 and the second processor 2410 of the brush device 2000 may communicate with each other through signal line communication instead of UART or I2C. In this case, the circuit for signal line communication may include a voltage divider circuit (hereinafter referred to as a voltage divider) in order to prevent damage to circuit elements caused by overvoltage, power noise, surge, ESD, electrical overstress (EOS), electrical discharge, etc. However, communication between the first processor 1131 of the cleaner body 1000 and the second processor 2410 of the brush device 2000 is not limited to signal line communication.

According to an embodiment of the disclosure, when a noise reduction circuit is applied to the cleaner body 1000 and the brush device 2000, the first processor 1131 of the cleaner body 1000 and the second processor 2410 of the brush device 2000 may communicate with each other by using UART or I2C. The noise reduction circuit may include at least one of a low-pass filter, a high-pass filter, a band-pass filter, a damping resistor, or a distribution resistor, but the disclosure is not limited thereto. According to an embodiment of the disclosure, when a level shifter circuit is applied to the cleaner body 1000 or the brush device 2000, the first processor 1131 of the cleaner body 1000 and the second processor 2410 of the brush device 2000 may communicate with each other by using UART or I2C. Hereinafter, for convenience of explanation, a case where the cleaner body 1000 and the brush device 2000 communicate with each other through signal line communication will be described as a main example.

On the other hand, the main processor 1800 may receive a user input for a setting button included in the user interface 1700 (e.g., ON/OFF button, +/– setting button) and may control the output of the LCD. The main processor 1800 may use a pre-trained AI model (e.g., SVM algorithm) to identify the usage environment state of the brush device 2000 (e.g., the state of the surface to be cleaned (hard floor, carpet, mat, corner, etc.), the state of being lifted from the surface to be cleaned, etc.), and may determine operation information (e.g., power consumption of the suction motor 1110, drum RPM, trip level, etc.) of the cordless vacuum cleaner 100 suitable for the usage environment state of the brush device 2000. In this case, the main processor 1800 may transmit, to the first processor 1131, operation information of the cordless vacuum cleaner 100 suitable for the usage environment state of the brush device 2000. The first processor 1131 may actively adjust the intensity of the suction force (power consumption or RPM) of the suction motor 1110 according to the operation information of the cordless vacuum cleaner 100, and may transmit, to the second processor 2410, operation information of the cordless vacuum cleaner 100 suitable for the usage environment state of the brush device 2000 through signal line communication. In this case, the second processor 2410 may adjust the drum RPM, the trip level, the lighting device (e.g., LED display), and the like according to the operation information of the cordless vacuum cleaner 100. The operation by which the main processor 1800 uses the pre-trained AI model (e.g., SVM algorithm) to identify the usage environment state of the brush device 2000 and determines the operation information of the cordless vacuum cleaner 100 suitable for the usage environment state of the brush device 2000 will be described in detail below with reference to FIG. 10. Hereinafter, the brush device 2000 will be described in more detail with reference to FIG. 5.

Figure 5:
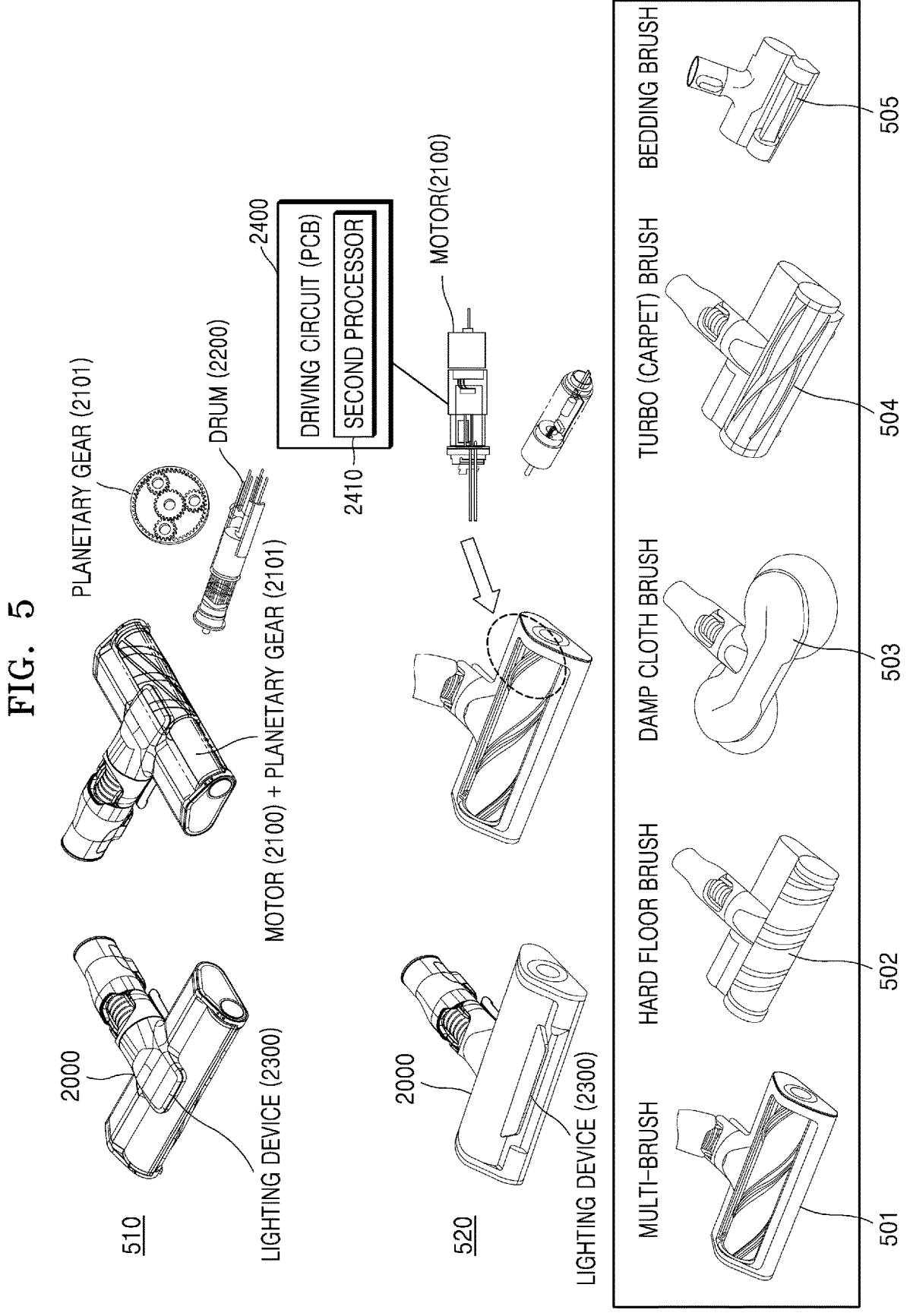
FIG. 5 is a diagram for describing a brush device according to an embodiment of the disclosure.

FIG. 5 is a diagram for describing a brush device 2000 according to an embodiment of the disclosure. Although a brush device is described, it should be appreciated that a different subdivision of vacuum attachments can be applicable without departing from the scope of the invention.

Referring to FIG. 5, the brush device 2000 may include a motor 2100, a drum 2200 to which a rotating brush is attached, and a lighting device 2300. The motor 2100 of the brush device 2000 may be provided inside the drum 2200, or may be provided outside the drum 2200. When the motor 2100 is provided outside the drum 2200, the drum 2200 may receive power from the motor 2100 through a belt.

Referring to 510 of FIG. 5, the motor 2100 may be a planetary geared motor. The planetary geared motor may be a motor in which a planetary gear 2101 is coupled to a DC motor. The planetary gear 2101 aims to adjust the RPM of the drum 2200 according to a gear ratio. In the case of the planetary geared motor, the RPM of the motor 2100 and the RPM of the drum 2200 may have a constant ratio. Referring to 520 of FIG. 5, the motor 2100 may be a BLDC motor, but the disclosure is not limited thereto. When the motor 2100 is a BLDC motor, the RPM of the motor 2100 may be equal to the RPM of the drum 2200.

The lighting device 2300 aims to illuminate a dark surface to be cleaned, to illuminates the surface to be cleaned so as to easily identify dust or foreign matters, or to indicate the state of the brush device 2000. The lighting device 2300 may be provided on the front surface or the upper end of the brush device 2000. The lighting device 2300 may include an LED display, but the disclosure is not limited thereto. Examples of the lighting device 2300 may include a laser. The lighting device 2300 may operate automatically as the motor 2100 is driven, or may operate under the control of the second processor 2410. According to an embodiment of the disclosure, the lighting device 2300 may change color or brightness under the control of the second processor 2410.

Referring to 520 of FIG. 5, the brush device 2000 may further include a driving circuit (PCB) 2400. The driving circuit 2400 may include a circuit for signal line communication with the cleaner body 1000. For example, the driving circuit 2400 may include the second processor 2410, a switch element (not shown) connected to a signal line (hereinafter also referred to as a second switch element), and an identification resistor (not shown) indicating the type of the brush device 2000, but the disclosure is not limited thereto.

On the other hand, the type of the brush device 2000 may be diverse. For example, the brush device 2000 may include a multi-brush 501, a hard floor brush 502, a damp cloth brush 503, a turbo (carpet) brush 504, a bedding brush 505, a bristle brush (not shown), a crevice brush (not shown), a pet brush (not shown), and the like, but the disclosure is not limited thereto.

According to an embodiment of the disclosure, the type of the brush device 2000 may be distinguished by the identification resistor included in the brush device 2000. An operation of identifying the type of the brush device 2000 coupled to the cordless vacuum cleaner 100 in the cleaner body 1000 will be described with reference to FIG. 6.

FIG. 6 is a diagram for describing the operation of identifying the type of the brush device 2000 in the cleaner body 1000, according to an embodiment of the disclosure.

Referring to FIG. 6, the motor assembly 1100 of the cleaner body 1000 may include the first processor 1131 and the load detection sensor 1134 (e.g., shunt resistor), and the brush device 2000 may include the identification resistor 2500. The identification resistor 2500 may be between the power lines 10 and 20 and the signal line 30. The identification resistor 2500 represents the type of the brush device 2000 and may be different for each type of the brush device 2000. For example, the identification resistor 2500 of the multi-brush 501 may be 330 KΩ, the identification resistor 2500 of the hard floor brush 502 may be 2.2 MΩ, and the identification resistor 2500 of the turbo (carpet) brush 504 may be 910 KΩ, but the disclosure is not limited thereto.

The first processor 1131 may detect whether the brush device 2000 is detached by using the load detection sensor 1134. For example, when the brush device 2000 is not coupled to the cordless vacuum cleaner 100 (e.g., in the case of a handy mode), the operating current of the brush device 2000 detected by the load detection sensor 1134 may be zero. On the other hand, when the brush device 2000 coupled to the cordless vacuum cleaner 100 (e.g., in the case of a brush mode), the operating current of the brush device 2000 detected by the load detection sensor 1134 may be 50 mA or more. Therefore, when the operating current of the brush device 2000 detected by the load detection sensor 1134 is zero, the first processor 1131 may determine that the brush device 2000 is detached, and when the operating current of the brush device 2000 detected by the load detection sensor 1134 is 50 mA or more, the first processor 1131 may determine that the brush device 2000 is coupled. On the other hand, a reference operating current value for determining that the brush device 2000 is coupled is not limited to 50 mA and may be changed.

When the first processor 1131 determines that the brush device 2000 is coupled to the cordless vacuum cleaner 100, the first processor 1131 may identify the type of the brush device 2000, based on the voltage value input to the input port of the first processor 1131. For example, when the brush device 2000 includes an identification resistor A and the driving circuit 1130 of the cleaner body 1000 includes a voltage divider (a resistor B and a resistor C) connected to the signal line 30, the voltage value input to the input port of the first processor 1131 may be as follows.

$$\text{Input voltage of } AD \text{ port} = \text{Battery supply voltage} * \frac{C}{A+B+C}$$

The voltage value input to the input port of the first processor 1131 may decrease as the value of the identification resistor 2500 increases. When the resistor B and the resistor C are constant, the voltage value input to the input port of the first processor 1131 varies according to the value of the identification resistor A. Accordingly, the first processor 1131 may identify the type of the brush device 2000 corresponding to the identification resistor 2500, based on the voltage value input to the input port of the first processor 1131. This will be described with reference to FIG. 7.

FIG. 7 is a diagram for describing the identification resistor (ID resistor) of the brush device 2000, according to an embodiment of the disclosure.

Referring to the table 700 of FIG. 7, the identification resistor of the multi-brush 501 is 330 KΩ, the identification resistor of the hard floor brush 502 may be 2.2 MΩ, and the identification resistor of the turbo (carpet) brush 504 may be 910 KΩ. In a case where the voltage of the battery 1500 is 25.2 V, the voltage value input to the input port of the first processor 1131 when the multi-brush 501 is coupled to the cordless vacuum cleaner 100 is 2.785 V, the voltage value input to the input port of the first processor 1131 when the hard floor brush 502 is coupled to the cordless vacuum cleaner 100 is 0.791 V, and the voltage value input to the input port of the first processor 1131 when the turbo (carpet) brush 504 is coupled to the cordless vacuum cleaner 100 may be 1.563 V. Therefore, in a state where the first processor 1131 determines that the brush device 2000 is coupled to the cordless vacuum cleaner 100 and the voltage of the battery 1500 is 25.2 V, when the voltage value input to the input port is 2.785 V, the first processor 1131 may identify that the multi-brush 501 is coupled to the cordless vacuum cleaner 100. When the voltage value input to the input port is 0.791 V, the first processor 1131 may identify that the hard floor brush 502 is coupled to the cordless vacuum cleaner 100. When the voltage value input to the input port is 1.563 V, the first processor 1131 may identify that the turbo (carpet) brush 504 is coupled to the cordless vacuum cleaner 100.

Hereinafter, a communication method of the station device 200 that downloads a new version of software to the cordless vacuum cleaner 100 will be described in detail with reference to FIG. 8.

Figure 8:
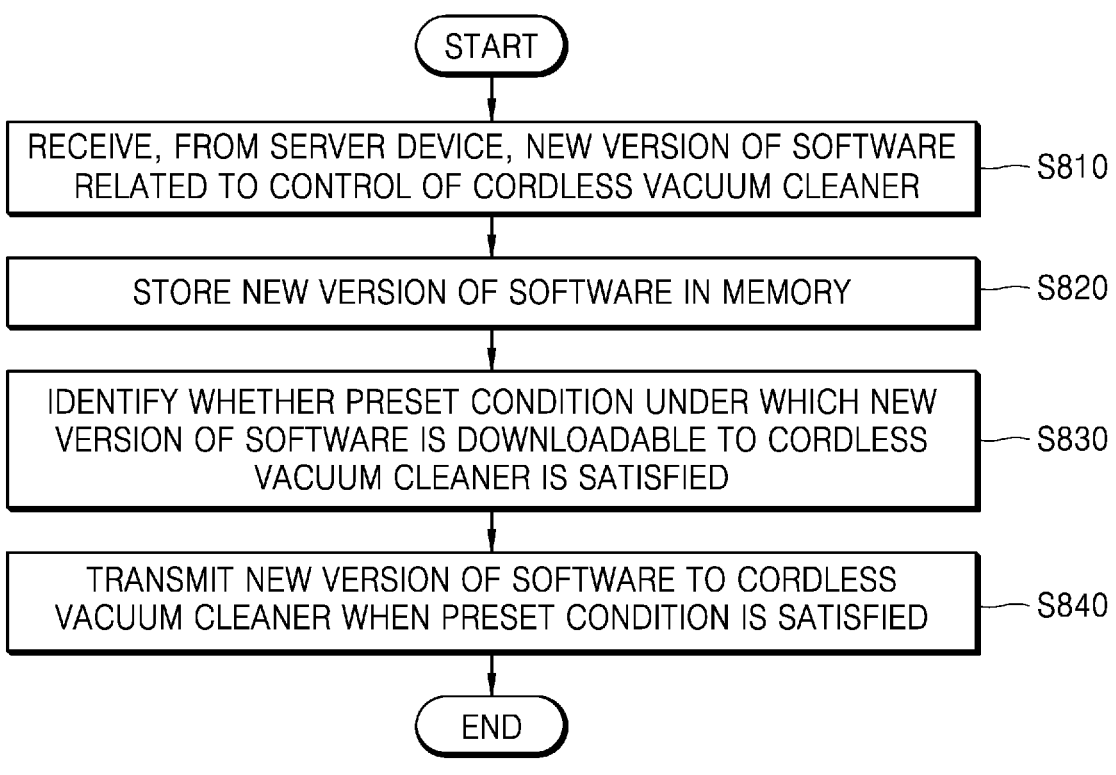
FIG. 8 is a flowchart of a communication method of a station device, according to an embodiment of the disclosure.

FIG. 8 is a flowchart of the communication method of the station device 200, according to an embodiment of the disclosure.

In operation S810, the station device 200 according to an embodiment of the disclosure may receive, from the server device 300, a new version of software related to control of the cordless vacuum cleaner 100.

According to an embodiment of the disclosure, when the new version of software related to control of the cordless vacuum cleaner 100 is registered in the server device 300, the station device 200 may receive, from the server device 300, the new version of software related to control of the cordless vacuum cleaner 100. The new version of software may be registered in the server device 300 by a system administrator's setting, or may be registered in the server device 300 by a user's setting. For example, when a new function is added to the cordless vacuum cleaner 100, the system administrator may register, in the server device 300, the new version of software related to control of the cordless vacuum cleaner 100.

According to an embodiment of the disclosure, the station device 200 may be connected to the server device 300 through Wi-Fi™ communication. The station device 200 may be authorized to access the server device 300 by transmitting identification information or account information to the server device 300. Also, the station device 200 may download the new version of software from the server device 300 through Wi-Fi™ communication.

According to an embodiment of the disclosure, the station device 200 may periodically identify version information of software registered in the server device 300 and version information of software installed on the cordless vacuum cleaner 100. When the version information of the software registered in the server device 300 is different from the version information of the software installed on the cordless vacuum cleaner 100, the station device 200 may identify that the new version of software is registered in the server device 300. For example, when the version of software installed on the cordless vacuum cleaner 100 is "1.0" and the version of software registered in the server device 300 is "1.1," the station device 200 may determine that the software registered in the server device 300 is the new version of software. Accordingly, the station device 200 may download the new version of software from the server device 300. An operation by which the station device 200 periodically checks the version information of the software registered in the server device 300 and the version information of software installed on the cordless vacuum cleaner 100 will be described below with reference to FIG. 13.

On the other hand, according to an embodiment of the disclosure, when the new version of software is registered in the server device 300, the server device 300 may transmit, to the user terminal, a notification that the new version of software is registered. In this case, when the server device 300 receives a software update request from the user through the user terminal, the server device 300 may transmit the new version of software to the station device 200. In this case, the station device 200 may receive the new version of software from the server device 300 before identifying that the new version of software is registered in the server device 300. The operation by which the station device 200 receives the new version of software from the server device 300 in response to the software update request through the user terminal will be described in detail below with reference to FIG. 18.

According to an embodiment of the disclosure, the software related to control of the cordless vacuum cleaner 100 may include an AI model trained to infer the usage environment state of the brush device 2000, a control algorithm related to the operation mode of the cordless vacuum cleaner 100 (e.g., jet mode, super-strong mode, strong mode, normal mode, weak mode, etc.), a control algorithm related to an AI mode (e.g., an algorithm for automatically controlling the intensity force of the suction motor 1110 or the drum RPM according to the usage environment of the brush device 2000), an algorithm for diagnosing the state of the cordless vacuum cleaner 100 (e.g., filter clogging, flow path clogging, overload of the brush device 2000, misassembly, etc.), and the like, but the disclosure is not limited thereto. The software related to control of the cordless vacuum cleaner 100 will be described in more detail below with reference to FIGS. 9 to 12.

On the other hand, the new version of software related to control of the cordless vacuum cleaner 100 may include a new version of an AI model trained to additionally infer a new usage environment state, a new AI model corresponding to a new type of the brush device 2000, an AI model updated (renewed or refined) by additional learning, a control algorithm related to an operation mode newly added to the cordless vacuum cleaner 100, a new algorithm for controlling at least one of RPM of a rotating brush of the new type of the brush device 2000 connected to the cordless vacuum cleaner 100, trip level, or setting values of the lighting device 2300, an updated diagnostic algorithm, or the like, but the disclosure is not limited thereto. A situation in which the new version of software is generated will be described in detail below with reference to FIGS. 21 to 26.

In operation S820, the station device 200 according to an embodiment of the disclosure may store, in the memory 202, the new version of software received from the server device 300. For example, the station device 200 may download the new version of software to the internal memory of the processor 203. While the station device 200 downloads the new version of software to its internal memory, the operation of the processor 203 of the station device 200 may be partially restricted.

In operation S830, the station device 200 according to an embodiment of the disclosure may identify whether the station device 200 satisfies a preset condition under which the new version of software related to control of the cordless vacuum cleaner 100 is downloadable to the cordless vacuum cleaner 100.

The preset condition may include at least one of a condition for communication connection with the cordless vacuum cleaner 100 or a condition for a docking state of the cordless vacuum cleaner 100, but the disclosure is not limited thereto. The preset condition may include a preset download time condition, an operating state condition of the cordless vacuum cleaner 100, a condition for a remaining battery level of the battery 1500, and the like.

When the preset condition is a condition for communication connection with the cordless vacuum cleaner 100, the station device 200 may determine that the preset condition is satisfied when a short-range wireless communication channel (e.g., a BLE communication channel) with the cordless vacuum cleaner 100 is established.

When the preset condition includes a condition for communication connection with the cordless vacuum cleaner 100 and a condition for a docking state of the cordless vacuum cleaner 100, the station device 200 may determine that the preset condition is satisfied when short-range wireless communication (e.g., BLE communication) with the cordless vacuum cleaner 100 is possible in a state where the cordless vacuum cleaner 100 is docked on the station device 200.

When the preset condition includes a condition for communication connection with the cordless vacuum cleaner 100 and a condition for a remaining battery level of the battery 1500, the station device 200 may determine that the preset condition is satisfied when short-range wireless communication (e.g., BLE communication) with the cordless vacuum cleaner 100 is possible and the remaining battery level of the battery 1500 of the cordless vacuum cleaner 100 is equal to or greater than a threshold value (e.g., 50%). That is, even though the cordless vacuum cleaner 100 is not docked on the station device 200, when the cordless vacuum cleaner 100 is located within the short-range wireless communication radius of the station device 200, the station device 200 may determine that the preset condition is satisfied.

When the preset condition includes a condition for communication connection with the cordless vacuum cleaner 100 and a condition for a preset download time (e.g., morning (am) or afternoon/evening (pm)), the station device 200 may determine that the preset condition is satisfied when short-range wireless communication (e.g., BLE communication) with the cordless vacuum cleaner 100 is possible and the preset download time (e.g., 2:00 am) is reached. The download time may be set or changed by the system administrator or the user. The operation by which the station device 200 determines that the preset condition is satisfied when the preset download time is reached will be described in detail below with reference to FIG. 19.

In operation S840, when the preset condition is satisfied, the station device 200 according to an embodiment of the disclosure may transmit, to the cordless vacuum cleaner 100, the new version of software related to control of the cordless vacuum cleaner 100.

For example, when the preset condition includes a condition for communication connection with the cordless vacuum cleaner 100 and a condition for a docking state of the cordless vacuum cleaner 100, the station device 200 may automatically download, to the cordless vacuum cleaner 100, the new version of software related to control of the cordless vacuum cleaner 100 when short-range wireless communication (e.g., BLE communication) with the cordless vacuum cleaner 100 is possible in a state where the cordless vacuum cleaner 100 is docked on the station device 200.

According to an embodiment of the disclosure, the station device 200 may transmit the new version of software to the cordless vacuum cleaner 100 through short-range wireless communication. For example, the station device 200 may transmit the new version of software to the cordless vacuum cleaner 100 through BLE communication. Because the data packet size of BLE communication is very small, the station device 200 may transmit the new version of software to the cordless vacuum cleaner 100 through BLE communication for a long time.

When the communication connection between the station device 200 and the cordless vacuum cleaner 100 is interrupted because the user separates the cordless vacuum cleaner 100 from the station device 200 while the station device 200 transmits the new version of software to the cordless vacuum cleaner 100, the station device 200 may stop transmitting the new version of software until the preset condition is satisfied again. Thereafter, when the preset condition is satisfied again, the station device 200 may transmit remaining data of the new version of software to the cordless vacuum cleaner 100. For example, when the user docks the cordless vacuum cleaner 100 on the station device 200 again, and thus, the communication between the station device 200 and the cordless vacuum cleaner 100 is reconnected, the station device 200 may transmit remaining data of the new version of software to the cordless vacuum cleaner 100.

When the station device 200 transmits the new version of software to the cordless vacuum cleaner 100, the cordless vacuum cleaner 100 may perform a software update, based on the new version of software. The operation by which the cordless vacuum cleaner performs a software update will be described in detail below with reference to FIG. 15. Hereinafter, an example of the software related to control of the cordless vacuum cleaner 100 will be described with reference to FIGS. 9 to 12.

Figure 9:
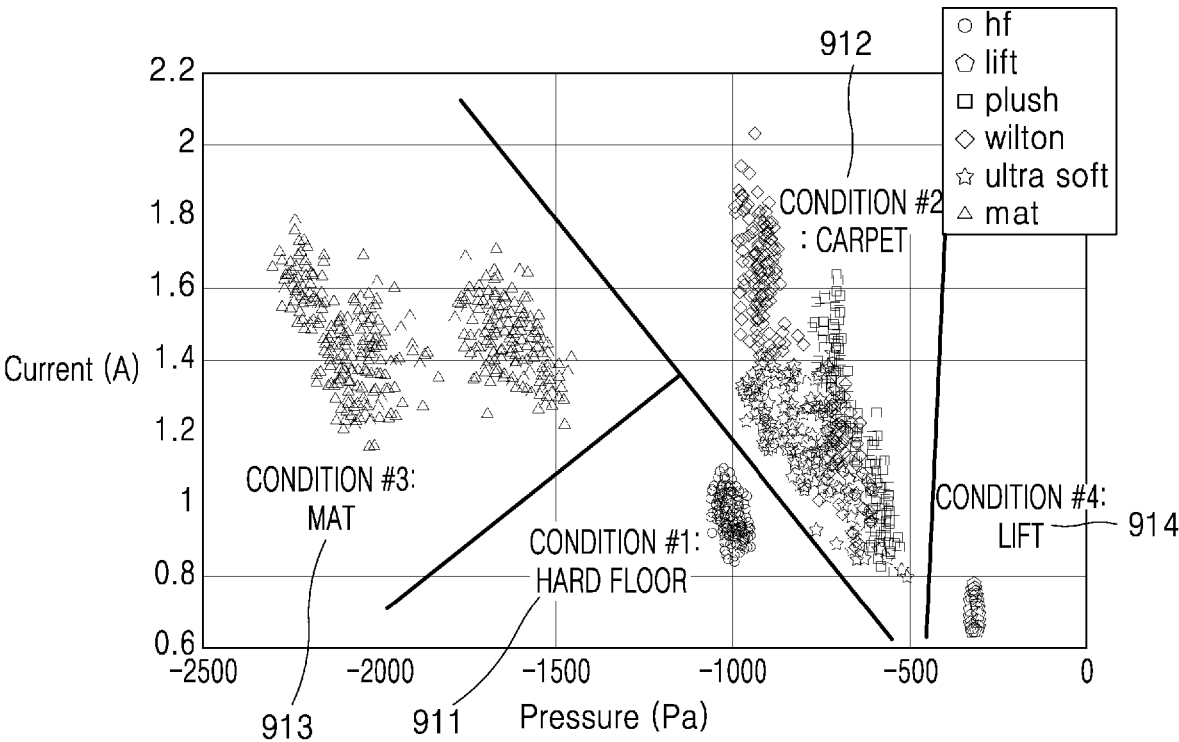
FIG. 9 is a diagram for describing an artificial intelligence (AI) model trained to infer a usage environment state of a brush device, according to an embodiment of the disclosure.

FIG. 9 is a diagram for describing the AI model trained to infer the usage environment state of the brush device 2000, according to an embodiment of the disclosure.

According to an embodiment of the disclosure, the software related to control of the cordless vacuum cleaner 100 may include the AI model trained to infer the usage environment state of the brush device 2000.

The AI model may be trained or updated (renewed or refined) in an external device (e.g., a server device or an external computing device), or may be trained or updated in the cleaner body 1000. For example, the cleaner body 1000 may receive the AI model trained in the external device and store the trained AI model in the memory 1900, and the at least one processor 1001 of the cleaner body 1000 may generate the AI model trained to infer the usage environment state of the brush device 2000 through training.

According to an embodiment of the disclosure, the usage environment state of the brush device 2000 may relate to an environment in which the brush device 2000 is being used during cleaning. For example, the usage environment state of the brush device 2000 may include at least one of the state of the surface to be cleaned on which the brush device 2000 is located, the relative position state of the brush device 2000 within the surface to be cleaned, or the state of the brush device 2000 being lifted from the surface to be cleaned, but the disclosure is not limited thereto. The surface to be cleaned may refer to a surface that comes into contact with the brush device 2000 during cleaning, for example, hard floor, bedding, or sofa. The state of the surface to be cleaned may refer to a material of the surface to be cleaned. For example, the state of the surface to be cleaned may include a hard floor 911, a normal carpet (normal load) 912, a high-density carpet (overload), a mat 913, and the like. The relative position state may include a floor center or floor middle, a floor side (wall surface), a corner, and the like. Hereinafter, for convenience of explanation, a mat state, a floor state, a carpet state, and a lifted state will be described as an example of various usage environment states.

According to an embodiment of the disclosure, the main processor 1800 of the cleaner body 1000 may input, to the prestored AI model, data related to flow path pressure obtained from the pressure sensor 1400 and data related to the load of the brush device 2000 obtained from the first processor 1131, and may obtain the current usage environment state of the brush device 2000 as an inference result of the AI model.

According to an embodiment of the disclosure, the load value of the brush device 2000 used as the input value of the AI model may vary according to the type of the brush device 2000. For example, when the brush device 2000 is the hard floor brush 502, the main processor 1800 may input operating current data of the hard floor brush 502 to the AI model corresponding to the hard floor brush 502. On the other hand, when the brush device 2000 is the multi-brush 501, power consumption (or operating current and applied voltage) of the multi-brush 501 may be input to the AI model corresponding to the multi-brush 501.

According to an embodiment of the disclosure, the AI model may include at least one of an SVM model, a neural network model, a random forest model, or a graphical model, but the disclosure is not limited thereto.

The SVM model may be an algorithm for generating a hyper plane with a maximum margin capable of classifying data in a three-dimensional space by using a kernel function. The random forest model may be an ensemble algorithm for training multiple decision trees and combining and predicting the results of the multiple decision trees. The neural network model may be an algorithm for deriving an output by combining a conversion function and weights for each input value. The graphical model may be an algorithm for representing independency between random variables as a graph. In this case, the random variable is represented by a node, and conditional independency between the random variables may be represented by an edge.

Because the SVM model has relatively high accuracy and fast response speed, the operation of the cordless vacuum cleaner 100 may be quickly converted to an optimal specification. Hereinafter, a case where the AI model is the SVM model will be described as a main example.

The SVM model may be generated through supervised learning. The SVM model is a model that finds to which group the newly input data belongs among the learned groups after learning with labeled training data. According to an embodiment of the disclosure, the SVM model may be trained by using the load value of the brush device 2000 and the pressure value of the suction motor 1110 in a specific usage environment state as training data.

The trained SVM model may include at least one hyper plane for classifying the usage environment state. For example, the SVM model for predicting the usage environment state may include a hyper plane for distinguishing between the hard floor 911 and the carpet 912, a hyper plane for distinguishing between the hard floor 911 and the mat 913, and a hyper plane for distinguishing between the carpet 912 and the lift 914. The hyper planes may each be represented by a linear equation ($y=ax+b$). In the linear equation, a and b may each be a parameter, and the parameter may be modified according to the intensity force of the suction motor 1110, the type of the brush device 2000, the state of the cordless vacuum cleaner 100 (e.g., the amount of dust, etc.). Also, the equation of the hyper plane may be a higher order equation (e.g., $y=ax^2+b$, $y=ax^3+b$, etc.).

When cleaning the hard floor 911, the flow path pressure and the load of the brush device 2000 may be normal. When cleaning the mat 913, the flow path pressure and the load of the brush device 2000 may increase greatly. When cleaning the carpet 912, the flow path pressure may be normal, but the load of the brush device 2000 may increase greatly. When the brush device 2000 is in a lifted state, the flow path pressure and the load of the brush device 2000 may decrease greatly. Accordingly, when a normal flow path pressure value and a normal load value are input to the SVM model, the SVM model may output the 'hard floor 911' as the usage environment state of the brush device 2000. When a high flow path pressure value and a high load value are input to the SVM model, the SVM model may output the 'mat 913' as the usage environment state of the brush device 2000. When a normal flow path pressure value and a high load value are input to the SVM model, the SVM model may output the 'carpet 912' as the usage environment state of the brush device 2000. When a low flow path pressure value and a low load value are input to the SVM model, the SVM model may output the 'lift 1014' as the usage environment state of the brush device 2000. In this case, the hard floor 1011 may be mapped to a first operating condition, the carpet 1012 may be mapped to a second operating condition, the mat 1013 may be mapped to a third operating condition, and the lift 1014 may be mapped to a fourth operating condition.

According to an embodiment of the disclosure, when the equation defining the hyper plane of the SVM model is changed from a linear equation to a higher order equation, or when a new hyper plane is added to the SVM model, or when the SVM model is updated and the parameters change, the new version of software related to control of the cordless vacuum cleaner 100 may be registered in the server device 300.

FIG. 10 is a diagram for describing an algorithm for controlling power consumption of the suction motor 1110 or RPM of the rotating brush of the brush device 2000, according to an embodiment of the disclosure.

According to an embodiment of the disclosure, the cordless vacuum cleaner 100 may provide a normal mode 1011 and an AI mode 1012. The normal mode 1011 may be a manual mode in which the intensity force of the suction motor 1110 is adjusted according to the intensity (e.g., strong, medium, weak, etc.) selected by the user. The AI mode 1012 may be an automatic mode in which the intensity force of the suction motor 1110 or the drum RPM of the brush device 2000 is automatically adjusted according to the usage environment state of the brush device 2000 (e.g., the state of the surface to be cleaned (hard floor, carpet, mat, corner, etc.). The suction force is based on the electrical power (input power) consumed to operate the cordless vacuum cleaner 100, and the intensity of the suction force of the suction motor 1110 may be expressed as power consumption of the suction motor 1110.

According to the control algorithm corresponding to the normal mode 1011, when the user selects the strong mode, the cordless vacuum cleaner 100 may adjust the power consumption of the suction motor 1110 to 115 W and may adjust the drum RPM of the brush device 2000 to 3,800 rpm.

According to the control algorithm corresponding to the AI mode 1012, the cordless vacuum cleaner 100 may automatically or actively adjust the strength of the suction force of the suction motor 11110 according to the current usage environment state of the brush device 2000, which is inferred by the AI model. For example, when the state of the surface to be cleaned is changed from the hard floor to the carpet, the cordless vacuum cleaner 100 may increase the intensity of the suction force of the suction motor 1110 in order to improve cleaning performance. On the other hand, when the state of the surface to be cleaned is changed from the carpet to the hard floor again, the cordless vacuum cleaner 100 may lower the intensity of the suction force of the suction motor 1110 again in order to increase the usage time of the battery 1500, to reduce operation noise (e.g., drum friction noise of the brush device 2000, operation noise of the suction motor 1110, etc.), and to reduce damage (e.g., scratch, nick, wear, etc.) caused by friction with the surface to be cleaned by the rotation of the drum 2200 of the brush device 2000. When the state of the surface to be cleaned is changed from the hard floor to the mat, the cordless vacuum cleaner 100 may automatically lower the intensity of the suction force of the suction motor 1110 in order to increase operation convenience, to lower operation noise, and to reduce damage caused by friction with the surface to be cleaned by the rotation of the drum 2200 of the brush device 2000. When the brush device 2000 is in the state (idle state) of being lifted from the surface to be cleaned, the cordless vacuum cleaner 100 may lower the intensity of the suction force of the suction motor 1110 as much as possible in order to increase the usage time of the battery 1500 and to reduce operation noise.

According to the control algorithm corresponding to the AI mode 1012, the cordless vacuum cleaner 100 may control the operation of the brush device 2000 through communication between the cleaner body 1000 and the brush device 2000. The cordless vacuum cleaner 100 may adjust the motor rotation speed (e.g., drum RPM) of the brush device 2000, trip level, and setting values (e.g., color, brightness, etc.) of the lighting device 2300 according to the current usage environment state of the brush device 2000. For example, when the state of the surface to be cleaned is changed from the hard floor to the carpet, the cordless vacuum cleaner 100 may increase the motor rotation speed (e.g., drum RPM) of the brush device 2000 in order to improve cleaning performance. On the other hand, when the state of the surface to be cleaned is changed from the carpet to the hard floor again, the cordless vacuum cleaner 100 may lower the motor rotation speed (e.g., drum RPM) of the brush device 2000 again in order to increase the usage time of the battery 1500, to reduce operating noise, and to reduce damage (e.g., scratch, nick, wear, etc.) caused by friction with the surface to be cleaned. Also, when the brush device 2000 is in the state (idle state) of being lifted from the surface to be cleaned, the cordless vacuum cleaner 100 may lower the motor rotation speed (e.g., drum RPM) of the brush device 2000 to the maximum in order to increase the usage time of the battery 1500 and to reduce operation noise.

For example, referring to FIG. 10, the cordless vacuum cleaner 100 may operate as follows according to the control algorithm corresponding to the AI mode 1012. When the usage environment state of the brush device 2000 is determined as the hard floor (first condition), the cordless vacuum cleaner 100 may determine the power consumption of the suction motor 1110 to be 70 watts (W), and may determine the drum RPM of the brush device 2000 to be 2,000 rpm. When the usage environment state of the brush device 2000 is determined as the normal carpet (second condition), the cordless vacuum cleaner 100 may determine the power consumption of the suction motor 1110 to be 115 W, and may determine the drum RPM of the brush device 2000 to be 3,800 rpm. When the usage environment state of the brush device 2000 is determined as the high density carpet (third condition), the cordless vacuum cleaner 100 may determine the power consumption of the suction motor 1110 to be 40 W, and may determine the drum RPM of the brush device 2000 to be 2,000 rpm. When the usage environment state of the brush device 2000 is determined as the mat (fourth condition), the cordless vacuum cleaner 100 may determine the power consumption of the suction motor 1110 to be 58 W, and may determine the drum RPM of the brush device 2000 to be 1,500 rpm. When the usage environment state of the brush device 2000 is determined as the lift (fifth condition), the cordless vacuum cleaner 100 may determine the power consumption of the suction motor 1110 to be 40 W, and may determine the drum RPM of the brush device 2000 to be 1,500 rpm. When the usage environment state of the brush device 2000 is determined as the corner (sixth condition), the cordless vacuum cleaner 100 may determine the power consumption of the suction motor 1110 to be 150 W, and may determine the drum RPM of the brush device 2000 to be 2,000 rpm.

Therefore, according to the control algorithm corresponding to the AI mode, the cordless vacuum cleaner 100 may automatically adjust the intensity of the suction force of the suction motor 1110 or the motor rotation speed of the brush device 2000 according to the current usage environment state of the brush device 2000, which is inferred by the AI model, thereby efficiently improving cleaning performance, user's operation convenience, usage time of the battery 1500, operation noise (e.g., drum friction noise of the brush device, suction motor operation noise of the cleaner body, etc.), damage (e.g., scratch, nick, wear, etc.) caused by friction with the surface to be cleaned by the drum rotation of the brush device 2000.

According to an embodiment of the disclosure, when the power consumption or the drum RPM of the suction motor 1110 corresponding to the intensity of the suction force (e.g., jet, super strong, strong, normal, etc.) is changed, when the operating condition is added in the AI mode 1012, or when the control factor of the brush device 2000 (e.g., the color of the lighting device 2300) is added, the new version of software related to control of the cordless vacuum cleaner 100 may be registered in the server device 300.

Figure 11:
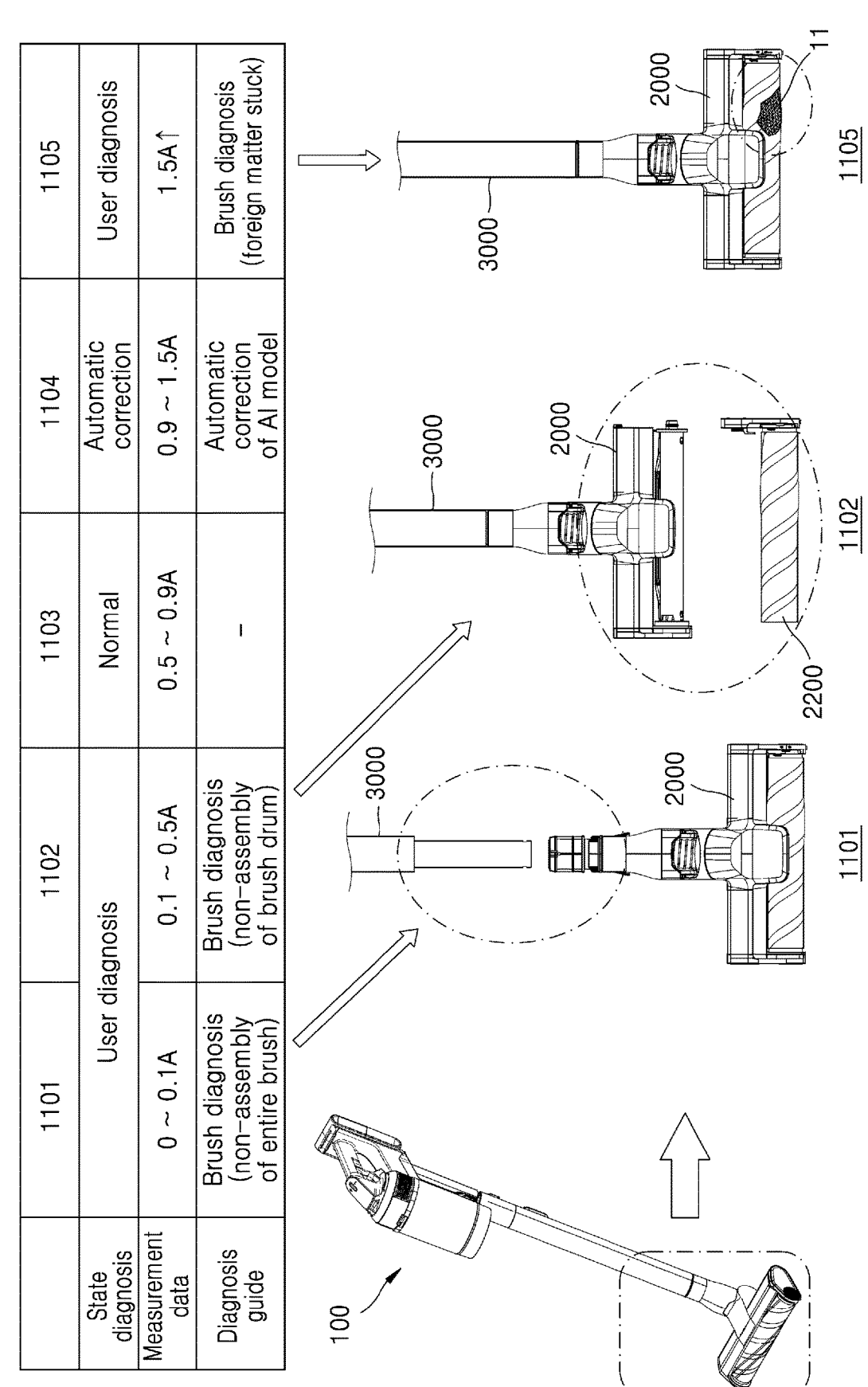
FIG. 11 is a diagram for describing an algorithm for diagnosing a state of a cordless vacuum cleaner, based on data related to a load of a brush device, according to an embodiment of the disclosure.

FIG. 11 is a diagram for describing an algorithm for diagnosing the state of the cordless vacuum cleaner 100, based on data related to the load of the brush device 2000, according to an embodiment of the disclosure.

According to an embodiment of the disclosure, the software related to control of the cordless vacuum cleaner 100 may include an algorithm for diagnosing the state of the cordless vacuum cleaner 100 (hereinafter referred to as a self-diagnosis algorithm), based on data related to the load of the brush device 2000. According to the algorithm for diagnosing the state of the cordless vacuum cleaner 100, the cordless vacuum cleaner 100 may predict an assembly state, a foreign matter stuck state, or the like of the brush device 2000, based on the operating electrical current of the brush device 2000 detected through the load detection sensor 1134, and may display guide information (notification) to the user or automatically modify the AI model.

For example, when the operating current of the brush device 2000 is 0 amps (A) to 0.1 A (1101), the cordless vacuum cleaner 100 may determine that the brush device 2000 is detached from the extension pipe 3000. In this case, the cordless vacuum cleaner 100 may output, to the user, a notification to confirm whether the brush device 2000 is coupled.

When the operating current of the brush device 2000 is 0.1 A to 0.5 A (1102), the cordless vacuum cleaner 100 may determine that the drum 2200 is not assembled to the brush device 2000. Therefore, the cordless vacuum cleaner 100 may output, to the user, a notification to confirm whether the drum 2200 is assembled.

When the operating current of the brush device 2000 is 0.5 A to 0.9 A (1103), the cordless vacuum cleaner 100 may determine that the state of the cordless vacuum cleaner 100 is normal. Also, when the operating current of the brush device 2000 is 0.9 A to 1.5 A (1104), the cordless vacuum cleaner 100 may determine that a small foreign matter (e.g., dust, hair, etc.) is caught in the brush device 2000. In this case, the cordless vacuum cleaner 100 may automatically modify parameter values of the AI model without outputting a separate notification to the user.

When the operating current of the brush device 2000 is 1.5 A or more (1105), the cordless vacuum cleaner 100 may determine that a large foreign matter 11 (e.g., paper, handkerchief, etc.) is caught in the brush device 2000. In this case, the cordless vacuum cleaner 100 may output, to the user, a notification to diagnose the state of the brush device 2000 or a notification to remove the large foreign matter 11 from the brush device 2000.

According to an embodiment of the disclosure, in an algorithm for diagnosing the state of the cordless vacuum cleaner 100, when the reference operating current value for classifying the state of the cordless vacuum cleaner 100 is modified or when the state of the cordless vacuum cleaner 100 is further subdivided, a new version of software related to control of the cordless vacuum cleaner 100 may be registered in the server device 300.

FIG. 12 is a diagram for describing an algorithm for diagnosing the state of the cordless vacuum cleaner 100, based on data related to flow path pressure inside the cordless vacuum cleaner 100, according to an embodiment of the disclosure.

According to an embodiment of the disclosure, the software related to control of the cordless vacuum cleaner 100 may include an algorithm for diagnosing the state of the cordless vacuum cleaner 100, based on data related to the flow path pressure inside the cordless vacuum cleaner 100. According to the algorithm for diagnosing the state of the cordless vacuum cleaner 100, the cordless vacuum cleaner 100 may predict the state of the dust collector 1200, the state of the flow path, and the like, based on the pressure value measured through the pressure sensor 1400, and may display guide information (notification) to the user or automatically modify the AI model.

For example, when the pressure value is 0 pascals (Pa) to 200 Pa (1201), the cordless vacuum cleaner 100 may determine that the dust collector 1200 is full of foreign matters and output, to the user, a notification to diagnose the dust collector 1200. When the pressure sensor 1400 is provided in the suction duct 40, the dust collector 1200 may be provided downstream (rear end) of air flow path rather than the pressure sensor 1400. Accordingly, as dust accumulates in the dust collector 1200, the pressure value measured by the pressure sensor 1400 decreases.

When the pressure value is 200 Pa to 300 Pa (1202), the cordless vacuum cleaner 100 may determine that the dust collector 1200 is slightly full of foreign matters. In this case the cordless vacuum cleaner 100 may automatically modify parameter values of the AI model without outputting a separate notification to the user.

When the pressure value is 300 Pa to 500 Pa (1203), the cordless vacuum cleaner 100 may determine that the state of the cordless vacuum cleaner 100 is normal. Also, when the pressure value is 500 Pa to 1,000 Pa (1204), the cordless vacuum cleaner 100 may determine that the flow path is slightly clogged by a small foreign matter (e.g., dust, hair, etc.). In this case, the cordless vacuum cleaner 100 may automatically modify parameter values of the AI model without outputting a separate notification to the user.

When the pressure value is 1,000 Pa or more (1205), the cordless vacuum cleaner 100 may determine that the flow path is clogged by a large foreign matter 12 (e.g., paper, handkerchief, etc.). In this case, the cordless vacuum cleaner 100 may output, to the user, a notification to diagnose the state of the brush device 2000 or a notification to remove the large foreign matter 12 from the brush device 2000. When the pressure sensor 1400 is provided in the suction duct 40, the extension pipe 3000 and the brush device 2000 may be provided upstream of air flow path rather than the pressure sensor 1400. Accordingly, when the extension pipe 3000 is clogged or when foreign matters are caught in the brush device 2000, the pressure value measured by the pressure sensor 1400 increases.

According to an embodiment of the disclosure, in an algorithm for diagnosing the state of the cordless vacuum cleaner 100, when the reference operating current value for classifying the state of the cordless vacuum cleaner 100 is modified or when the state of the cordless vacuum cleaner 100 is further subdivided, a new version of software related to control of the cordless vacuum cleaner 100 may be registered in the server device 300.

Figure 13:
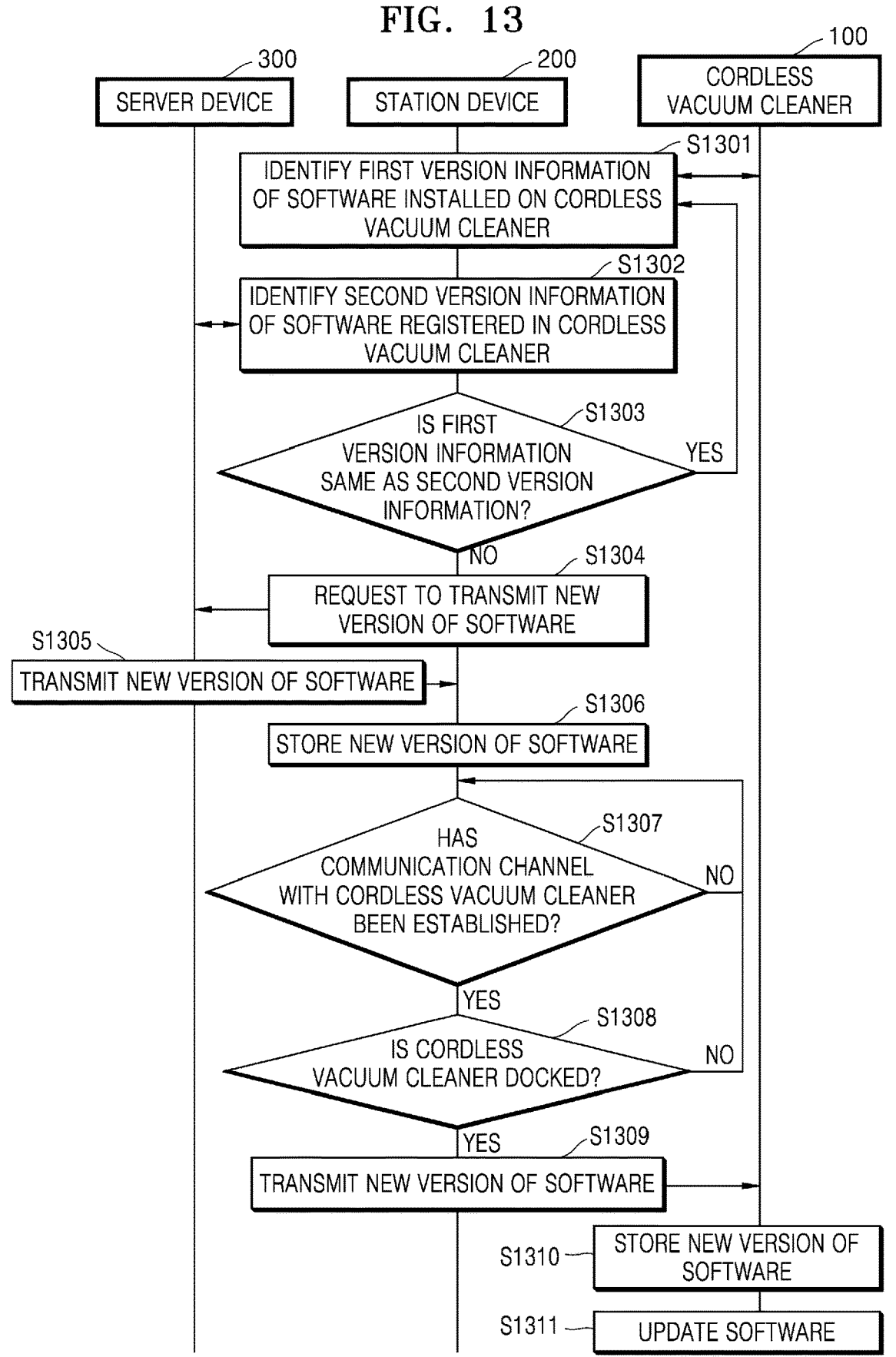
FIG. 13 is a flowchart of a method of updating software related to control of a cordless vacuum cleaner through a station device, according to an embodiment of the disclosure.

FIG. 13 is a flowchart of a method of updating software related to control of the cordless vacuum cleaner 100 through the station device 200, according to an embodiment of the disclosure.

In operation S1301, the station device 200 according to an embodiment of the disclosure may identify first version information of software installed on the cordless vacuum cleaner 100. For example, the station device 200 may receive, from the cordless vacuum cleaner 100, the first version information of the software installed on the cordless vacuum cleaner 100 through short-range wireless communication (e.g., BLE communication).

The station device 200 may periodically obtain the first version information of the software installed on the cordless vacuum cleaner 100. For example, the station device 200 may obtain the first version information of the software installed on the cordless vacuum cleaner 100 once a week, but the disclosure is not limited thereto.

According to an embodiment of the disclosure, when there is a request for the first version information from the station device 200, the cordless vacuum cleaner 100 may transmit the first version information to the station device 200. Alternatively, the cordless vacuum cleaner 100 may periodically transmit the first version information to the station device 200 even when there is no request for the first version information from the station device 200.

In operation S1302, the station device 200 according to an embodiment of the disclosure may identify second version information of the software registered in the server device 300. For example, the station device 200 may access the server device 300 through Wi-Fi™ communication and periodically identify the second version information of the software registered in the server device 300. In this case, the software may be software related to control of the cordless vacuum cleaner 100.

According to an embodiment of the disclosure, when a request is received from the station device 200, the server device 300 may transmit the second version information to the station device 200. Alternatively, when a new version of software related to control of the cordless vacuum cleaner 100 is registered, the server device 300 may transmit the second version information (information about the new version) to the station device 200.

In operation S1303, the station device 200 according to an embodiment of the disclosure may determine whether the first version information of the software installed on the cordless vacuum cleaner 100 is the same as the second version information of the software registered in the server device 300.

The station device 200 may periodically perform operations S1301 and S1302 when the first version information of the software installed on the cordless vacuum cleaner 100 is the same as the second version information of the software registered in the server device 300.

In operation S1304, when the first version information is different from the second version information, the station device 200 according to an embodiment of the disclosure may request the server device 300 to transmit the new version of software related to control of the cordless vacuum cleaner 100.

When the first version information is different from the second version information, the station device 200 may determine that the new version of software related to control of the cordless vacuum cleaner 100 is registered in the server device 300. Accordingly, the station device 200 may request the server device 300 to transmit the new version of software through Wi-Fi™ communication.

In operation S1305, the server device 300 according to an embodiment of the disclosure may transmit, to the station device 200, the new version of software related to control of the cordless vacuum cleaner 100 in response to the request of the station device 200.

In operation S1306, the station device 200 according to an embodiment of the disclosure may store the new version of software. For example, the station device 200 may store, in the memory 202 (e.g., internal memory), the new version of software related to control of the cordless vacuum cleaner 100 downloaded from the server device 300.

In operation S1307, the station device 200 according to an embodiment of the disclosure may identify whether a communication channel with the cordless vacuum cleaner 100 has been established. For example, the station device 200 may determine whether BLE communication with the cordless vacuum cleaner 100 is possible. When BLE communication with the cordless vacuum cleaner 100 is impossible, the station device 200 may continuously monitor the communication state without transmitting, to the cordless vacuum cleaner 100, the new version of software stored in the memory 202.

In operation S1308, the station device 200 according to an embodiment of the disclosure may identify whether the cordless vacuum cleaner 100 is in a docked state.

Figure 14:
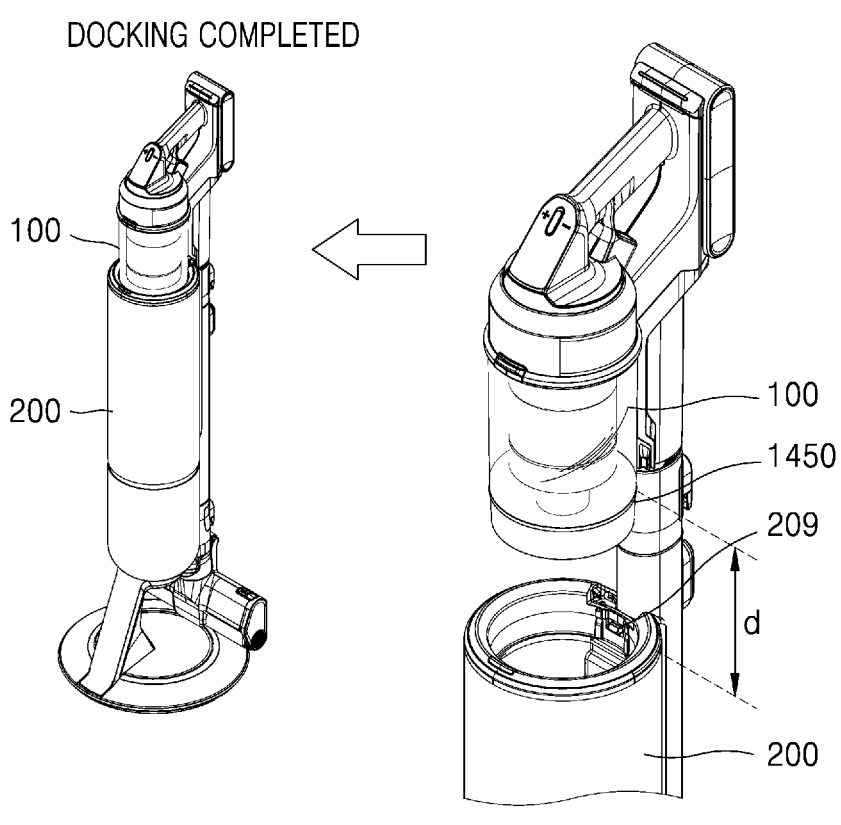
FIG. 14 is a diagram for describing an operation by which a station device detects whether a cordless vacuum cleaner is docked, according to an embodiment of the disclosure.

According to an embodiment of the disclosure, the station device 200 may use a docking detection sensor 209 to determine whether the cordless vacuum cleaner 100 is docked on the station device 200. For example, referring to FIG. 14, the cordless vacuum cleaner 100 may include a magnetic material 1450 and the station device 200 may include the docking detection sensor 209. The docking detection sensor 209 may be a TMR sensor, but the disclosure is not limited thereto.

When the user docks the cleaner body 1000 on the station device 200, a distance d between the magnetic material 1450 attached to the dust collector 1200 of the cleaner body 1000 and the docking detection sensor 209 becomes closer, and thus, the docking detection sensor 209 may detect the magnetic material 1450 attached to the dust collector 1200. When the docking detection sensor 209 detects the magnetic material 1450, the station device 200 may identify that the cordless vacuum cleaner 100 is docked thereon.

According to an embodiment of the disclosure, when the battery 1500 of the cleaner body 1000 is charged through the charging terminal of the station device 200, the station device 200 may detect power (current) charged in the battery 1500 of the cleaner body 1000 through the charging terminal. Accordingly, when the power (current) charged in the battery 1500 is detected, the station device 200 may identify that the cordless vacuum cleaner 100 is docked thereon.

According to an embodiment of the disclosure, when the battery 1500 of the cleaner body 1000 comes into contact with the charging terminal of the station device 200, the cleaner body 1000 may detect the charging start of the battery 1500. Accordingly, when the charging of the battery 1500 starts, the cleaner body 1000 may identify that the cleaner body 1000 is docked on the station device 200. In this case, the cleaner body 1000 may transmit, to the station device 200, information indicating that the cordless vacuum cleaner 100 is docked on the station device 200 through short-range wireless communication (e.g., BLE communication). The station device 200 may detect that the cordless vacuum cleaner 100 is docked, based on the information received from the cleaner body 1000.

In operation S1309, when communication with the cordless vacuum cleaner 100 is possible and the cordless vacuum cleaner 100 is docked on the station device 200, the station device 200 according to an embodiment of the disclosure may transmit, to the cordless vacuum cleaner 100, the new version of software stored in the memory 202. For example, the station device 200 may transmit the new version of software to the cordless vacuum cleaner 100 through short-range wireless communication (e.g., BLE communication). In this case, it may take a long time for the station device 200 to transmit the new version of software to the cordless vacuum cleaner 100 due to the restriction on the size of the short-range wireless communication packet.

In operation S1310, the cordless vacuum cleaner 100 according to an embodiment of the disclosure may store the new version of software received from the station device 200. For example, the cordless vacuum cleaner 100 may download the new version of software from the station device 200 and store the downloaded software in the external memory 1910 of the main processor 1800.

In step S1311, the cordless vacuum cleaner 100 according to an embodiment of the disclosure may update the previously installed software, based on the new version of software. For example, the cordless vacuum cleaner 100 may update the previously installed software by moving the new version of software stored in the external memory 1910 to the internal memory 1920.

The operation by which the cordless vacuum cleaner 100 performs the software update will be described in more detail with reference to FIG. 15.

Figure 15:
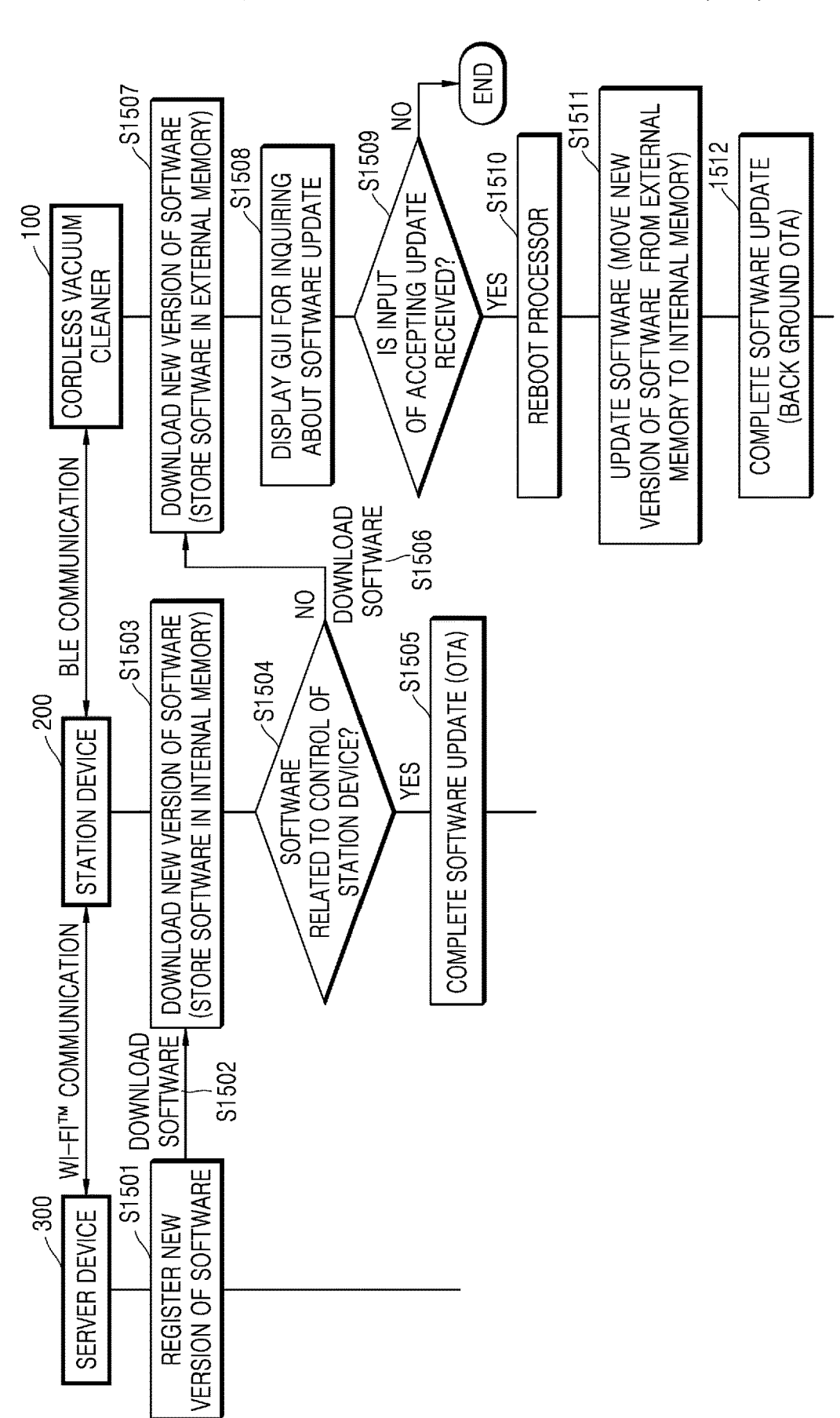
FIG. 15 is a flowchart of a software update method of a station device and a cordless vacuum cleaner, according to an embodiment of the disclosure.

FIG. 15 is a flowchart of the software update method of the station device 200 and the cordless vacuum cleaner 100, according to an embodiment of the disclosure.

In operation S1501, the server device 300 according to an embodiment of the disclosure may register a new version of software. The new version of software may include software related to control of the station device 200 or software related to control of the cordless vacuum cleaner 100, but the disclosure is not limited thereto.

For example, when the software related to control of the station device 200 is updated or when the software related to control of the cordless vacuum cleaner 100 is updated, the new version of software may be registered in the server device 300.

In operation S1502, the server device 300 according to an embodiment of the disclosure may download the new version of software to the station device 200. The server device 300 may download the new version of software to the station device 200 in response to a request of a user, and may download the new version of software to the station device 200 in response to a request of the station device 200. An operation of transmitting the new version of software from the server device 300 to the station device 200 in response to the request of the user will be described in more detail below with reference to FIG. 18.

In operation S1503, the station device 200 according to an embodiment of the disclosure may store, in the internal memory, the new version of software downloaded from the server device 300.

In operations S1504 and S1505, when the new version of software stored in the internal memory is software related to control of the station device 200, the station device 200 according to an embodiment of the disclosure may update software previously installed in the station device 200, based on the new version of software stored in the internal memory.

In operations S1504 and S1506, when the new version of software stored in the internal memory is software related to control of the cordless vacuum cleaner 100, the station device 200 according to an embodiment of the disclosure may download the new version of software to the cordless vacuum cleaner 100. In this case, when a preset condition is satisfied, the station device 200 may download the new version of software to the cordless vacuum cleaner 100. For example, when the condition is a condition in which BLE communication with the cordless vacuum cleaner 100 is possible, the station device 200 may download the new version of software to the cordless vacuum cleaner 100. In this case, due to the restriction on the size of the BLE communication packet, it may take a long time (for example, about 2 hours) for the station device 200 to transmit the new version of software to the cordless vacuum cleaner 100.

In step S1507, the cordless vacuum cleaner 100 according to an embodiment of the disclosure may store, in the external memory 1910 (e.g., flash memory), the new version of software downloaded from the station device 200.

In operation S1508, when the new version of software is downloaded to the external memory 1910, the cordless vacuum cleaner 100 according to an embodiment of the disclosure may display a graphical user interface (GUI) for inquiring about the software update to the user.

According to an embodiment of the disclosure, the GUI may be displayed when the user uses the cordless vacuum cleaner 100 once after the new version of software is downloaded to the external memory 1910 and the cordless vacuum cleaner 100 is docked on the station device 200. When the cordless vacuum cleaner 100 displays the GUI in a situation where the user is not using the cordless vacuum cleaner 100, it may be difficult for the user to recognize that the software update is possible. Accordingly, when the user docks the cordless vacuum cleaner 100 on the station device 200 after using the cordless vacuum cleaner 100, the cordless vacuum cleaner 100 may output the GUI for inquiring about the software update.

According to an embodiment of the disclosure, when the battery 1500 of the cleaner body 1000 is charged through the charging terminal of the station device 200, the station device 200 may detect power (current) charged in the battery 1500 of the cleaner body 1000 through the charging terminal. Accordingly, when the power (current) charged in the battery 1500 is detected, the station device 200 may identify that the cordless vacuum cleaner 100 is docked, and may output the GUI for inquiring about the software update. The GUI for inquiring about the software update will be described in more detail below with reference to FIG. 16A.

In step S1509, when an input of accepting the software update is not received from the user, the cordless vacuum cleaner 100 according to an embodiment of the disclosure may not perform the software update.

For example, when the input of rejecting the software update is received, or when no user input of accepting the software update is received within a certain time (e.g., 1 hour), the cordless vacuum cleaner 100 may not update the previously installed software. However, when the certain time (e.g., 24 hours) has elapsed, the cordless vacuum cleaner 100 may display the GUI for inquiring about the software update again. For example, when the user uses the cordless vacuum cleaner 100 again after the certain time (e.g., 24 hours) and docks the cordless vacuum cleaner 100 on the station device 200 again, the cordless vacuum cleaner 100 may display the GUI for inquiring about the software update again.

In operation S1510, when the input of accepting the software update is received from the user, the cordless vacuum cleaner 100 according to an embodiment of the disclosure may reboot at least one processor 1001. For example, the cordless vacuum cleaner 100 may reboot the main processor 1800.

In operation S1511, the cordless vacuum cleaner 100 according to an embodiment of the disclosure may perform the software update while rebooting the at least one processor 1001. For example, a bootloader of the cordless vacuum cleaner 100 may move the new version of software stored in the external memory 1910 to the internal memory 1920. In this case, the new version of software may be installed on the at least one processor 1001 (e.g., the main processor 1800). The time required to move the new version of software from the external memory 1910 to the internal memory 1920 may be short. For example, the time required to move the new version of software from the external memory 1910 to the internal memory 1920 may be less than 2 minutes (about 10 seconds to 20 seconds), but the disclosure is not limited thereto.

In operation S1512, when the new version of software is installed on the at least one processor 1001, the cordless vacuum cleaner 100 may complete the software update. When the software update is completed, the cordless vacuum cleaner 100 may control the operation of the cordless vacuum cleaner 100, based on the new version of software.

Figure 16A:
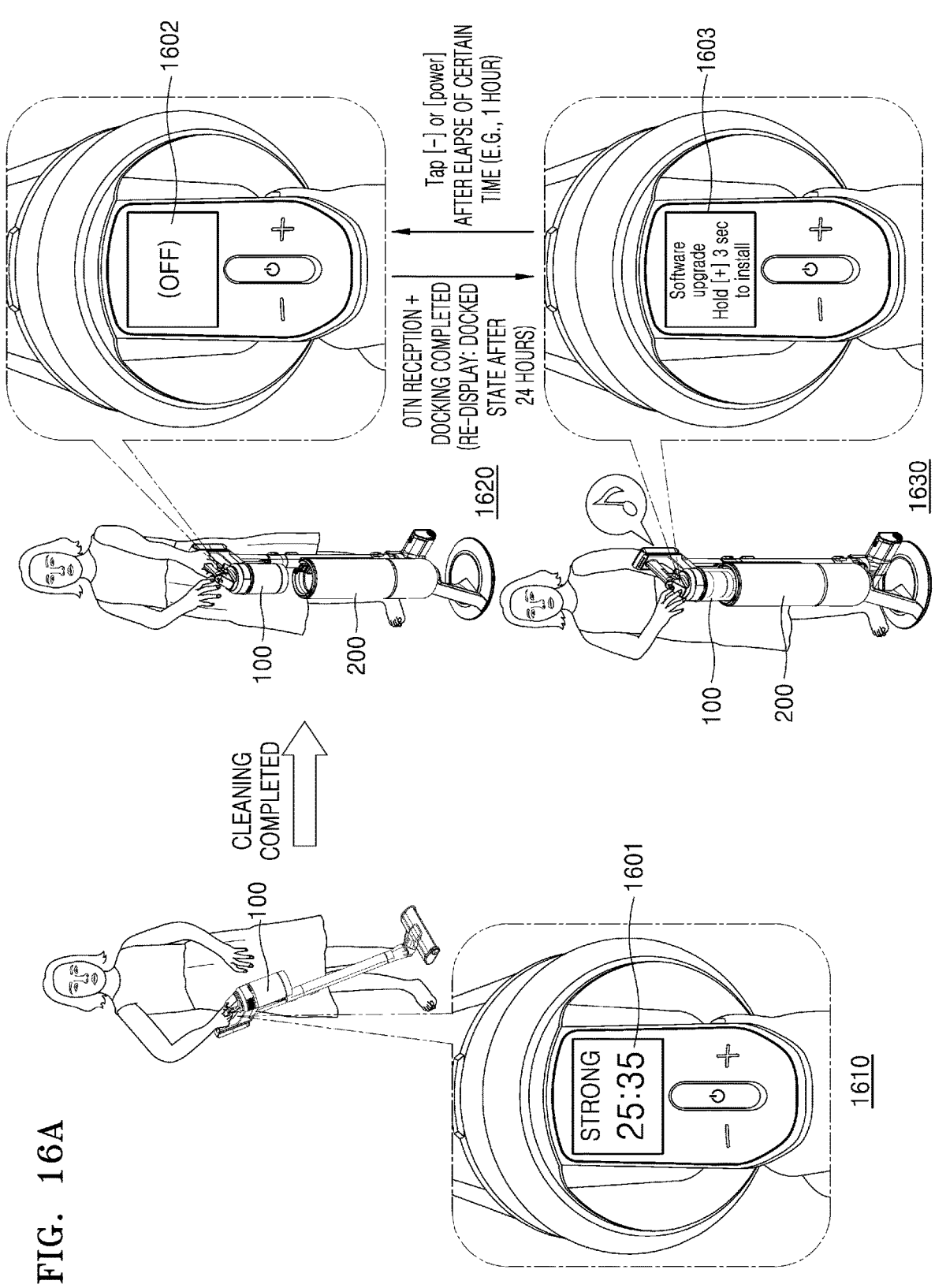
FIG. 16A is a diagram for describing a graphical user interface (GUI) for inquiring about a software update, according to an embodiment of the disclosure.
Figure 16B:
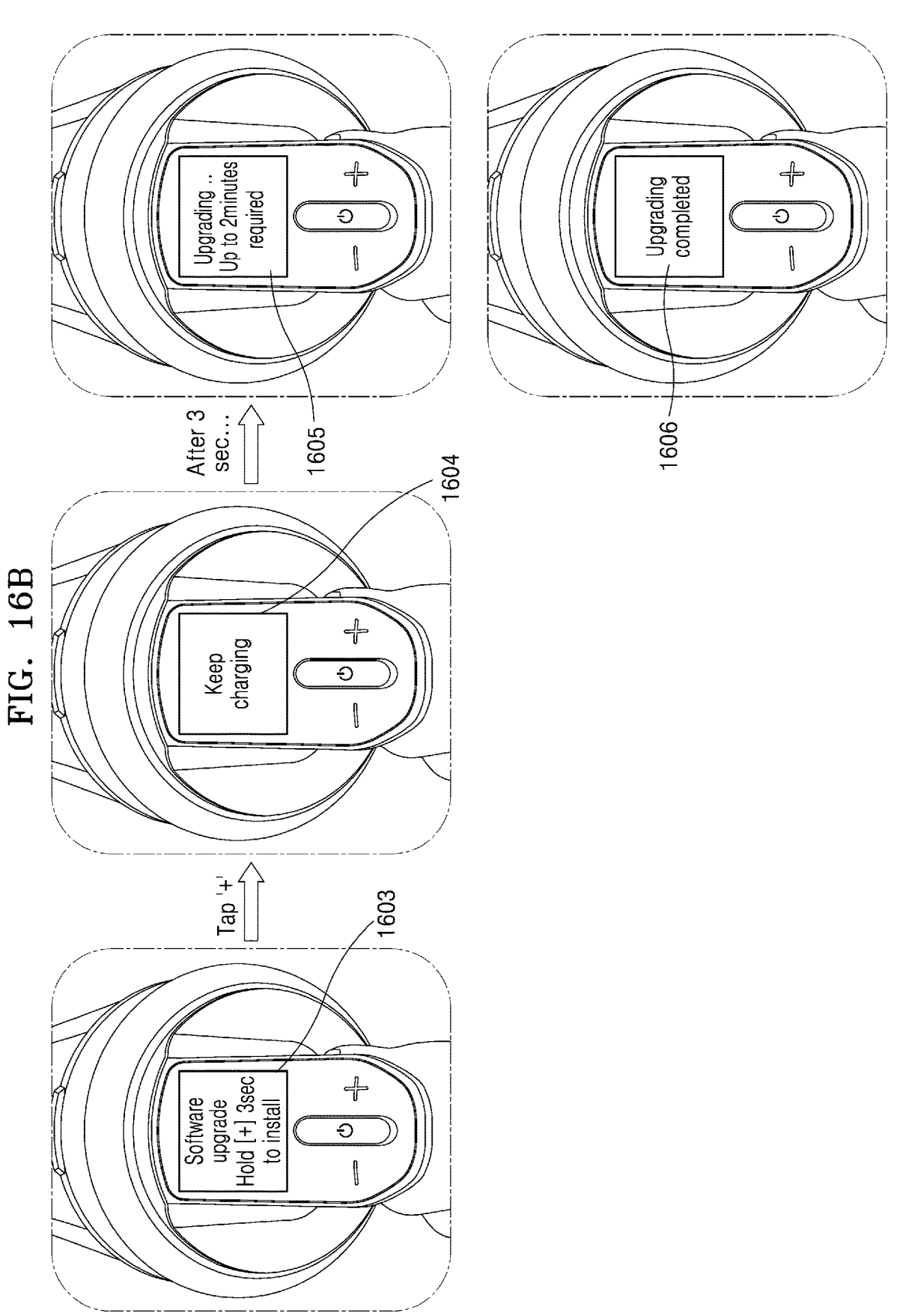
FIG. 16B is a diagram for describing a GUI including software update progress information, according to an embodiment of the disclosure.

FIG. 16A is a diagram for describing the GUI for inquiring about the software update, according to an embodiment of the disclosure. FIG. 16B is a diagram for describing the GUI including software update progress information, according to an embodiment of the disclosure.

Referring to 1610 of FIG. 16A, when the user performs cleaning by using the cordless vacuum cleaner 100, a first GUI 1601 including a current mode and a usable time of the battery 1500 when the cordless vacuum cleaner 100 operates in current mode may be displayed. For example, when the cordless vacuum cleaner 100 operates in a strong mode, "strong, 25:35" may be displayed on the first GUI 1601.

Referring to 1620 of FIG. 16A, when the cleaning is completed, the user may turn off the power of the cordless vacuum cleaner 100. In this case, the display (e.g., LCD) of the cordless vacuum cleaner 100 may also be deactivated (1602). Because the cleaning is completed, the user may dock the wireless vacuum cleaner 100 on the station device 200.

Referring to 1630 of FIG. 16A, when the user docks the cordless vacuum cleaner 100 on the station device 200, the cordless vacuum cleaner 100 may display, on the display, a second GUI 1603 for inquiring about the software update.

For example, in a case where the new version of software is downloaded to the external memory 1910 of the cordless vacuum cleaner 100 when the cordless vacuum cleaner 100 is docked on the station device 200, the cordless vacuum cleaner 100 may display the second GUI 1603 for inquiring about the software update. "Software upgrade Hold [+] 3 sec to install" may be displayed on the second GUI 1603.

According to an embodiment of the disclosure, the cordless vacuum cleaner 100 may output a sound signal when the second GUI is displayed on the display in order to allow the user to confirm the second GUI 1603.

When the user confirms the second GUI 1603 and selects a power button or a [−] button included in the user interface 1700 of the cleaner body 1000, the cordless vacuum cleaner 100 may deactivate the display without performing the software update (1602). Alternatively, when the user does not select a [+] button included in the user interface 1700 for a certain time (e.g., 1 hour), the cordless vacuum cleaner 100 may deactivate the display without performing the software update (1602).

When a certain time (e.g., 24 hours) has elapsed without software update, the cordless vacuum cleaner 100 may display the second GUI 1603 again when the cordless vacuum cleaner 100 is docked on the station device 200.

Referring to FIG. 16B, when the user confirms the second GUI 1603 and selects the [+] button included in the user interface 1700 of the cleaner body 1000, the cordless vacuum cleaner 100 may perform the software update. The cleaner body 1000 may output a third GUI 1604 including a notification requesting the user to continuously keep the charging state in order to stably perform the software update. For example, "keep charging" may be displayed on the third GUI 1604.

When a certain time (e.g., 3 seconds) has elapsed after displaying the third GUI 1604, the cordless vacuum cleaner 100 may display a fourth GUI 1605 indicating that the software update is in progress. For example, "Upgrading. Up to 2 minutes required" may be displayed on the fourth GUI 1605.

The cordless vacuum cleaner 100 may perform the software update by rebooting the main processor 1800 after displaying the fourth GUI 1605. When the new version of software is installed on the main processor 1800, the cordless vacuum cleaner 100 may display a fifth GUI 1606 indicating that the software update has been completed. For example, "Upgrade completed" may be displayed on the fifth GUI 1606.

On the other hand, while the cordless vacuum cleaner 100 displays the second GUI 1603 for inquiring about the software update, the user terminal may also display a GUI for inquiring about the software update. The operation by which the user terminal displays the GUI for inquiring about the software update will be described with reference to FIG. 17.

Figure 17:
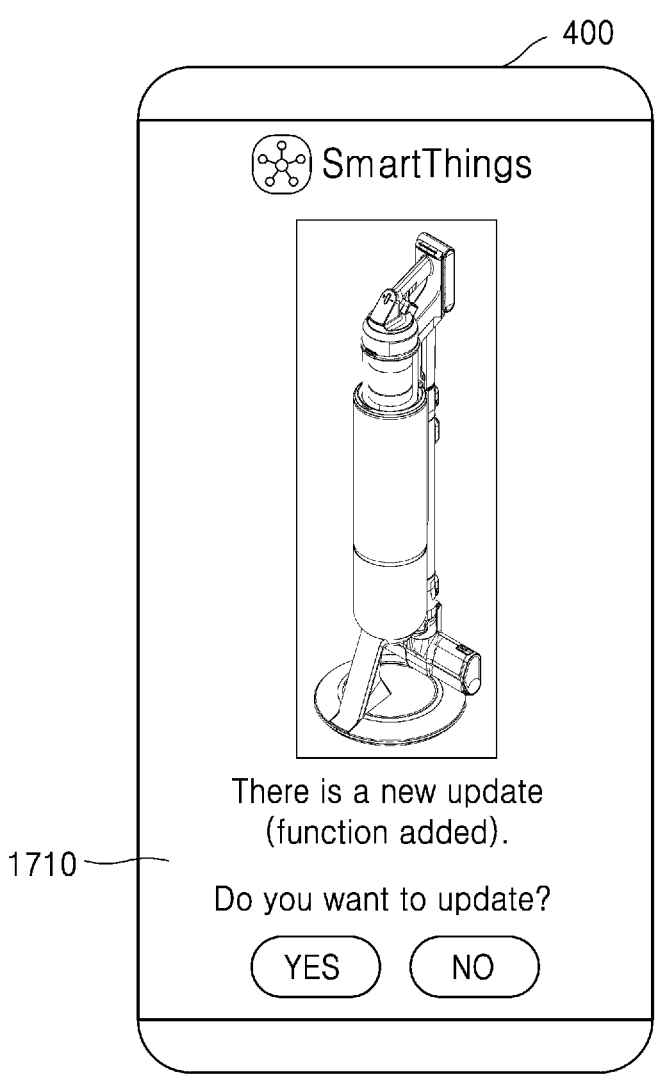
FIG. 17 is a diagram for describing an operation by which a user terminal displays a GUI for inquiring about a software update progress, according to an embodiment of the disclosure.

FIG. 17 is a diagram for describing the operation by which the user terminal 400 displays the GUI for inquiring about the software update, according to an embodiment of the disclosure.

The user terminal 400 may be a device registered in the server device 300 with the same account as the station device 200 or the cordless vacuum cleaner 100. The user terminal 400 may be smartphones, laptop computers, tablet personal computers (PCs), digital cameras, e-book terminals, digital broadcasting terminals, personal digital assistants (PDAs), portable multimedia players (PMPs), wearable devices, devices with a display, and the like, but the disclosure is not limited thereto. Hereinafter, for convenience of explanation, a case where the user terminal 400 is a smartphone will be described as an example.

According to an embodiment of the disclosure, the user terminal 400 may communicate with at least one of the server device 300, the station device 200, and the cordless vacuum cleaner 100. The user terminal 400 may directly communicate with the station device 200 or the cordless vacuum cleaner 100 through short-range wireless communication, or may indirectly communicate with the station device 200 or the cordless vacuum cleaner 100 through the server device 300.

The user terminal 400 may execute a specific application (e.g., a home appliance management application) provided by the server device 300. The cordless vacuum cleaner 100 may transmit, to the server device 300 through the station device 200, information indicating that the new version of software is downloaded to the external memory 1910 of the cordless vacuum cleaner 100 and the cordless vacuum cleaner 100 is docked on the station device 200. In this case, the server device 300 may determine that the cordless vacuum cleaner 100 is ready to update the software, and may display a GUI 1710 for inquiring about the software update through the user terminal 400. For example, when the user executes the specific application (e.g., the home appliance management application) in the user terminal 400, the user terminal 400 may display a message asking "There is a new update (function added). Do you want to update?" on an application execution window.

When the user selects 'Yes' through the GUI (1710), the server device 300 may transmit, to the cordless vacuum cleaner 100 through the station device 200, information indicating that the input of accepting the software update has been received. The cordless vacuum cleaner 100 may update the previously installed software by moving the new version of software stored in the external memory 1910 to the internal memory 1920.

Figure 18:
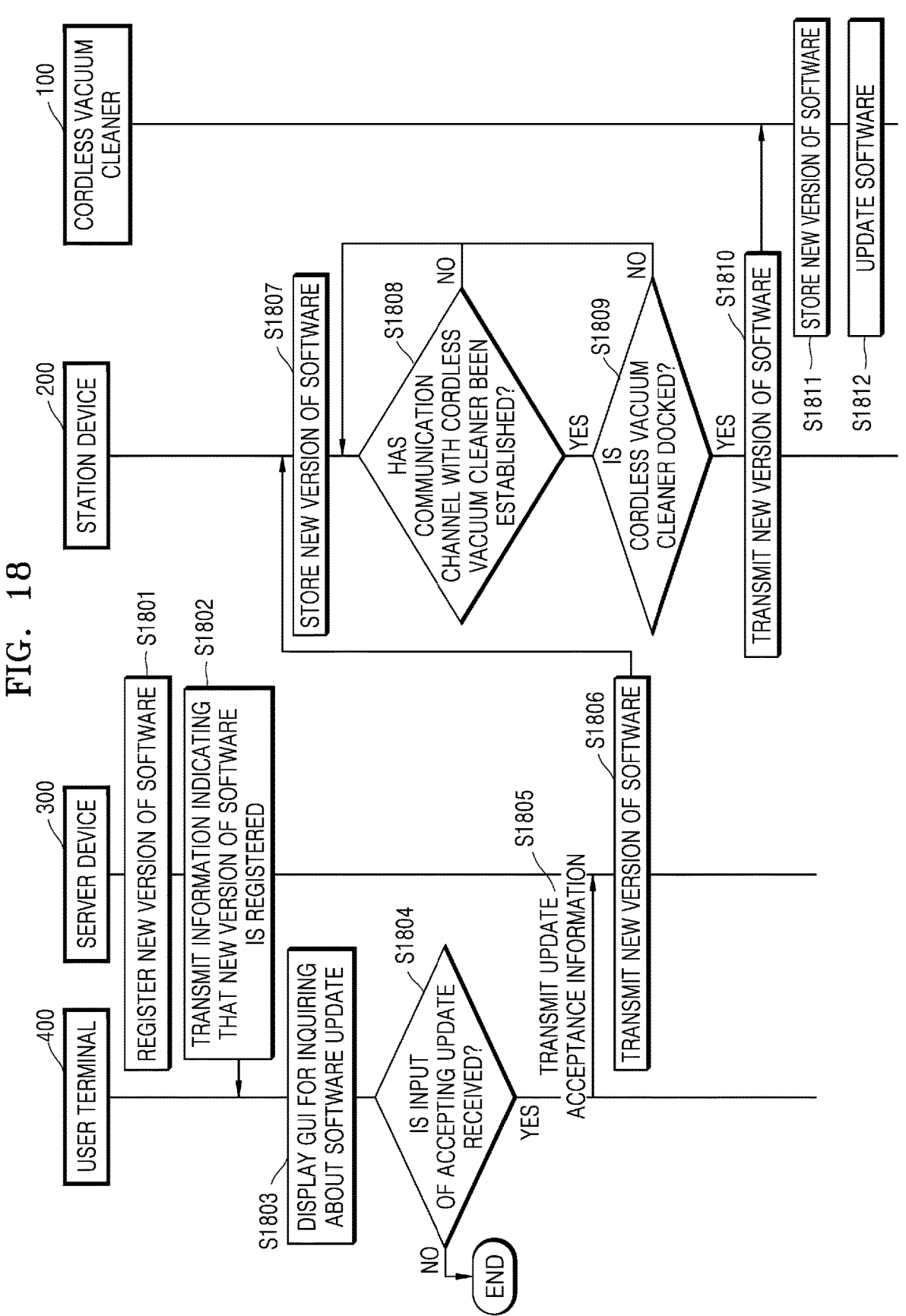
FIG. 18 is a flowchart of a method of performing a software update, based on a user input through a user terminal, according to an embodiment of the disclosure.

FIG. 18 is a flowchart of a method of performing a software update, based on a user input through the user terminal 400, according to an embodiment of the disclosure.

In operation S1801, the server device 300 according to an embodiment of the disclosure may register a new version of software. For example, when the software related to control of the cordless vacuum cleaner 100 is updated, the new version of software related to control of the cordless vacuum cleaner 100 may be registered in the server device 300.

In operation S1802, the server device 300 according to an embodiment of the disclosure may transmit, to the user terminal 400, information indicating that the new version of software is registered in the server device 300. For example, when the new version of software related to control of the cordless vacuum cleaner 100 is registered in the server device 300, the server device 300 may transmit, to the user terminal 400 registered with the same account as the cordless vacuum cleaner 100, a notification indicating that the new version of software related to control of the cordless vacuum cleaner 100 is registered.

In operation S1803, upon receiving information indicating that the new version of software is registered in the server device 300, the user terminal 400 according to an embodiment of the disclosure may display the GUI for inquiring about the software update. For example, when the user terminal 400 receives the information indicating that the new version of software is registered in the server device 300, the user terminal 400 may execute the specific application (e.g., the home appliance management application) and may display, on the application execution window, the GUI inquiring about whether to update the software of the cordless vacuum cleaner 100.

In operation S1804, the user terminal 400 according to an embodiment of the disclosure may receive the input of accepting the software update from the user. For example, the user terminal 400 may receive the user input of accepting the software update of the cordless vacuum cleaner 100 through the GUI displayed on the application execution window.

In operation S1805, the user terminal 400 according to an embodiment of the disclosure may transmit, to the server device 300, information indicating that the user input of accepting the software update of the cordless vacuum cleaner 100 has been received.

In operation S1806, when the user input accepting the software update of the cordless vacuum cleaner 100 is received, the server device 300 according to an embodiment of the disclosure may transmit, to the station device 200, the new version of software related to control of the cordless vacuum cleaner 100.

In operation S1807, the station device 200 according to an embodiment of the disclosure may store the new version of software received from the server device 300. For example, the station device 200 may store, in the memory 202 (e.g., the internal memory), the new version of software related to control of the cordless vacuum cleaner 100 downloaded from the server device 300.

In operation S1808, the station device 200 according to an embodiment of the disclosure may identify whether a communication channel with the cordless vacuum cleaner 100 has been established. For example, the station device 200 may determine whether BLE communication with the cordless vacuum cleaner 100 is possible. When BLE communication with the cordless vacuum cleaner 100 is impossible, the station device 200 may continuously monitor the communication state without transmitting, to the cordless vacuum cleaner 100, the new version of software stored in the memory 202.

In operation S1809, the station device 200 according to an embodiment of the disclosure may identify whether the cordless vacuum cleaner 100 is in a docked state.

According to an embodiment of the disclosure, the station device 200 may use a docking detection sensor 209 to determine whether the cordless vacuum cleaner 100 is docked on the station device 200. Alternatively, the station device 200 may identify that the cordless vacuum cleaner 100 is docked by detecting the power (current) charged in the battery 1500 of the cleaner body 1000 through the charging terminal. Alternatively, when transmitting information indicating that the cleaner body 1000 is docked on the station device 200, the station device 200 may identify that the cordless vacuum cleaner 100 is docked, based on the information received from the cleaner body 1000. Because operation S1809 corresponds to operation S1308 of FIG. 13, a detailed description thereof is omitted.

In operation S1810, when communication with the cordless vacuum cleaner 100 is possible and the cordless vacuum cleaner 100 is docked on the station device 200, the station device 200 according to an embodiment of the disclosure may transmit, to the cordless vacuum cleaner 100, the new version of software stored in the memory 202. For example, the station device 200 may transmit the new version of software to the cordless vacuum cleaner 100 through short-range wireless communication (e.g., BLE communication).

In operation S1811, the cordless vacuum cleaner 100 according to an embodiment of the disclosure may store the new version of software received from the station device 200. For example, the cordless vacuum cleaner 100 may download the new version of software from the station device 200 and store the downloaded software in the external memory 1910 of the main processor 1800.

In step S1812, the cordless vacuum cleaner 100 according to an embodiment of the disclosure may update the previously installed software, based on the new version of software. For example, the cordless vacuum cleaner 100 may update the previously installed software by moving the new version of software stored in the external memory 1910 to the internal memory 1920.

According to an embodiment of the disclosure, because the input of the accepting the software update is received through the user terminal 400 in operation S1804, the cordless vacuum cleaner 100 may update the previously installed software without inquiring the user about the software update again.

Hereinafter, a case where a preset condition for the station device 200 to download the new version of software to the cordless vacuum cleaner 100 includes a condition satisfying a preset download time will be described with reference to FIG. 19.

Figure 19:
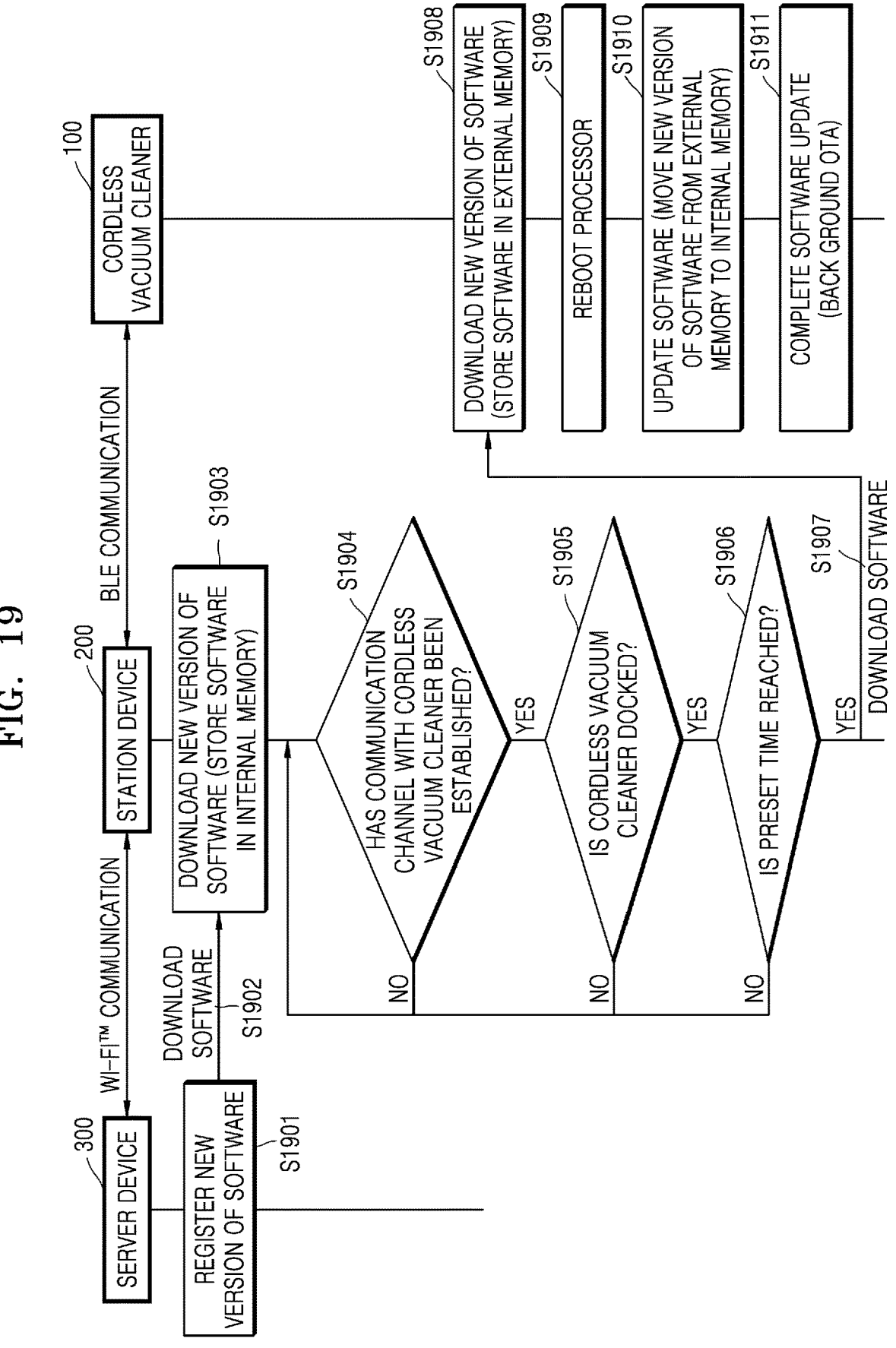
FIG. 19 is a flowchart of a method of performing a software update at a preset time, according to an embodiment of the disclosure.

FIG. 19 is a flowchart of a method of performing a software update at a preset time, according to an embodiment of the disclosure.

In operation S1901, the server device 300 according to an embodiment of the disclosure may register a new version of software. The new version of software may be software related to control of the cordless vacuum cleaner 100.

In operation S1902, the server device 300 according to an embodiment of the disclosure may download the new version of software to the station device 200. The server device 300 may download the new version of software to the station device 200 in response to a request of a user, and may download the new version of software to the station device 200 in response to a request of the station device 200.

In operation S1903, the station device 200 according to an embodiment of the disclosure may store, in the internal memory, the new version of software downloaded from the server device 300.

In operation S1904, when the new version of software related to control of the cordless vacuum cleaner 100 is downloaded, the station device 200 according to an embodiment of the disclosure may identify whether a communication channel with the cordless vacuum cleaner 100 has been established. For example, the station device 200 may determine whether BLE communication with the cordless vacuum cleaner 100 is possible. When BLE communication with the cordless vacuum cleaner 100 is impossible, the station device 200 may continuously monitor the communication state without transmitting, to the cordless vacuum cleaner 100, the new version of software stored in the internal memory.

In operation S1905, the station device 200 according to an embodiment of the disclosure may identify whether the cordless vacuum cleaner 100 is in a docked state.

According to an embodiment of the disclosure, the station device 200 may use a docking detection sensor 209 to determine whether the cordless vacuum cleaner 100 is docked on the station device 200. Alternatively, the station device 200 may identify that the cordless vacuum cleaner 100 is docked by detecting the power (current) charged in the battery 1500 of the cleaner body 1000 through the charging terminal. Alternatively, when transmitting information indicating that the cleaner body 1000 is docked on the station device 200, the station device 200 may identify that the cordless vacuum cleaner 100 is docked, based on the information received from the cleaner body 1000. Because operation S1905 corresponds to operation S1308 of FIG. 13, a detailed description thereof is omitted.

In operation S1906, the station device 200 according to an embodiment of the disclosure may determine whether the current time has reached a preset time.

The preset time may be a time set by a user, may be a time set by default when the station device 200 is released, or may be a time set by a system administrator. For example, the preset time may be early morning (e.g., 2:00 am to 4:00 am) when the user is least likely to use the cordless vacuum cleaner 100, but the disclosure is not limited thereto.

In operation S1907, when communication with the cordless vacuum cleaner 100 is possible and the cordless vacuum cleaner 100 is docked on the station device 200, and the current time reaches a preset time (e.g., 2:00 am), the station device 200 according to an embodiment of the disclosure may transmit, to the cordless vacuum cleaner 100, the new version of software stored in the internal memory. For example, the station device 200 may transmit the new version of software to the cordless vacuum cleaner 100 through short-range wireless communication (e.g., BLE communication).

In step S1908, the cordless vacuum cleaner 100 according to an embodiment of the disclosure may store, in the external memory 1910 (e.g., flash memory), the new version of software downloaded from the station device 200.

In operation S1909, the cordless vacuum cleaner 100 according to an embodiment of the disclosure may reboot the at least one processor 1001. For example, the cordless vacuum cleaner 100 may reboot the main processor 1800. According to an embodiment of the disclosure, when the user agrees to the software update through the user terminal 400, the cordless vacuum cleaner 100 may reboot the main processor 1800 without outputting the GUI for inquiring about the software update to the display.

In operation S1910, the cordless vacuum cleaner 100 according to an embodiment of the disclosure may perform the software update while rebooting the at least one processor 1001. For example, a bootloader of the cordless vacuum cleaner 100 may move the new version of software stored in the external memory 1910 to the internal memory 1920. In this case, the new version of software may be installed on the at least one processor 1001 (e.g., the main processor 1800).

In operation S1911, when the new version of software is installed on the at least one processor 1001, the cordless vacuum cleaner 100 may complete the software update. When the software update is completed, the cordless vacuum cleaner 100 may control the operation of the cordless vacuum cleaner 100, based on the new version of software.

According to an embodiment of the disclosure, the user may complete the software update at the time when the user does not use the cordless vacuum cleaner 100 by designating the software update time through the application installed on the user terminal 400, the user interface 1700 of the cordless vacuum cleaner 100 of the cordless vacuum cleaner 100, or the user interface 204 of the station device 200. The operation by which the user terminal 400 provides a GUI for setting a software update time will be described with reference to FIG. 20.

Figure 20:
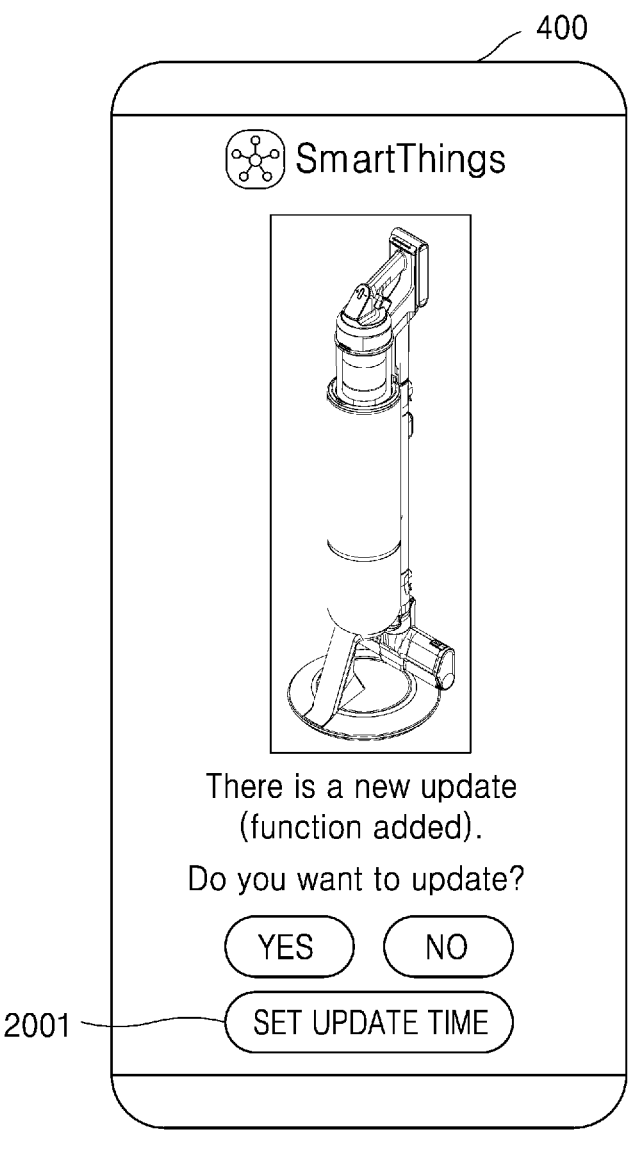
FIG. 20 is a diagram for describing a GUI for setting a software update time, according to an embodiment of the disclosure.

FIG. 20 is a diagram for describing the GUI for setting the software update time, according to an embodiment of the disclosure.

Referring to FIG. 20, when the new version of software related to control of the cordless vacuum cleaner 100 is registered in the server device 300, the server device 300 may transmit, to the user terminal 400 registered with the same account as the cordless vacuum cleaner 100, a notification indicating that the new version of software related to control of the cordless vacuum cleaner 100 is registered.

Upon receiving the notification that the new version of software is registered in the server device 300, the user terminal 400 may display the GUI for inquiring about the software update on the application execution window. In this case, by agreeing to the software update, the user may allow the cordless vacuum cleaner 100 to perform the software update in real time or may set a desired update time. For example, when the user selects an update time setting menu 2001 included in the GUI, the user terminal 400 may display an update time setting window. When the user sets the desired update time (e.g., 3 am), the user terminal 400 may transmit, to the server device 300, information about the update time set by the user.

According to an embodiment of the disclosure, the server device 300 may transmit the new version of software to the station device 200 at the time set by the user. At this time, the station device 200 may also transmit the new version of software to the cordless vacuum cleaner 100 so that the software of the cordless vacuum cleaner 100 is updated at the time (e.g., 3:00 am) set by the user.

According to an embodiment of the disclosure, when the server device 300 receives, from the user terminal 400, the information about the update time set by the user, the server device 300 may transmit, to the station device 200, the information about the update time set by the user and the new version of software. In this case, the station device 200 may wait until the update time set by the user is reached and may transmit the new version of software to the cordless vacuum cleaner 100, so that the software of the cordless vacuum cleaner 100 is updated at the time (e.g., 3:00 am) set by the user.

Hereinafter, the operation of registering the new version of software in the server device 300 will be described in detail with reference to FIGS. 21 to 25.

FIG. 21 is a diagram for describing the operation of updating a new version of software when an operation mode of the cordless vacuum cleaner 100 is added, according to an embodiment of the disclosure.

Referring to FIG. 21, when a new operation mode is added to the cordless vacuum cleaner 100, a new version of software 2110 may be registered in the server device 300. For example, the cordless vacuum cleaner 100 currently has five operation modes (i.e., a jet mode, a super-strong mode, a strong mode, a normal mode, and an AI mode). When a silent mode is added, the number of operation modes of the cordless vacuum cleaner 100 may increase to six. The silent mode is a mode for reducing operation noise of the suction motor 1110, and power consumption of the suction motor 1110 corresponding to the silent mode may be defined as 50 W. In this case, the new version of software 2110 including a control algorithm corresponding to the silent mode may be registered in the server device 300 by a system administrator.

The cordless vacuum cleaner 100 may download and install the new version of software 2110 registered in the server device 300 through the station device 200. In this case, the cordless vacuum cleaner 100 may provide a new menu corresponding to the silent mode to the user through the user interface 1700. When the user selects the silent mode, the cordless vacuum cleaner 100 may adjust the power consumption of the suction motor 1110 to 50 W.

FIG. 22 is a diagram for describing an operation of registering a new version of software when a user mode is newly defined, according to an embodiment of the disclosure.

Referring to FIG. 22, when the user mode of the cordless vacuum cleaner 100 is newly defined, the new version of software 2210 may be registered in the server device 300.

For example, when nighttime cleaning is required, the user may want to drive the suction motor 1110 with lower power consumption (e.g., 40 W) than the power consumption corresponding to the silent mode (50 W). However, because the user is unable to change the power consumption of the default mode (e.g., the jet mode, the super-strong mode, the strong mode, the normal mode, and the silent mode), the user may newly define the user mode. For example, the user may define the power consumption of the suction motor 1110 corresponding to the user mode as 40 W. When the minimum power consumption of the suction motor 1110 is adjusted from 50 W to 40 W, minimum noise may be reduced from 50 db to 40 db. In this case, the new version of software 2210 including the control algorithm corresponding to the user mode may be registered in the server device 300.

The cordless vacuum cleaner 100 may download and Install the new version of software 2210 registered in the server device 300 through the station device 200. In this case, the cordless vacuum cleaner 100 may provide a menu corresponding to the user mode to the user through the user interface 1700. When the user selects the user mode, the cordless vacuum cleaner 100 may adjust the power consumption of the suction motor 1110 to 40 W.

Alternatively, when the user wants a stronger suction force (e.g., 240 W) than the maximum suction force (e.g., 220 W) of the basic mode, the user may newly define the power consumption of the suction motor 1110 corresponding to the user mode as 630 W. In this case, because the control algorithm corresponding to the user mode has been modified, the new version of software 2210 may be registered in the server device 300. The cordless vacuum cleaner 100 may download and install the new version of software 2210 registered in the server device 300 through the station device 200. In this case, the cordless vacuum cleaner 100 may provide a menu corresponding to the user mode to the user through the user interface 1700. When the user selects the user mode, the cordless vacuum cleaner 100 may adjust the power consumption of the suction motor 1110 to 630 W.

FIG. 23 is a diagram for describing an operation of updating a new version of software when an AI model is trained to additionally infer a new usage environment state, according to an embodiment of the disclosure.

Referring to FIG. 23, when the AI model is trained to additionally infer the new usage environment state, the new version of software 2310 may be registered in the server device 300. For example, when the AI model trained to infer the hard floor, the mat, the carpet, and the lift is updated to additionally infer the corner, the new version of software 2310 may be registered in the server device 300. In this case, the new version of software 2310 may include an AI model updated to additionally infer the corner, which is the new usage environment state, and may include a control algorithm (e.g., the power consumption of the suction motor 1110: 150 W) corresponding to the corner, which is the new use environment state.

The cordless vacuum cleaner 100 may download and install the new version of software 2310 registered in the server device 300 through the station device 200. In this case, when the cordless vacuum cleaner 100 cleans the corner, the cordless vacuum cleaner 100 may apply data related to the flow path pressure inside the cordless vacuum cleaner 100 and data related to the load of the brush device 2000 to the updated AI model, so as to identify that the current usage environment state of the brush device 2000 is the corner. The cordless vacuum cleaner 100 may improve cleaning performance in the corner by automatically adjusting the power consumption of the suction motor 1110 to 150 W.

The AI model (new version of AI model) updated to additionally infer the corner will be described in more detail with reference to FIG. 24.

FIG. 24 is a diagram for describing the new version of AI model trained to additionally infer the new usage environment state, according to an embodiment of the disclosure.

According to 2401 of FIG. 24, the AI model before update may divide the usage environment state of the brush device 2000 into four categories, such as hard floor (hf), carpet, mat, and lift. The AI model before being updated may include a first hyper plane 2411 for distinguishing the carpet from the mat and the hard floor, a second hyper plane 2412 for distinguishing the mat from the hard floor and the carpet, and a third hyper plane 2413 for distinguishing the lift from the carpet. The hyper planes may each be expressed by a linear equation ($y=ax+b$), and a and b in the linear equation may be parameters. The parameter values of the first hyper plane 2411, the second hyper plane 2412, and the third hyper plane 2413 may correspond to a case where the power consumption of the suction motor 1110 is 115 W.

Referring to 2402 in FIG. 24, the updated AI model (new version of AI model) may divide the usage environment state of the brush device 2000 into five categories, such as hard floor (hf), carpet, mat, lift, and corner. The updated AI model may include a first hyper plane 2421 for distinguishing the carpet from the mat, the hard floor, and the wall surface, a second hyper plane 2422 for distinguishing the hard floor from the mat and the corner, a third hyper plane 2423 for distinguishing the lift from the carpet, and a fourth hyper plane 2424 for distinguishing the mat from the corner.

The first hyper plane 2421 and the third hyper plane 2423 of the updated AI model may correspond to the first hyper plane 2411 and the third hyper plane 2413 of the AI model before update. The second hyper plane 2422 of the updated AI model may be a hyper plane obtained by changing the parameter value of the second hyper plane 2412 of the AI model before update. The fourth hyper plane 2424 of the updated AI model may be newly added, compared to the AI model before update.

In FIG. 24, the AI model updated to additionally infer the corner has been described, but the disclosure is not limited thereto. For example, the AI model may be updated to additionally infer window frames or stairs through training.

FIG. 25 is a diagram for describing an operation of registering a new version of software when a new type of brush device 200a is added, according to an embodiment of the disclosure.

Referring to FIG. 25, when the new type of the brush device 2000a is developed, the new version of software 2510 may be registered in the server device 300. The new version of software 2510 may include a new AI model corresponding to the new type of the brush device 2000a, and a new algorithm for controlling at least one of drum RPM, trip level, or setting values of the lighting device of the new type of the brush device 2000a. According to an embodiment of the disclosure, when the user purchases the new type of the brush device 2000a and requests an update for software installed on the cordless vacuum cleaner 100 through the user terminal 400, the cordless vacuum cleaner 100 may download the new version of software 2510 registered in the server device 300 through the station device 200.

Thereafter, when the user connects the new type of the brush device 2000a to the cleaner body 1000, the cleaner body 1000 may identify the type of the brush device 2000a and select a new AI model corresponding to the type of the brush device 2000a. The cleaner body 1000 may identify the current usage environment state of the brush device 2000a by applying the flow path pressure value and the load value of the brush device 2000a to the new AI model. When the current usage environment state is the mat, the cleaner body 1000 may adjust the power consumption of the suction motor 1110 to 58 W, may adjust the drum RPM of the brush device 2000a to 1,000 rpm, may adjust the color of the lighting device 2300 of the brush device 2000 to yellow, and may set the trip level to 4.9 A.

The case where the station device 200 receives the new version of software related to control of the cordless vacuum cleaner 100 from the server device 300 and downloads the new version of software to the cordless vacuum cleaner 100 has been described with reference to FIGS. 1 to 25, but the disclosure is not limited thereto. According to an embodiment of the disclosure, the cordless vacuum cleaner 100 may receive the new version of software related to control of the station device 200 from the server device 300 and transmit the new version of software to the station device 200. An operation of updating the software installed on the station device 200 through the cordless vacuum cleaner 100 will be described in detail with reference to FIG. 26.

Figure 26:
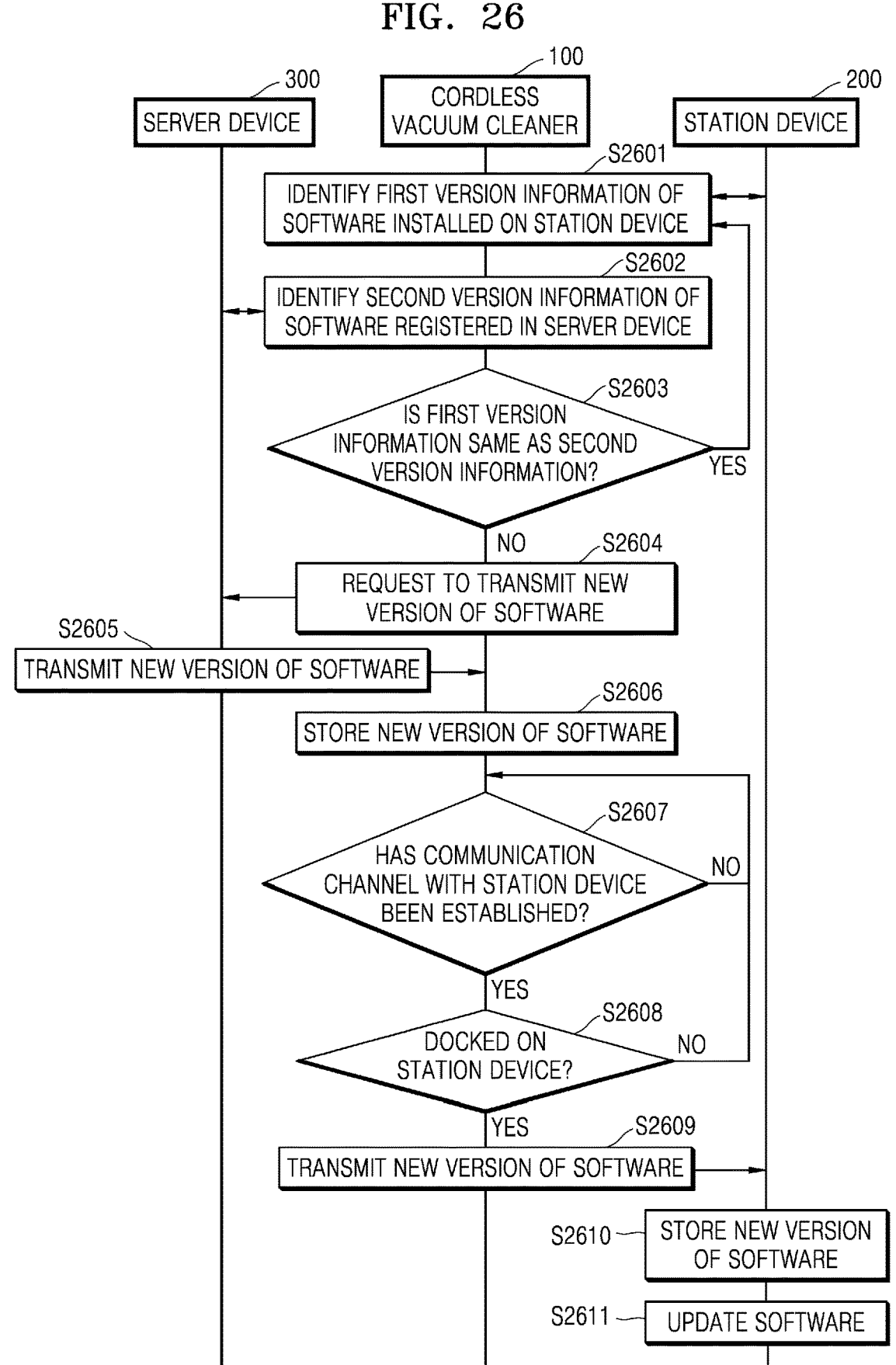
FIG. 26 is a flowchart of a method of updating software related to control of a station device through a cordless vacuum cleaner, according to an embodiment of the disclosure.

FIG. 26 is a flowchart of a method of updating software related to control of the station device 200 through the cordless vacuum cleaner 100, according to an embodiment of the disclosure.

In FIG. 26, a case where the cordless vacuum cleaner 100 is connected to the server device 300 through an access point (AP) and connected to the station device 200 through short-range wireless communication (e.g., BLE communication) is described as an example.

In operation S2601, the cordless vacuum cleaner 100 according to an embodiment of the disclosure may identify first version information of software installed on the station device 200. For example, the cordless vacuum cleaner 100 may receive the first version information of the software installed on the station device 200 from the station device 200 through short-range wireless communication (e.g., BLE communication).

The cordless vacuum cleaner 100 may periodically obtain the first version information of the software installed on the station device 200. For example, the cordless vacuum cleaner 100 may obtain the first version information of the software installed on the station device 200 once a week, but the disclosure is not limited thereto.

According to an embodiment of the disclosure, when there is a request for the first version information from the cordless vacuum cleaner 100, the station device 200 may transmit the first version information to the cordless vacuum cleaner 100. Alternatively, the station device 200 may periodically transmit the first version information to the cordless vacuum cleaner 100 even when there is no request for the first version information from the cordless vacuum cleaner 100.

In operation S2602, the cordless vacuum cleaner 100 according to an embodiment of the disclosure may identify second version information of the software registered in the server device 300. For example, the cordless vacuum cleaner 100 may access the server device 300 through Wi-Fi™ communication and periodically identify the second version information of the software registered in the server device 300. In this case, the software may be software related to control of the station device 200. According to an embodiment of the disclosure, the software related to control of the station device 200 may include an algorithm related to a dust discharge operation (stroke) (e.g., an algorithm for adjusting the intensity of the suction force of the suction motor of the station device 200), an algorithm related to an operation of an output interface (e.g., LCD, audio output interface, etc.), an algorithm for diagnosing the state of the station device 200, and the like, but the disclosure is not limited thereto.

According to an embodiment of the disclosure, when a request is received from the cordless vacuum cleaner 100, the server device 300 may transmit the second version information to the cordless vacuum cleaner 100. Alternatively, when the new version of software related to control of the station device 200 is registered, the server device 300 may transmit the second version information (information about the new version) to the cordless vacuum cleaner 100.

In operation S2603, the cordless vacuum cleaner 100 according to an embodiment of the disclosure may determine whether the first version information of the software installed on the station device 200 is the same as the second version information of the software registered in the server device 300.

The cordless vacuum cleaner 100 may periodically perform operations S2601 and S2602 when the first version information of the software installed on the station device 200 is the same as the second version information of the software registered in the server device 300.

In operation S2604, when the first version information is different from the second version information, the cordless vacuum cleaner 100 according to an embodiment of the disclosure may request the server device 300 to transmit the new version of software related to control of the station device 200.

When the first version information is different from the second version information, the cordless vacuum cleaner 100 may determine that the new version of software related to control of the station device 200 is registered in the server device 300. For example, when a new operation mode related to dust discharge (e.g., an eco mode, a low power mode, an AI mode with variable suction force, etc.) is added, or when the operating condition or the intensity of the suction force of the station device 200 is changed (e.g., dust discharge operation time: change from 20 seconds to 25 seconds), the new version of software related to control of the station device 200 may be registered in the server device

300. Accordingly, the cordless vacuum cleaner 100 may request the server device 300 to transmit the new version of software through Wi-Fi™ communication.

In operation S2605, the server device 300 according to an embodiment of the disclosure may transmit, to the cordless vacuum cleaner 100, the new version of software related to control of the station device 200 in response to the request of the cordless vacuum cleaner 100.

In operation S2606, the cordless vacuum cleaner 100 according to an embodiment of the disclosure may store the new version of software. For example, the station device 200 may store, in the memory 1900, the new version of software related to control of the station device 200 downloaded from the server device 300.

In operation S2607, the cordless vacuum cleaner 100 according to an embodiment of the disclosure may identify whether a communication channel with the station device 200 has been established. For example, the cordless vacuum cleaner 100 may determine whether BLE communication with the station device 200 is possible. When BLE communication with the station device 200 is impossible, the cordless vacuum cleaner 100 may continuously monitor the communication state without transmitting, to the station device 200, the new version of software stored in the memory 1900.

In operation S2608, the cordless vacuum cleaner 100 according to an embodiment of the disclosure may identify whether the cordless vacuum cleaner 100 is docked on the station device 200.

According to an embodiment of the disclosure, when the battery 1500 of the cleaner body 1000 comes into contact with the charging terminal of the station device 200, the cleaner body 1000 may detect the charging start of the battery 1500. Accordingly, when the charging of the battery 1500 starts, the cleaner body 1000 may identify that the cleaner body 1000 is docked on the station device 200.

In operation S2609, when communication with the station device 200 is possible and the cordless vacuum cleaner 100 is docked on the station device 200, the cordless vacuum cleaner 100 according to an embodiment of the disclosure may transmit, to the station device 200, the new version of software stored in the memory 1900. For example, the cordless vacuum cleaner 100 may transmit the new version of software to the station device 200 through short-range wireless communication (e.g., BLE communication). In this case, it may take a long time for the cordless vacuum cleaner 100 to transmit the new version of software to the station device 200 due to the restriction on the size of the short-range wireless communication packet.

In operation S2610, the station device 200 according to an embodiment of the disclosure may store the new version of software received from the cordless vacuum cleaner 100. For example, the station device 200 may download the new version of software from the cordless vacuum cleaner 100 and store the new version of software in the external memory.

In step S2611, the station device 200 according to an embodiment of the disclosure may update the previously installed software, based on the new version of software. For example, the bootloader of the station device 200 may update the previously installed software by moving the new version of software stored in the external memory to the internal memory.

According to an embodiment of the disclosure, there may be provided the station device 200 that updates the software related to control of the cordless vacuum cleaner 100 by communicating with the server device 300 and the cordless vacuum cleaner 100.

According to an embodiment of the disclosure, there may be provided the station device 200 that, when a preset condition is satisfied, automatically downloads, to the cordless vacuum cleaner 100, the new version of software related to control of the cordless vacuum cleaner 100.

The station device 200 according to an embodiment of the disclosure may include the communication interface 201 that communicates with the cordless vacuum cleaner 100 and the server device 300, the memory 202 that stores one or more instructions, and the at least one processor 203. The at least one processor 203 may receive the new version of software related to control of the cordless vacuum cleaner 100 from the server device 300 through the communication interface 201. The at least one processor 203 may store the received new version of software in the memory 202. The at least one processor 203 may identify whether a preset condition under which the new version of software is downloadable to the cordless vacuum cleaner 100 is satisfied. When the preset condition is satisfied, the at least one processor 203 may transmit the new version of software stored in the memory 202 to the cordless vacuum cleaner 100 through the communication interface 201.

The communication interface 201 of the station device 200 may communicate with the server device 300 through a first communication scheme and may communicate with the cordless vacuum cleaner 100 through a second communication scheme that is different from the first communication scheme. The first communication scheme may include a Wi-Fi™ communication scheme, and the second communication scheme may include a BLE communication scheme.

The preset condition may include at least one of a condition for communication connection with the cordless vacuum cleaner 100 or a condition for a docking state of the cordless vacuum cleaner 100.

The software related to control of the cordless vacuum cleaner 100 may include an AI model trained to infer the usage environment state of the brush device 2000, based on data related to the flow path pressure inside the cordless vacuum cleaner 100 and data related to the load of the brush device 2000 connected to the cordless vacuum cleaner 100. The AI model may include at least one of an SVM model, a neural network model, a random forest model, or a graphical model.

The usage environment state of the brush device 2000 may include at least one of the state of the surface to be cleaned on which the brush device 2000 is located, the relative position state of the brush device 2000 within the surface to be cleaned, or the state of the brush device 2000 being lifted from the surface to be cleaned.

The new version of software may include a new version of an AI model trained to additionally infer the new usage environment state. The new version of software may include a new AI model corresponding to a new type of the brush device 2000*a*.

The new version of software may include a control algorithm related to an operation mode newly added to the cordless vacuum cleaner 100 or a diagnosis algorithm for diagnosing the state of the cordless vacuum cleaner 100. The control algorithm may include an algorithm for controlling the power consumption of the suction motor 1110 in the cordless vacuum cleaner 100 or the RPM of the rotating brush of the brush device 2000 connected to the cordless vacuum cleaner 100.

The new version of software may include a new algorithm for controlling at least one of RPM of the rotating brush, trip level, or setting values of the lighting device of the new type of the brush device 2000*a*. The setting value of the lighting device may include a brightness value or a color value.

The at least one processor 203 may periodically compare first version information of software installed on the cordless vacuum cleaner 100 with second version information of software registered in the server device 300. When the first version information is different from the second version information, the at least one processor 203 may receive a new version of software from the server device 300.

The at least one processor 203 may receive, from the cordless vacuum cleaner 100, the first version information of the software installed on the cordless vacuum cleaner 100. The at least one processor 203 may receive, from the server device 300, the second version information of the software registered in the server device 300.

A communication method of the station device 200 on which the cordless vacuum cleaner 100 is docked, according to an embodiment of the disclosure may include: receiving a new version of software related to control of the cordless vacuum cleaner 100 from the server device 300 through the communication interface 201 of the station device 200 (S810); storing the received new version of software in the memory 202 of the station device 200 (S820); identifying whether a preset condition under which the new version of software is downloadable to the cordless vacuum cleaner 100 is satisfied (S830); and when the preset condition is satisfied, transmitting the new version of software stored in the memory 202 of the station device 200 to the cordless vacuum cleaner 100 through the communication interface 201 of the station device 200 (S840). The new version of software transmitted to the cordless vacuum cleaner 100 may be stored in the external memory 1910 of the cordless vacuum cleaner 100. When the main processor 1800 reboots, the new version of software transmitted to the cordless vacuum cleaner 100 may move from the external memory 1910 to the internal memory 1920.

The communication interface 201 of the station device 200 may communicate with the server device 300 through a first communication scheme. The communication interface 201 of the station device 200 may communicate with the cordless vacuum cleaner 100 through a second communication scheme that is different from the first communication scheme. The first communication scheme may include a Wi-Fi™ communication scheme. The second communication scheme may include a BLE communication scheme.

The operation of identifying whether the preset condition is satisfied may include an operation of identifying whether a communication channel with the cordless vacuum cleaner 100 has been established or an operation of identifying whether the cordless vacuum cleaner 100 is docked on the station device 200.

The software related to control of the cordless vacuum cleaner 100 may include an AI model trained to infer the usage environment state of the brush device 2000, based on data related to the flow path pressure inside the cordless vacuum cleaner 100 and data related to the load of the brush device 2000 connected to the cordless vacuum cleaner 100. The new version of software related to control of the cordless vacuum cleaner 100 may include a new version of an AI model trained to additionally infer the new usage environment state or the new AI model corresponding to the new type of the brush device 2000*a*.

The new version of software related to control of the cordless vacuum cleaner 100 may include a control algorithm related to an operation mode newly added to the cordless vacuum cleaner 100 or a diagnosis algorithm for diagnosing the state of the cordless vacuum cleaner 100. The control algorithm may include an algorithm for controlling the power consumption of the suction motor 1110 in the cordless vacuum cleaner 100 or the RPM of the rotating brush of the brush device 2000 connected to the cordless vacuum cleaner 100.

The operation of receiving the new version of software from the server device 300 may include an operation of periodically comparing the first version information of the software installed on the cordless vacuum cleaner 100 with the second version information of the software registered in the server device 300, and an operation of receiving the new version of software from the server device 300 when the first version information is different from the second version information.

The method according to an embodiment of the disclosure may be implemented in the form of program commands that are executable through a variety of computer means and may be recorded on a computer-readable recording medium. The computer-readable recording medium may include program commands, data files, data structures, etc. alone or in combination. The program commands recorded on the computer-readable recording medium may be those specially designed and configured for the disclosure or those known to and usable by those of ordinary skill in computer software. Examples of the computer-readable recording medium may include magnetic media (e.g., hard disk, floppy disk, and magnetic tape), optical media (e.g., compact disc read-only memory (CD-ROM) and digital versatile disc (DVD)), magneto-optical media (e.g., floptical disk), and hardware devices specially configured to store and execute program commands, such as ROM, RAM, and flash memory. Examples of the program commands may include not only machine language codes generated by a compiler, but also high-level language codes that are executable using an interpreter by a computer.

Some embodiments of the disclosure may be implemented in the form of a computer-readable recording medium including instructions to be executable by the computer, such as program modules to be executed by the computer. The computer-readable recording medium may be any available media that are accessible by the computer, and may include any volatile and non-volatile media and any removable and non-removable media. In addition, the computer-readable recording medium may include any computer storage medium and any communication medium. The computer storage medium may include any volatile, non-volatile, removable, and non-removable media that are implemented in any method or technology for storage of information, such as computer-readable instructions, data structures, program modules, or other data. The communication medium may typically include computer-readable instructions, data structures, program modules, other data of modulated data signals, such as a carrier wave, or other transport mechanism, and may include any information transmission media. In addition, some embodiments of the disclosure may be implemented as a computer program or a computer program product including instructions executable by the computer, such as a computer program to be executed by the computer.

A machine-readable storage medium may be provided in the form of a non-transitory storage medium. The "non-transitory storage medium" is a tangible device and only means not including a signal (e.g., electromagnetic wave). This term does not distinguish between a case where data is semi-permanently stored in a storage medium and a case where data is temporarily stored in a storage medium. For example, the non-transitory storage medium may include a buffer in which data is temporarily stored.

According to an embodiment of the disclosure, the methods according to various embodiments of the disclosure may be provided by being included in a computer program product. The computer program products may be traded between a seller and a buyer as commodities. The computer program product may be distributed in the form of a machine-readable storage medium (e.g., CD-ROM), or may be distributed (e.g., downloaded or uploaded) online either via an application store or directly between two user devices (e.g., smartphones). In the case of the online distribution, at least a part of a computer program product (e.g., downloadable app) is stored at least temporarily on a machine-readable storage medium, such as a server of a manufacturer, a server of an application store, or a memory of a relay server, or may be temporarily generated.

The invention claimed is:

1. A station device configured to dock a cordless vacuum cleaner and charge a battery of the cordless vacuum cleaner, the station device comprising:

a communication interface configured to communicate with the cordless vacuum cleaner and a server device;

a charging terminal configured to charge the battery of the cordless vacuum cleaner;

a memory storing one or more instructions; and at least one processor configured to:

receive a new version of software related to control of the cordless vacuum cleaner from the server device through the communication interface of the station device;

store the received new version of software in the memory of the station device;

identify whether a preset condition under which the new version of software is downloadable to the cordless vacuum cleaner is satisfied; and when the preset condition is satisfied, transmit the new version of software stored in the memory of the station device to the cordless vacuum cleaner through the communication interface of the station device.

2. The station device of claim 1, wherein the communication interface is further configured to communicate with the server device through a first communication scheme and communicate with the cordless vacuum cleaner through a second communication scheme that is different from the first communication scheme.

3. The station device of claim 2, wherein the first communication scheme comprises a Wireless Fidelity (Wi-Fi)™ communication scheme, and the second communication scheme comprises a Bluetooth Low Energy (BLE) communication scheme.

4. The station device of claim 1, wherein the preset condition comprises at least one of a condition for communication connection with the cordless vacuum cleaner or a condition for a docking state of the cordless vacuum cleaner.

5. The station device of claim 1, wherein the software related to control of the cordless vacuum cleaner comprises an artificial intelligence (AI) model trained to infer a usage environment state of a brush device, based on data related to flow path pressure inside the cordless vacuum cleaner and data related to a load of the brush device connected to the cordless vacuum cleaner.

6. The station device of claim 5, wherein the AI model comprises at least one of a support vector machine (SVM) model, a neural network model, a random forest model, or a graphical model.

7. The station device of claim 5, wherein the usage environment state of the brush device comprises at least one of a state of a surface to be cleaned on which the brush device is located, a relative position state of the brush device within the surface to be cleaned, or a state of the brush device being lifted from the surface to be cleaned.

8. The station device of claim 1, wherein the new version of software comprises a new version of an AI model trained to additionally infer a new usage environment state.

9. The station device of claim 1, wherein the new version of software comprises a new AI model corresponding to a new type of a brush device.

10. The station device of claim 1, wherein the new version of software comprises a control algorithm related to an operation mode newly added to the cordless vacuum cleaner or a diagnosis algorithm for diagnosing the state of the cordless vacuum cleaner.

11. The station device of claim 10, wherein the control algorithm comprises an algorithm for controlling power consumption of a suction motor in the cordless vacuum cleaner or revolutions per minute (RPM) of a rotating brush of a brush device connected to the cordless vacuum cleaner.

12. The station device of claim 1, wherein the new version of software comprises a new algorithm for controlling at least one of RPM of a rotating brush, trip level, or setting values of a lighting device of a new type of a brush device.

13. The station device of claim 1, wherein the at least one processor is further configured to periodically compare first version information of software installed on the cordless vacuum cleaner with second version information of software registered in the server device, and when the first version information is different from the second version information, receive the new version of software from the server device.

14. The station device of claim 13, wherein the at least one processor is further configured to:

receive, from the cordless vacuum cleaner, the first version information of the software installed on the cordless vacuum cleaner; and receive, from the server device, the second version information of the software registered in the server device.

15. A communication method of a station device configured to dock a cordless vacuum cleaner and charge a battery of the cordless vacuum cleaner, the communication method comprising:

receiving, by at least one processor of the station device, a new version of software related to control of the cordless vacuum cleaner from a server device through a communication interface of the station device;

storing, by the at least one processor of the station device, the received new version of software in a memory of the station device;

identifying, by the at least one processor of the station device, whether a preset condition under which the new version of software is downloadable to the cordless vacuum cleaner is satisfied; and when the preset condition is satisfied, transmitting, by the at least one processor of the station device, the new version of software stored in the memory of the station device to the cordless vacuum cleaner through the communication interface of the station device, wherein the station device is configured to charge the battery of the cordless vacuum cleaner.

16. The communication method of claim 15, wherein the communication interface of the station device is configured to communicate with the server device through a first communication scheme and communicate with the cordless vacuum cleaner through a second communication scheme that is different from the first communication scheme, the first communication scheme comprises a Wireless Fidelity (Wi-Fi)™ communication scheme, and the second communication scheme comprises a Bluetooth Low Energy (BLE) communication scheme.

17. The communication method of claim 15, wherein the identifying of whether the preset condition is satisfied comprises identifying whether a communication channel with the cordless vacuum cleaner has been established or identifying whether the cordless vacuum cleaner is docked on the station device.

18. The communication method of claim 15, wherein the software related to control of the cordless vacuum cleaner comprises an artificial intelligence (AI) model trained to infer a usage environment state of a brush device, based on data related to flow path pressure inside the cordless vacuum cleaner and data related to a load of the brush device connected to the cordless vacuum cleaner, and the new version of software related to control of the cordless vacuum cleaner comprises a new version of an AI model trained to additionally infer a new usage environment state or a new AI model corresponding to a new type of the brush device.

19. The communication method of claim 15, wherein the new version of software comprises a control algorithm related to an operation mode newly added to the cordless vacuum cleaner or a diagnosis algorithm for diagnosing the state of the cordless vacuum cleaner, and the control algorithm comprises an algorithm for controlling power consumption of a suction motor in the cordless vacuum cleaner or revolutions per minute (RPM) of a rotating brush of a brush device connected to the cordless vacuum cleaner.

20. The communication method of claim 15, wherein the receiving of the new version of software from the server device comprises:

periodically comparing first version information of software installed on the cordless vacuum cleaner with second version information of software registered in the server device; and when the first version information is different from the second version information, receiving the new version of software from the server device.

* * * * *